US011663999B2

United States Patent
Yokoyama

(10) Patent No.: US 11,663,999 B2
(45) Date of Patent: May 30, 2023

(54) WIRELESS COMMUNICATION DEVICE, WIRELESS COMMUNICATION METHOD, AND NON-TRANSITORY COMPUTER-READABLE STORAGE MEDIUM

(71) Applicant: Roland Corporation, Shizuoka (JP)

(72) Inventor: Hiroyuki Yokoyama, Shizuoka (JP)

(73) Assignee: Roland Corporation, Shizuoka (JP)

( * ) Notice: Subject to any disclaimer, the term of this patent is extended or adjusted under 35 U.S.C. 154(b) by 219 days.

(21) Appl. No.: 17/131,797

(22) Filed: Dec. 23, 2020

(65) Prior Publication Data

US 2021/0201866 A1 Jul. 1, 2021

(30) Foreign Application Priority Data

Dec. 27, 2019 (JP) .............................. JP2019-238890
Dec. 27, 2019 (JP) .............................. JP2019-238891

(51) Int. Cl.
*G10H 1/00* (2006.01)
*G10H 3/12* (2006.01)
(Continued)

(52) U.S. Cl.
CPC ......... *G10H 1/0066* (2013.01); *G10H 1/0008* (2013.01); *G10H 3/125* (2013.01);
(Continued)

(58) Field of Classification Search
CPC .... G10H 1/0066; G10H 1/0008; G10H 3/125; G10H 2210/066; G10H 2240/031;
(Continued)

(56) References Cited

U.S. PATENT DOCUMENTS 5,615,189 A * 3/1997 Kuribayashi .... G11B 20/10527
360/32
5,655,144 A * 8/1997 Milne ............ H04N 21/234318
715/202
(Continued)

FOREIGN PATENT DOCUMENTS

CN 113053338 A * 6/2021 ........... G10H 1/0008
EP 3975597 A1 * 3/2022 ........... G10H 1/0066
(Continued)

OTHER PUBLICATIONS

Quicco Sound, "Introducing mi.1", retrieved on Dec. 22, 2020, http://quicco.co.jp/products/.
(Continued)

*Primary Examiner* — Christina M Schreiber
(74) *Attorney, Agent, or Firm* — JCIPRNET

(57) ABSTRACT

A wireless communication device and a wireless communication method capable of curbing occurrence of latency even when performing wireless communication at predetermined time intervals are provided. MIDI data is transmitted and received by communication (B) performed through a wireless module during an intermission between communications (A) performed at predetermined time intervals through the wireless module. Accordingly, a communication speed for wireless communication is improved. Therefore, compared to a case in which wireless communication is performed by only the communication (A), MIDI data can be quickly transmitted and received, and thus occurrence of latency can be curbed.

21 Claims, 28 Drawing Sheets

(51) Int. Cl.
*H04W 76/14* (2018.01)
*H04W 56/00* (2009.01)
*H04W 68/00* (2009.01)
*H04W 68/12* (2009.01)
*H04W 84/20* (2009.01)

(52) U.S. Cl.
CPC ....... *H04W 56/001* (2013.01); *H04W 68/005* (2013.01); *H04W 68/12* (2013.01); *H04W 76/14* (2018.02); *H04W 84/20* (2013.01); *G10H 2210/066* (2013.01); *G10H 2240/031* (2013.01); *G10H 2240/305* (2013.01)

(58) Field of Classification Search
CPC ........... G10H 2240/305; H04W 76/14; H04W 56/001; H04W 68/005; H04W 68/12; H04W 84/20
USPC .......................................................... 84/465
See application file for complete search history.

(56) References Cited

U.S. PATENT DOCUMENTS

| | | | | |
|---|---|---|---|---|
| 6,248,945 | B1* | 6/2001 | Sasaki | G10H 1/0058 84/645 |
| 7,297,858 | B2* | 11/2007 | Paepcke | G10H 1/0066 84/645 |
| 7,684,572 | B2* | 3/2010 | Ito | G10H 1/0083 84/625 |
| 7,697,419 | B1* | 4/2010 | Donthi | H04L 41/22 370/386 |
| 8,364,963 | B2* | 1/2013 | Lind | H04W 12/06 455/411 |
| 9,167,349 | B2* | 10/2015 | Eo | H04R 5/04 |
| 10,631,363 | B1* | 4/2020 | Xian | H04W 52/0251 |
| 2002/0159401 | A1* | 10/2002 | Boger | H04W 84/20 370/294 |
| 2003/0000368 | A1* | 1/2003 | Isozaki | G10H 1/0058 84/609 |
| 2003/0121401 | A1* | 7/2003 | Ito | G10H 1/0083 84/625 |
| 2003/0124979 | A1* | 7/2003 | Tanada | H04W 84/20 455/507 |
| 2004/0203373 | A1* | 10/2004 | Ogino | H04W 84/20 455/553.1 |
| 2005/0056141 | A1* | 3/2005 | Uehara | G10H 1/0066 84/645 |
| 2006/0136015 | A1* | 6/2006 | Park | A61B 5/0031 607/60 |
| 2007/0140692 | A1* | 6/2007 | DeCusatis | H04J 14/0279 398/57 |
| 2011/0162647 | A1* | 7/2011 | Huby | A61M 16/16 128/203.14 |
| 2011/0174138 | A1* | 7/2011 | Loh | G10H 1/0066 84/645 |
| 2015/0255053 | A1* | 9/2015 | Nelson | G10H 1/0083 84/645 |
| 2016/0140943 | A1* | 5/2016 | Valladares-Madrid | G10H 1/0066 84/645 |
| 2017/0213533 | A1* | 7/2017 | Hiroi | G10H 1/0066 |
| 2018/0174559 | A1* | 6/2018 | Elson | H04N 7/142 |
| 2018/0247627 | A1* | 8/2018 | Fernandez | G10H 1/0066 |
| 2021/0201864 | A1* | 7/2021 | Yokoyama | G10H 1/0083 |
| 2021/0201866 | A1* | 7/2021 | Yokoyama | H04W 76/14 |
| 2021/0201867 | A1* | 7/2021 | Ishimine | G10H 1/0083 |
| 2021/0204384 | A1* | 7/2021 | Yokoyama | H04W 52/0235 |
| 2022/0093068 | A1* | 3/2022 | Yokoyama | H04W 4/70 |
| 2022/0159782 | A1* | 5/2022 | Ouyang | H04L 1/0061 |
| 2022/0277716 | A1* | 9/2022 | Takeda | H04W 12/06 |

FOREIGN PATENT DOCUMENTS

| | | | |
|---|---|---|---|
| JP | 3547385 B2 * | 7/2004 | |
| JP | 2007086214 | 4/2007 | |
| JP | 2013015643 | 1/2013 | |
| JP | 5151435 B2 * | 2/2013 | ........... G10H 1/0066 |
| JP | 2015179141 | 10/2015 | |
| JP | 6325296 | 5/2018 | |
| WO | WO-2020136892 A1 * | 7/2020 | ........... G10H 1/0075 |
| WO | WO-2022130815 A1 * | 6/2022 | |

OTHER PUBLICATIONS

Yamaha, "MD-BT01", retrieved on Dec. 22, 2020, https://usa.yamaha.com/products/music_production/accessories/md-bt01/index.html.

"Office Action of Related U.S. Appl. No. 17/133,444", dated Jul. 25, 2022, pp. 1-21.

"Office Action of Related U.S. Appl. No. 17/133,444", dated Mar. 9, 2023, pp. 1-13.

* cited by examiner

MS appearance pattern table 51c

| INDEX | appearance pattern | | |
|---|---|---|---|
| | P1 | P2 | P3 |
| 1 | MASTER | MASTER | MASTER |
| 2 | MASTER | MASTER | SLAVE |
| 3 | MASTER | SLAVE | – |
| 4 | SLAVE | – | – |

FIG. 5A

52 — RAM
- 52a — mode memory
- 52b — input data FIFO
- 52c — output data FIFO
- 52d — communication A transmission FIFO
- 52e — communication A reception FIFO
- 52f — communication B transmission FIFO
- 52g — communication B reception FIFO
- 52h — reply buffer
- 52i — transmitted ID memory
- 52j — received ID memory
- 52k — retry flag
- 52m — retry packet data
- 52n — control data memory
- 52p — received control data memory
- 52q — M counter memory
- 52r — S counter memory
- 52s — appearance pattern memory
- 52t — index memory
- 52u — MS standby time memory
- 52v — time counter
- 52w — LED turning-on time memory
- 52x — LED turning-off time memory

FIG. 5B input data FIFO 52b

| No. | ID | DATA |
|---|---|---|
| 1 | 1000 | MIDI1000 |
| 2 | 1001 | MIDI1001 |
| 3 | 1002 | MIDI1002 |
| : | : | : |

FIG. 5C packet
- ID
- reply ID
- control data
- actual data

FIG. 5D

| | | LED table 52y | | |
|---|---|---|---|---|
| SEQ | STEP | LED | operation | time (second) |
| 1 | 1 | red LED | turning-on | 0.6 |
| | 2 | red LED | turning-off | 0.7 |
| | 3 | green LED | turning-on | 1 |
| | 4 | green LED | turning-off | 1.2 |
| | ⋮ | ⋮ | ⋮ | ⋮ |
| 2 | 1 | green LED | turning-on | 0.7 |
| | 2 | green LED | turning-off | 0.8 |
| | 3 | red LED | turning-on | 0.9 |
| | 4 | red LED | turning-off | 0.6 |
| | ⋮ | ⋮ | ⋮ | ⋮ |
| ⋮ | ⋮ | ⋮ | ⋮ | ⋮ |

FIG. 22B

52 — RAM
52a — mode memory
52b — input data FIFO
52c — output data FIFO
52d — communication A transmission FIFO
52e — communication A reception FIFO
52f — communication B transmission FIFO
52g — communication B reception FIFO
52h — reply buffer
52i — transmitted ID memory
52j — received ID memory
52k — retry flag
52m — retry packet data
52n — control data memory
52p — received control data memory
52q — M counter memory
52r — S counter memory
52s — appearance pattern memory
52t — index memory
52u — MS standby time memory
52v — time counter
52x — LED turning-off time memory
52y — LED table
52z — LED sequence memory
52aa — LED step memory

FIG. 22A

WIRELESS COMMUNICATION DEVICE, WIRELESS COMMUNICATION METHOD, AND NON-TRANSITORY COMPUTER-READABLE STORAGE MEDIUM

CROSS-REFERENCE TO RELATED APPLICATION

This application claims the priorities of Japan patent application serial no. 2019-238890, filed on Dec. 27, 2019, and Japan patent application serial no. 2019-238891, filed on Dec. 27, 2019. The entirety of each of the above-mentioned patent applications is hereby incorporated by reference herein and made a part of this specification.

BACKGROUND

Technical Field

The disclosure relates to a wireless communication device, a wireless communication method and a non-transitory computer-readable storage medium.

Description of Related Art

Patent Document 1 discloses a dongle device 1 for an acoustic musical instrument (which will hereinafter be referred to as "a dongle device 1") connected to an acoustic musical instrument 2 such as an electronic keyboard and transmitting and receiving MIDI code-type electronic information (which will hereinafter be referred to as "MIDI data") to a portable electronic instrument 8 such as a computer using wireless communication performed by a wireless unit 20. MIDI data output in accordance with a musical performance with respect to the acoustic musical instrument 2 is transmitted to the portable electronic instrument 8 via the wireless unit 20 of the dongle device 1, and MIDI data from the portable electronic instrument 8 is input to the acoustic musical instrument 2 via the wireless unit 20. Accordingly, MIDI data in accordance with a musical performance with respect to the acoustic musical instrument 2 can be input to the portable electronic instrument 8, and MIDI data of the portable electronic instrument 8 can be output from a sound source mounted in the acoustic musical instrument 2.

PATENT DOCUMENTS

[Patent Document 1] Japanese Patent No. 6325296 (for example, Paragraphs 0015 to 0029)

SUMMARY

According to the disclosure, there is provided a wireless communication device connected to an electronic instrument and transmitting and receiving MIDI data input and output from the electronic instrument with respect to a different wireless communication device by wireless communication. The wireless communication device includes a data storage unit that stores MIDI data input from the electronic instrument, a wireless communication unit that performs wireless communication, a first communication unit that transmits MIDI data stored in the data storage unit by the wireless communication unit to the different wireless communication device at predetermined time intervals, and a second communication unit that transmits MIDI data stored in the data storage unit by the wireless communication unit to the different wireless communication device during an intermission between transmissions and receptions of the first communication unit.

In addition, according to the disclosure, there is provided a wireless communication method for transmitting MIDI data input from an electronic instrument to a different wireless communication device by wireless communication. The wireless communication method includes a first communication step of transmitting MIDI data input from the electronic instrument to the different wireless communication device at predetermined time intervals, and a second communication step of transmitting MIDI data input from the electronic instrument to the different wireless communication device during an intermission between transmissions through the first communication step.

In addition, according to the disclosure, there is provided a non-transitory computer-readable storage medium recording a program for causing a computer; which is included in a wireless communication device connected to an electronic instrument, transmitting and receiving MIDI data input and output from the electronic instrument with respect to a different wireless communication device by wireless communication, and including a data storage unit that stores MIDI data input from the electronic instrument and a wireless communication unit that performs wireless communication; to execute a first communication step of transmitting MIDI data stored in the data storage unit by the wireless communication unit to the different wireless communication device at predetermined time intervals, and a second communication step of transmitting MIDI data stored in the data storage unit by the wireless communication unit to the different wireless communication device during an intermission between transmissions and receptions through the first communication step.

BRIEF DESCRIPTION OF THE DRAWINGS

FIG. 5A is a view schematically illustrating a master-slave (MS) appearance pattern table, FIG. 5B is a view schematically illustrating a RAM, FIG. 5C is a view schematically illustrating an input data FIFO, and FIG. 5D is a view schematically illustrating a packet.

FIG. 22A is a view schematically illustrating the RAM according to the second embodiment, and FIG. 22B is a view schematically illustrating an LED table.

DESCRIPTION OF THE EMBODIMENTS

Incidentally, in the Patent Document 1, regarding a wireless unit 20, wireless communication is performed by the wireless unit 20 at predetermined time intervals. Accordingly, a frequency of wireless communication performed by the wireless unit 20 decreases. Therefore, power consumption of a dongle device 1 can be reduced, whereas there is a problem that a communication speed of wireless communication may decrease and latency may occur.

The disclosure may resolve the foregoing problems, and an object thereof is to provide a wireless communication device and a wireless communication method capable of curbing occurrence of latency even when performing wireless communication at predetermined time intervals.

Figure 1A:
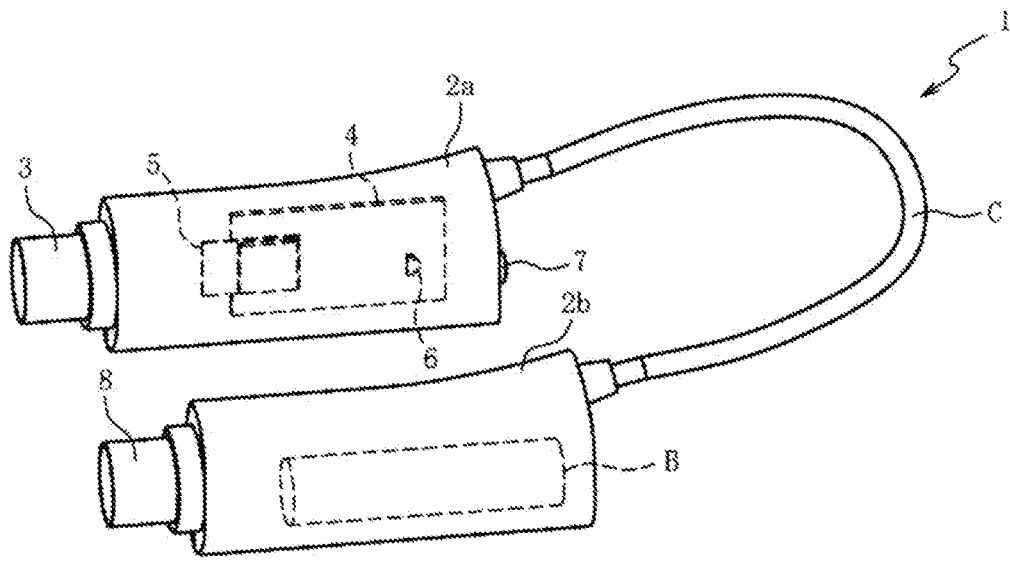
FIG. 1A is an external view of a wireless communication device according to an embodiment.
Figure 1B:
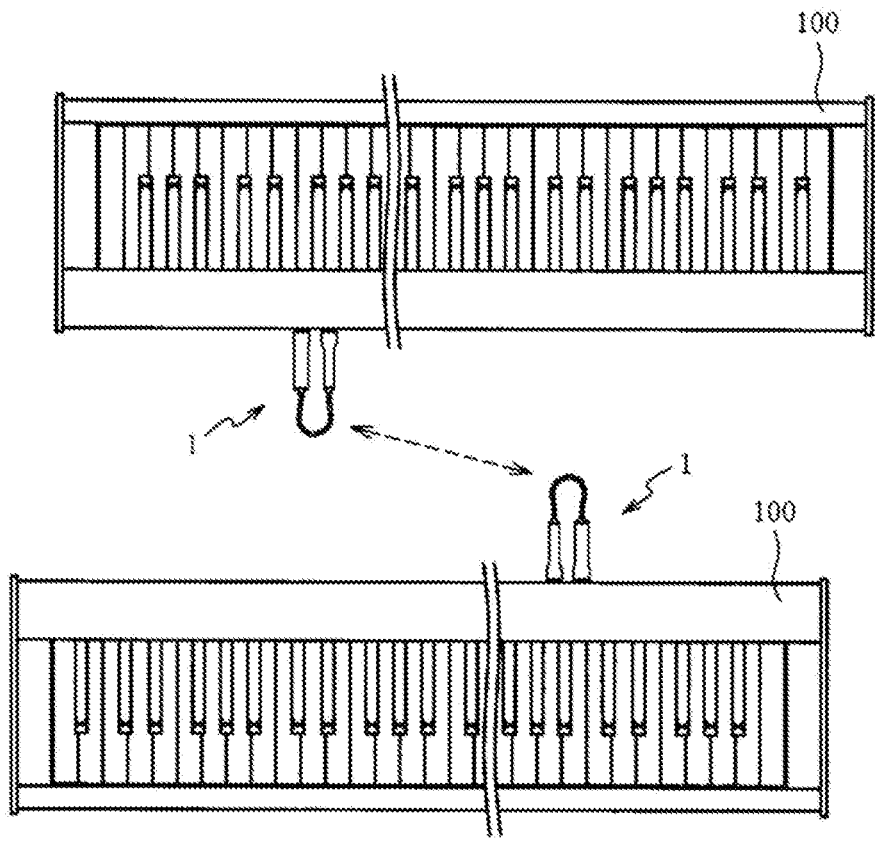
FIG. 1B is a view illustrating the wireless communication device connected to an electronic musical instrument.
Figure 6:
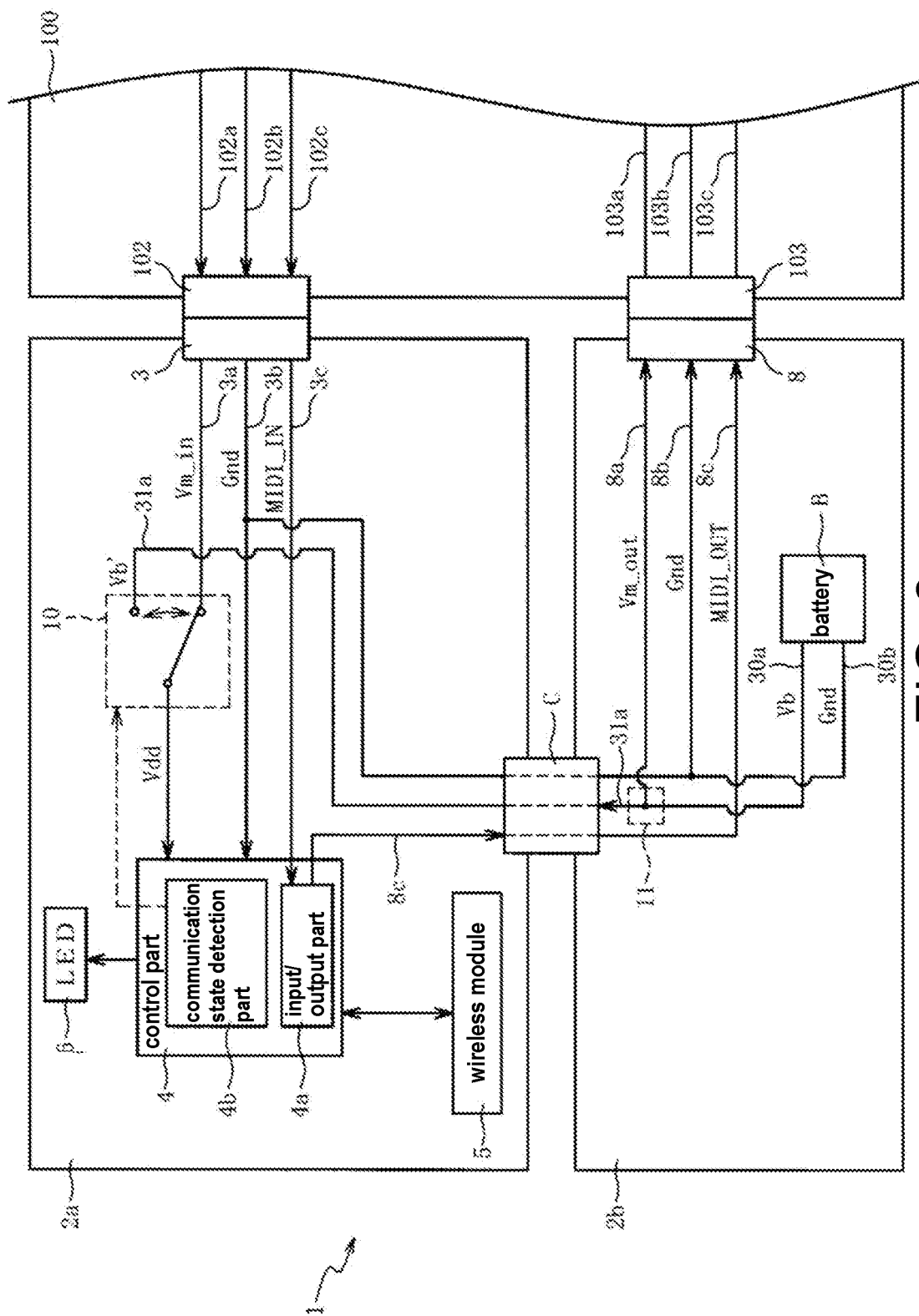
FIG. 6 is a schematic view illustrating supply of electric power to the wireless communication device.

Hereinafter, preferable examples will be described with reference to the accompanying drawings. With reference to FIGS. 1A, 1B and 6, an overview of a wireless communication device 1 of the present embodiment will be described. FIG. 1A is an external view of the wireless communication device 1, FIG. 1B is a view illustrating the wireless communication device 1 connected to an electronic musical instrument 100, and FIG. 6 is a schematic view illustrating supply of electric power to the wireless communication device 1. The wireless communication device 1 is a device connected to the electronic musical instrument 100 (an electronic instrument such as a synthesizer) and transmits and receives musical instrument digital interface (MIDI) data input and output in the electronic musical instrument 100 by wireless communication (a communication device for an electronic musical instrument). The wireless communication device 1 is configured to transmit and receive MIDI data input to and output from the electronic musical instruments 100 respectively connected to the wireless communication device 1 and a different wireless communication device 1 (pairing counterpart).

The wireless communication device 1 is provided with a casing 2a and a casing 2b formed of a translucent resin, and the casing 2a is provided with an input terminal 3, a control part 4 for controlling each part of the wireless communication device 1, a wireless module 5 for performing wireless communication, an LED 6, and an operation button 7 for inputting an instruction from a user.

The input terminal 3 is a terminal connected to a MIDI output terminal 102 of the electronic musical instrument 100 (refer to FIG. 6) and used for inputting MIDI data output from the MIDI output terminal 102. Specifically, as illustrated in FIG. 6, a signal form of the MIDI output terminal 102 of the electronic musical instrument 100 is "a current loop form". A Vm_out line 102a (a power supply signal line through which a current from the electronic musical instrument 100 is supplied), a Gnd line 102b, and a MIDI_OUT line 102c (a signal output line through which MIDI data from the electronic musical instrument 100 is output) are internally connected to the MIDI output terminal 102. The Vm_out line 102a, the Gnd line 102b, and the MIDI_OUT line 102c are respectively connected to a Vm_in line 3a, a Gnd line 3b, and a MIDI_IN line 3c connected to the input terminal of the wireless communication device 1.

Thus, a MIDI signal from the electronic musical instrument 100 is input to an input/output part 4a for inputting and outputting a MIDI signal in the control part 4 of the wireless communication device 1 via the MIDI_OUT line 102c, the MIDI output terminal 102, the input terminal 3, and the MIDI_IN line 3c. Moreover, electric power from the electronic musical instrument 100 is supplied to the control part 4 of the wireless communication device 1 via the Vm_out line 102a, the MIDI output terminal 102, the input terminal 3, and the Vm_in line 3a.

Returning to FIGS. 1A and 1B, the LED 6 is an output device that is turned on and turned off. The LED 6 is provided on the control part 4 and at a position where output light from the translucent casing 2a can be transmitted therethrough. Accordingly, output light from the LED 6 is output by being transmitted through the casing 2a. Therefore, a state of the LED 6 being turned on or turned off can be easily identified from outside of the casing 2a.

The casing 2b is provided with a battery B for supplying electric power to each part of the wireless communication device 1. The wireless communication device 1 of the present embodiment is operated by means of electric power from the foregoing input terminal 3 or electric power of the battery B, and this will be described below in detail.

An output terminal 8 is a terminal connected to a MIDI input terminal 103 of the electronic musical instrument 100 (refer to FIG. 6) and used for outputting MIDI data to the MIDI input terminal 103. Specifically, as illustrated in FIG.

6, a signal form of the MIDI input terminal 103 is also "a current loop form". A Vm_in line 103a (a power supply signal line through which a current is supplied to the electronic musical instrument 100), a Gnd line 103b, and a MIDI_IN line 103c (a signal input line through which MIDI data is input to the electronic musical instrument 100) are internally connected to the MIDI input terminal 103. The Vm_in line 103a, the Gnd line 103b, and the MIDI_IN line 103c are respectively connected to a Vm_out line 8a, a Gnd line 8b, and a MIDI_OUT line 8c connected to the output terminal 8 of the wireless communication device 1.

Thus, a MIDI signal from the input/output part 4a in the control part 4 of the wireless communication device 1 is output to the electronic musical instrument 100 via the MIDI_OUT line 8c, the output terminal 8, the MIDI input terminal 103, and the MIDI_IN line 103c. Moreover, electric power from the wireless communication device 1 is supplied to the electronic musical instrument 100 via the Vm_out line 8a, the output terminal 8, the MIDI input terminal 103, and the Vm_in line 103a.

Returning to FIGS. 1A and 1B, the casing 2a and the casing 2b are connected to each other through a cable C, and electric power or data is input and output between the casing 2a and the casing 2b via the cable C. For example, electric power from the battery B of the casing 2b is supplied to the casing 2a via the cable C, and MIDI data received through the wireless module 5 of the casing 2a is output to the output terminal 8 of the casing 2b via the cable C.

The wireless communication device 1 transmits and receives MIDI data input to and output from the electronic musical instrument 100 with respect to the different wireless communication device 1 (pairing counterpart) by wireless communication. Accordingly, MIDI data input in the electronic musical instrument 100 connected to the wireless communication device 1 can be output from the electronic musical instrument 100 connected to the different wireless communication device 1.

At this time, either of two communication modes, such as "a master mode" and "a slave mode", is set in each of the wireless communication devices 1, and wireless communication is performed on the basis of each communication mode. Specifically, the master mode is a communication mode mainly for giving the different wireless communication device 1 (that is, on the slave mode side) an instruction, and the slave mode is a communication mode for receiving an instruction from the different wireless communication device 1 (that is, on the master mode side) and transmitting a response for an instruction to the different wireless communication device 1. In the wireless communication device 1, particularly, the wireless communication device 1 on the master mode side transmits MIDI data to the wireless communication device 1 on the slave mode side, and the wireless communication device 1 on the slave mode side receives MIDI data from the wireless communication device 1 on the master mode side and transmits MIDI data to the wireless communication device 1 on the master mode side.

In this manner, since communication is performed by the wireless communication device 1 on the slave mode side after communication from the wireless communication device 1 on the master mode side is received, the paired wireless communication devices 1 do not perform transmission at the same time. Therefore, the paired wireless communication devices 1 can perform transmission and reception reliably and efficiently.

Figure 2:
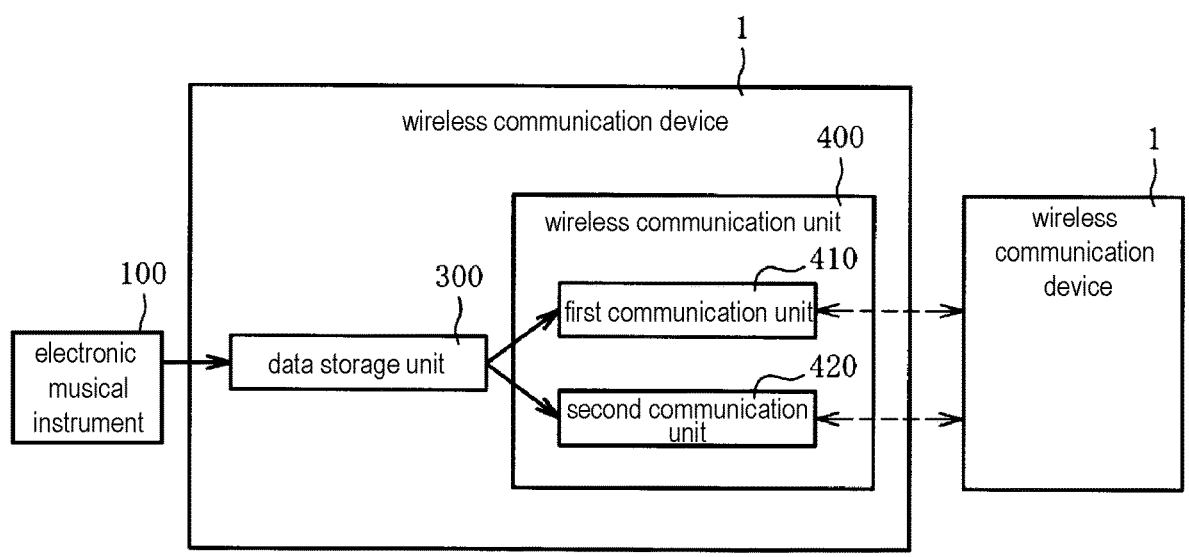
FIG. 2 is a functional block diagram of the wireless communication device.

Next, with reference to FIG. 2, functions of the wireless communication device 1 will be described. FIG. 2 is a functional block diagram of the wireless communication device 1. As illustrated in FIG. 2, the wireless communication device 1 has a data storage unit 300, a wireless communication unit 400, a first communication unit 410, and a second communication unit 420.

The data storage unit 300 is a unit that stores MIDI data input from the electronic musical instrument 100 and realized by an input data FIFO 52b which will be described below with FIG. 5C. The wireless communication unit 400 is a unit that performs wireless communication and realized by the foregoing wireless module 5. The first communication unit is a unit that transmits MIDI data stored in the data storage unit 300 by the wireless communication unit 400 to a different wireless communication device at predetermined time intervals and realized by a communication A which will be described below with FIG. 2. The second communication unit 420 is a unit that transmits MIDI data stored in the data storage unit 300 by the wireless communication unit 400 to a different wireless communication device during an intermission between transmissions and receptions of the first communication unit 410 and realized by communication B which will be described below with FIG. 2.

In the wireless communication device 1, MIDI data input from the electronic musical instrument 100 and stored in the data storage unit 300 is transmitted by the first communication unit 410 at predetermined time intervals and by the second communication unit 420 during an intermission of the first communication unit. Accordingly, compared to a case in which MIDI data is transmitted and received by only the first communication unit 410, MIDI data can be quickly transmitted.

Figure 3:
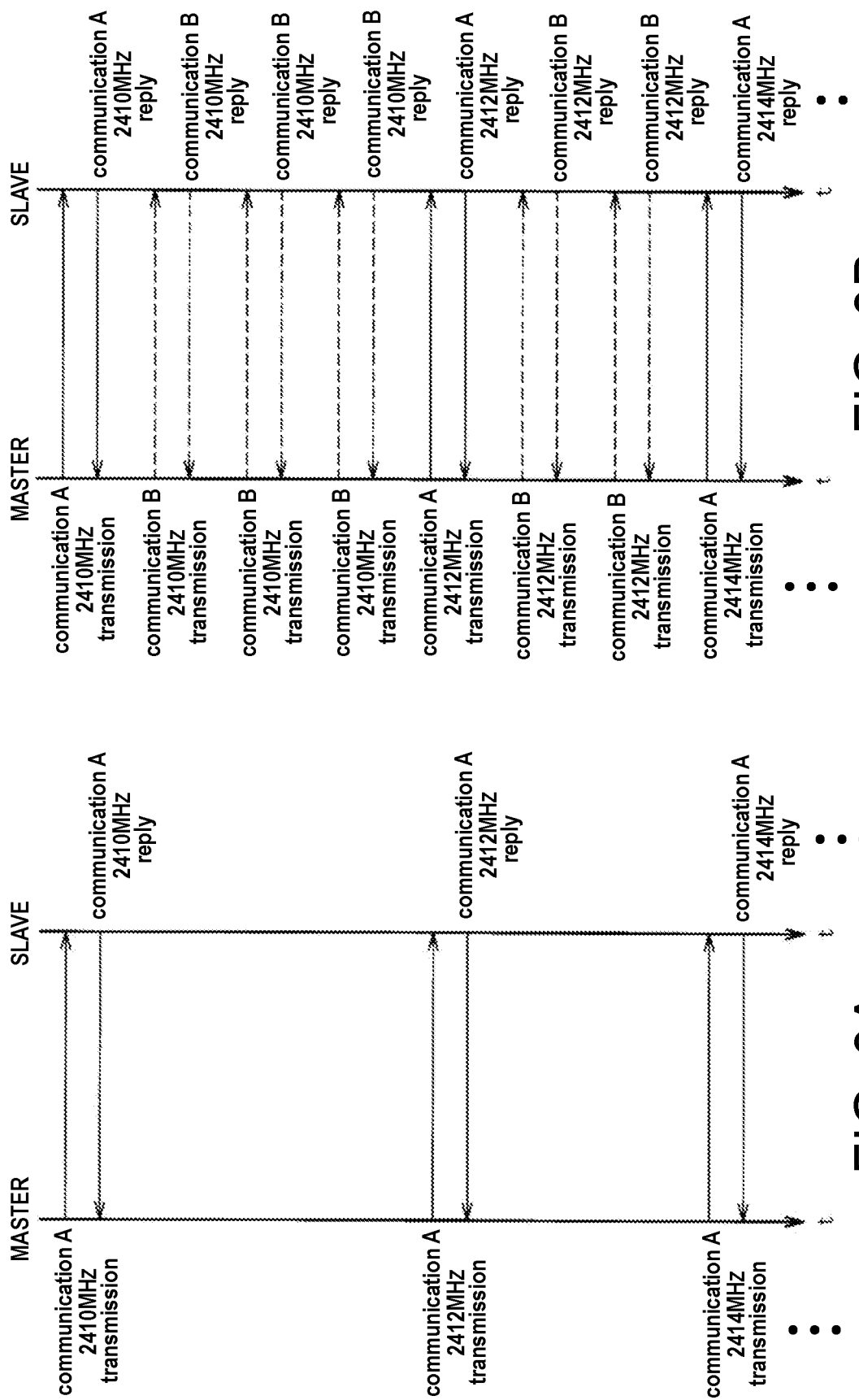
FIG. 3A is a schematic view illustrating a case in which communication is performed by only a communication A.
FIG. 3B is a schematic view illustrating a case in which communication is performed by both the communication A and a communication B.

Next, with reference to FIGS. 3A and 3B, a communication form for the wireless communication device 1 will be described. FIG. 3A is a schematic view illustrating a case in which communication is performed by only a communication A, and FIG. 3B is a schematic view illustrating a case in which communication is performed by both the communication A and a communication B. In the present embodiment, as described above, wireless communication is performed by respectively setting the two wireless communication devices 1 to the master mode and the slave mode. Moreover, two communication forms, such as the communication A and the communication B, are provided in the wireless communication.

As illustrated in FIG. 3A, the communication A is a communication form for transmitting and receiving MIDI data and the like at predetermined time intervals (for example, every 7.5 milliseconds). In addition, in the communication A, so-called "frequency hopping" in which a frequency used at the time of wireless communication is suitably changed is performed. Accordingly, a situation in which the frequency used for wireless communication of the wireless communication device 1 continuously overlaps the frequency used in a different instrument can be avoided. Therefore, wireless communication by the communication A can be stably performed.

In the communication A, wireless communication is performed every 7.5 milliseconds. Therefore, the frequency of electromagnetic wave outputs through the wireless module 5 at the time of transmission and a standby for receiving electromagnetic waves can be controlled, and wearing out of the battery B can be curbed. However, on the other hand, since communication is performed at a frequency of 7.5 milliseconds, a communication rate is fixed, and the communication rate cannot be improved. Accordingly, there is concern that a delay may occur in transmission and reception of MIDI data between the wireless communication devices 1.

Hence, in the present embodiment, the communication rate by wireless communication is improved by transmitting and receiving MIDI data by the communication B performed through the wireless module 5 during an intermission between the communications A. Therefore, compared to a case in which wireless communication is performed by only the communication A, MIDI data can be quickly transmitted and received between the wireless communication devices 1, and thus occurrence of latency can be curbed.

As illustrated in FIG. 3B, the communication B is a communication form performed during an intermission between the communications A. A time interval of the continuous communication B is set to be shorter than that of the communication A, and "2 milliseconds" are adopted as an example. The frequency of performing transmission and reception by wireless communication is improved and the communication rate of wireless communication can be improved by performing such communication B during an intermission between the communications A.

In addition, in the communication B, communication is performed using the same frequency as that of the immediately preceding communication A. Accordingly, frequency hopping similar to that in the communication A can be realized even in the communication B. Therefore, wireless communication by the communication B can be stably performed.

Figure 4:
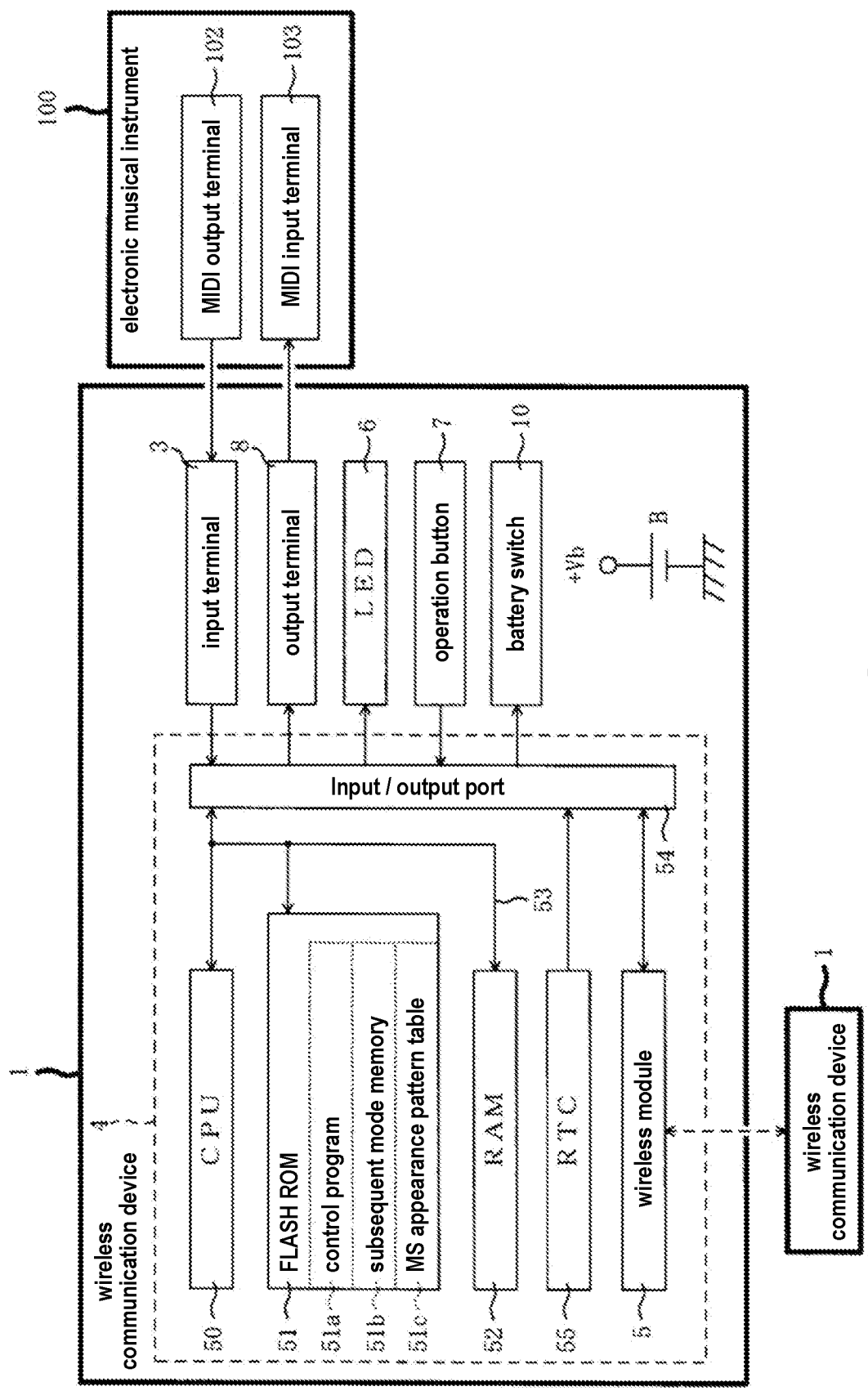
FIG. 4 is a block diagram illustrating an electrical configuration of the wireless communication device.

Next, an electrical configuration of the wireless communication device 1 will be described with reference to FIGS. 4 to 6. FIG. 4 is a block diagram illustrating the electrical configuration of the wireless communication device 1. The wireless communication device 1 is provided with the foregoing control part 4. The control part 4 has the CPU 50, a flash ROM 51, and a RAM 52, and these are individually connected to an input/output port 54 via a bus line 53. Moreover, a real-time clock (RTC) 55 for clocking a date and a time, the foregoing wireless module 5, the input terminal 3, the output terminal 8, the LED 6, the operation button 7, and the battery switch 10 are connected to the input/output port 54.

Figure 7A:
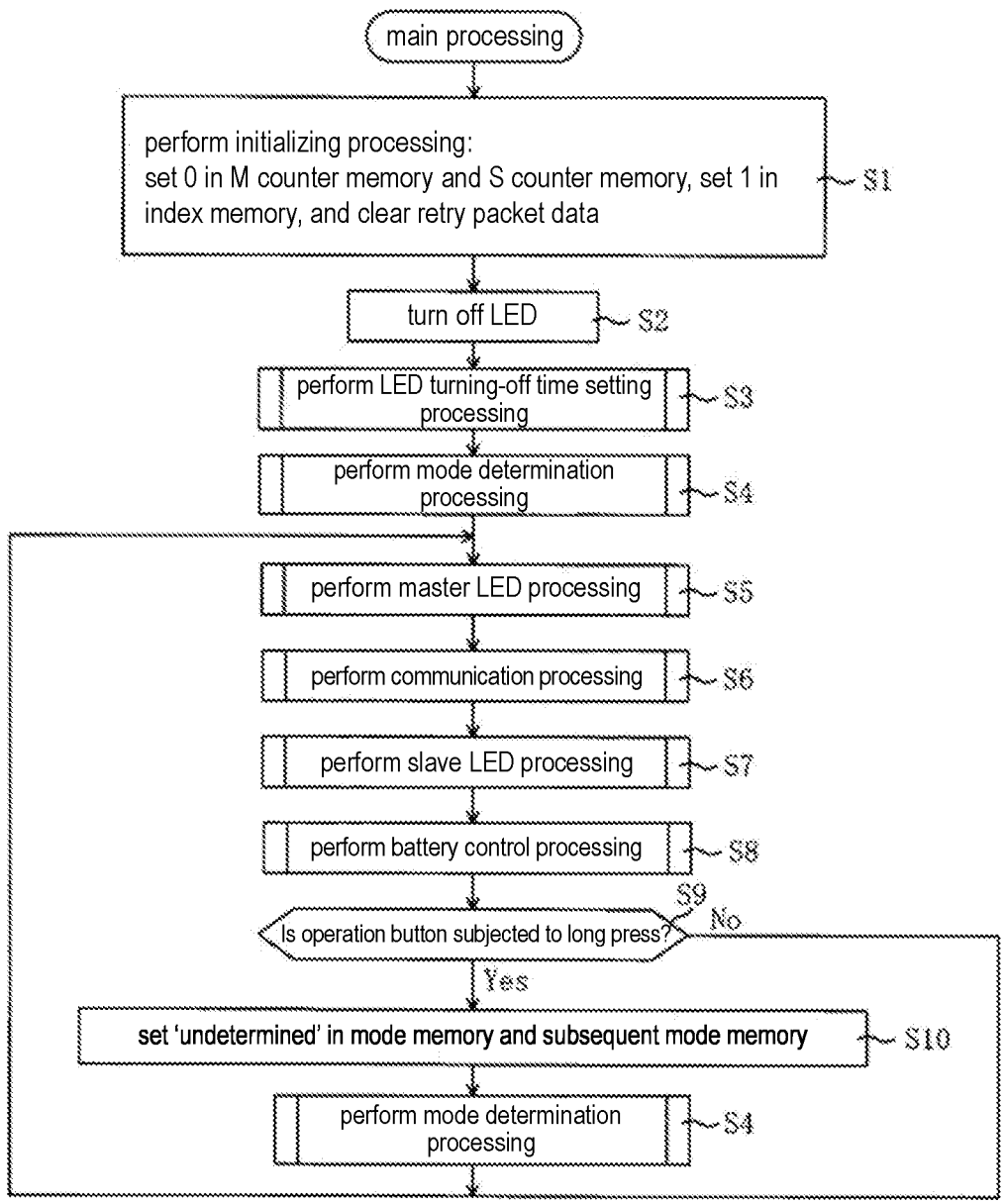
FIG. 7A is a flowchart of main processing.

The CPU 50 is a computation device for controlling each of the parts connected through the bus line 53. The flash ROM 51 is a rewritable non-volatile storage device for storing a program executed by the CPU 50, fixed value data, and the like and stores a control program 51a, a subsequent mode memory 51b, and a master-slave (MS) appearance pattern table 51c. When the control program 51a is executed by the CPU 50, main processing in FIG. 7A is executed.

The subsequent mode memory 51b stores a communication mode which is set in accordance with communication details in the wireless communication device 1 and used at the time of executing subsequent main processing. The MS appearance pattern table 51c is a data table storing appearance patterns for making the master mode or the slave mode appear. The MS appearance pattern table 51c will be described with reference to FIG. 5A.

FIG. 5A is a view schematically illustrating the MS appearance pattern table 51c. As illustrated in FIG. 5A, appearance patterns P1 to P3 are provided as the appearance patterns, and a communication mode (that is, the master mode or the slave mode) is individually set for each index.

The appearance pattern P1 is an appearance pattern in which the master mode is set with top priority as a communication mode. Specifically, in the appearance pattern P1, the master mode appears three times in a row for indices 1 to 3, and the slave mode appears for an index 4 thereafter. The appearance pattern P2 is an appearance pattern in which the master mode is set as a communication mode subsequent to the appearance pattern P1. Specifically, the master mode consecutively appears for the indices 1 and 2, and the slave mode appears for the index 3 thereafter. In the appearance pattern P3, the master mode and the slave mode appear alternately. When the communication mode is determined, the appearance patterns P1 to P3 in the MS appearance pattern table 51c are acquired in accordance with communication circumstances of the wireless communication device 1, and the communication mode is determined on the basis of the acquired appearance patterns P1 to P3.

Returning to FIG. 4, the RAM 52 is a memory for storing various kinds of working data, flags, and the like in a rewritable manner when the CPU 50 executes the control program 51a. With reference to FIGS. 5B to 5D, the RAM 52 will be described.

FIG. 5B is a view schematically illustrating the RAM 52. The RAM 52 is provided with a mode memory 52a for storing the communication modes, an input data FIFO 52b, an output data FIFO 52c for storing MIDI data output to the output terminal 8, a communication A transmission FIFO 52d for storing MIDI data used for transmission by the communication A, a communication A reception FIFO 52e for storing MIDI data received by the communication A, a communication B transmission FIFO 52f for storing MIDI data used for transmission by the communication B, a communication B reception FIFO 52g for storing MIDI data received by the communication B, a reply buffer 52h, a transmitted ID memory 52i for storing an identification number (ID) of MIDI data which has been transmitted, a received ID memory 52j for storing an ID of MIDI data which has been received, a retry flag 52k indicating whether or not transmission of MIDI data by the communication B is being retried, retry packet data 52m, a control data memory 52n for storing control information such as a turning-on instruction or a turning-off instruction for the LED 6, a received control data memory 52p for storing control information received via the wireless module 5, a master mode (M) counter memory 52q for counting a state in which the master mode is preferentially set as a communication mode, a slave mode (S) counter memory 52r for counting a state in which the slave mode is preferentially set as a communication mode, an appearance pattern memory 52s for storing the foregoing appearance patterns P1 to P3 in FIG. 5A, an index memory 52t for storing the foregoing indices in FIG. 5A, a master-slave (MS) standby time memory 52u for storing a standby time at the time of setting a communication mode, a time counter 52v for clocking a turning-on time or a turning-off time of the LED 6, an LED turning-on time memory 52w for storing the turning-on time of the LED 6, and an LED turning-off time memory 52x for storing the turning-off time of the LED 6.

The input data FIFO 52b is a data table for storing MIDI data output from the MIDI output terminal 102 of the electronic musical instrument 100 and input from the input terminal 3. The input data FIFO 52b will be described with reference to FIG. 5C.

FIG. 5C is a view schematically illustrating the input data FIFO 52b. As illustrated in FIG. 5C, the input data FIFO 52b stores MIDI data input from the input terminal 3, and an ID uniquely applied to the MIDI data.

In the present embodiment, each of the FIFOs such as the input data FIFO 52b, the foregoing output data FIFO 52c, the communication A transmission FIFO 52d, the communication A reception FIFO 52e, the communication B transmission FIFO 52f, and the communication B reception FIFO 52g is individually configured to have a data structure of "first-in/first-out". Therefore, when MIDI data or the like input from each of the FIFOs is acquired, MIDI data or the like is acquired sequentially from the latest MIDI data or the like added to the FIFO. At this time, each of the FIFOs is individually provided with "a reading position" indicating a position where MIDI data or the like is stored, and MIDI data or the like designated at the reading position is acquired from each of the FIFOs. Moreover, in the input data FIFO 52*b*, the reading positions with respect to the communication A and the communication B are individually provided.

Returning to FIG. 5B, in the reply buffer 52*h*, reply data with respect to data received by the communication B is stored when the slave mode is set in the mode memory 52*a*. In the retry packet data 52*m*, a packet of a retransmission target is stored when retransmission is performed by the communication B. Here, with reference to FIG. 5D, a structure of a packet used for the retry packet data 52*m* or the like will be described.

FIG. 5D is a view schematically illustrating a packet. A packet according to the present embodiment is provided with an ID uniquely applied to acquired MIDI data, a reply ID storing an ID of a received packet, control data storing control information such as a turning-on/turning-off instruction of the LED 6, and actual data storing MIDI data or the like. In the present embodiment, not only the retry packet data 52*m* but also data transmitted to and received from the different wireless communication device 1 through the wireless module 5 are stored in the packet.

Returning to FIG. 4, the battery switch 10 is a switch switching between taking in electric power for operating the control part 4 through the MIDI signal line of the electronic musical instrument 100 via the input terminal 3 and taking in the electric power from the battery B. Here, with reference to FIG. 6 again, supply of electric power to the wireless communication device 1 will be described.

Electric power acquired through the MIDI signal line of the electronic musical instrument 100 via the foregoing input terminal 3 (which will hereinafter be abbreviated as "electric power from the input terminal 3") or electric power from the battery B is input to the control part 4 of the wireless communication device 1. Specifically, a Vdd line (a power supply signal line through which electric power is supplied to the control part 4) is connected to the control part 4 and the battery switch 10. A contact point of the battery switch 10 is configured to be able to be connected to either the Vm_in line 3*a* or a Vb' line 31*a*. As described above, the Vm_in line 3*a* is connected to the Vm_out line 102*a* that is a power supply signal line from the electronic musical instrument 100 via the input terminal 3 and the MIDI output terminal 102.

The Vb' line 31*a* is a power supply signal line through which electric power is supplied from the battery B. Specifically, first, the battery B is connected to a Vb line 30*a* (power supply signal line), and the Vb line 30*a* is connected to the supply part 11. The supply part 11 supplies electric power from the battery B to the control part 4 and the output terminal 8. The Vb' line 31*a* extending to the casing 2*a* side via the cable C and the Vm_out line 8*a* are connected to the supply part 11. Accordingly, electric power is supplied from the battery B to the Vb' line 31*a* and the Vm_out line 8*a*. The supply part 11 may be suitably provided with a DC-DC converter, a capacitor, or the like in accordance with the voltage and the current of electric power supplied to the Vb' line 31*a* and the Vm_out line 8*a*. In addition, a Gnd line 30*b* from the battery B is also provided on the casing 2*a* side via the cable C.

In the control part 4, the battery switch 10, the Vm_in line 3*a*, and the Vb' line 31*a* provided in this manner, when a communication state detection part 4*b* for detecting the communication state in the control part 4 has received no MIDI data from the input terminal 3 and has detected that transmission has not been performed through the wireless module 5, the contact point of the battery switch 10 is connected to the Vm_in line 3*a*, and electric power from the input terminal 3 is supplied to the Vdd line. Accordingly, when the wireless communication device 1 can be operated by means of low electric power, power supplied from the battery B is halted. Therefore, wearing out of the battery B can be curbed, and the battery B can have a long lifespan.

On the other hand, when the communication state detection part 4*b* has received MIDI data from the input terminal 3 or has detected that transmission has been performed through the wireless module 5, the contact point of the battery switch 10 is connected to the Vb' line 31*a*, and electric power from the battery B is supplied to the Vdd line. Accordingly, when a large amount of electric power is consumed by the control part 4, electric power from the battery B is supplied to the control part 4. Therefore, the control part 4 can be stably operated.

In addition, power is supplied to the LED 6 by the control part 4. Thus, regardless of a case in which MIDI data is received from the input terminal 3 or a case in which transmission is performed through the wireless module 5, when the LED 6 continues being turned off, this denotes a case in which electric power from the battery B cannot be supplied, that is, a case in which the battery B has worn out. Thus, a replacement time of the battery B can also be easily recognized by confirming that the LED 6 is turned off.

As described above, the Vm_out line 8*a* is connected to the supply part 11 for supplying power supply from the battery B. Moreover, the Vm_out line 8*a* is connected to the Vm_in line 103*a* (a power supply signal line through which a current is supplied to the electronic musical instrument 100) via the output terminal 8 and the MIDI input terminal 103. Therefore, instead of electric power from the input terminal 3, electric power from the battery B is supplied from the output terminal 8 to the MIDI input terminal 103 of the electronic musical instrument 100. Accordingly, stable electric power from the battery B can be supplied to the MIDI input terminal 103. Therefore, the electronic musical instrument 100 can be stably operated.

Next, with reference to FIGS. 7A to 20B, the main processing executed by the CPU 50 of the wireless communication device 1 will be described. FIG. 7A is a flowchart of the main processing. The main processing is processing executed after power supply is input to the wireless communication device 1 or after returning from a sleep.

In the main processing, first, initializing processing is performed (S1). Specifically, 0 is set in an M counter memory 52*q* and an S counter memory 52*r*, 1 is set in the index memory 52*t*, and the retry packet data 52*m* is cleared. After the processing of S1, the LED 6 is turned off (S2). After the processing of S2, LED turning-off time setting processing is performed (S3). Here, with reference to FIG. 7B, the LED turning-off time setting processing will be described.

Figure 7B:
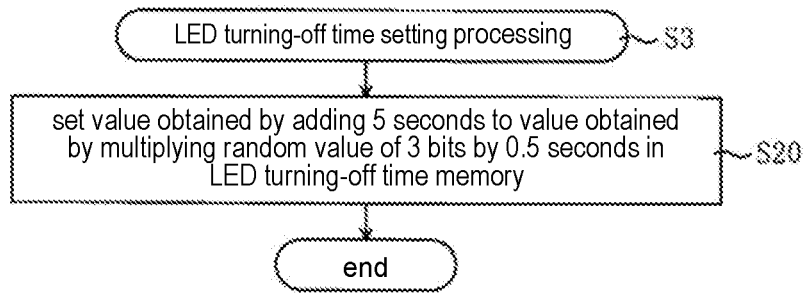
FIG. 7B is a flowchart of LED turning-off time setting processing.

FIG. 7B is a flowchart of the LED turning-off time setting processing. In the LED turning-off time setting processing, a random value of three bits (0 to 7) is acquired, and a value obtained by adding 5 seconds to a value obtained by multiplying the random value by 0.5 seconds is set in the LED turning-off time memory 52*x* (S20). Accordingly, a random time within a range of 5.0 seconds to 8.5 seconds is stored in the LED turning-off time memory 52*x*. Regarding a method for generating a random value, a known method, such as a linear congruential method, is employed. After the processing of S20, the procedure returns to the main processing in FIG. 7A.

After the LED turning-off time setting processing of S3, mode determination processing is performed (S4). Here, with reference to FIG. 8, the mode determination processing will be described.

Figure 8:
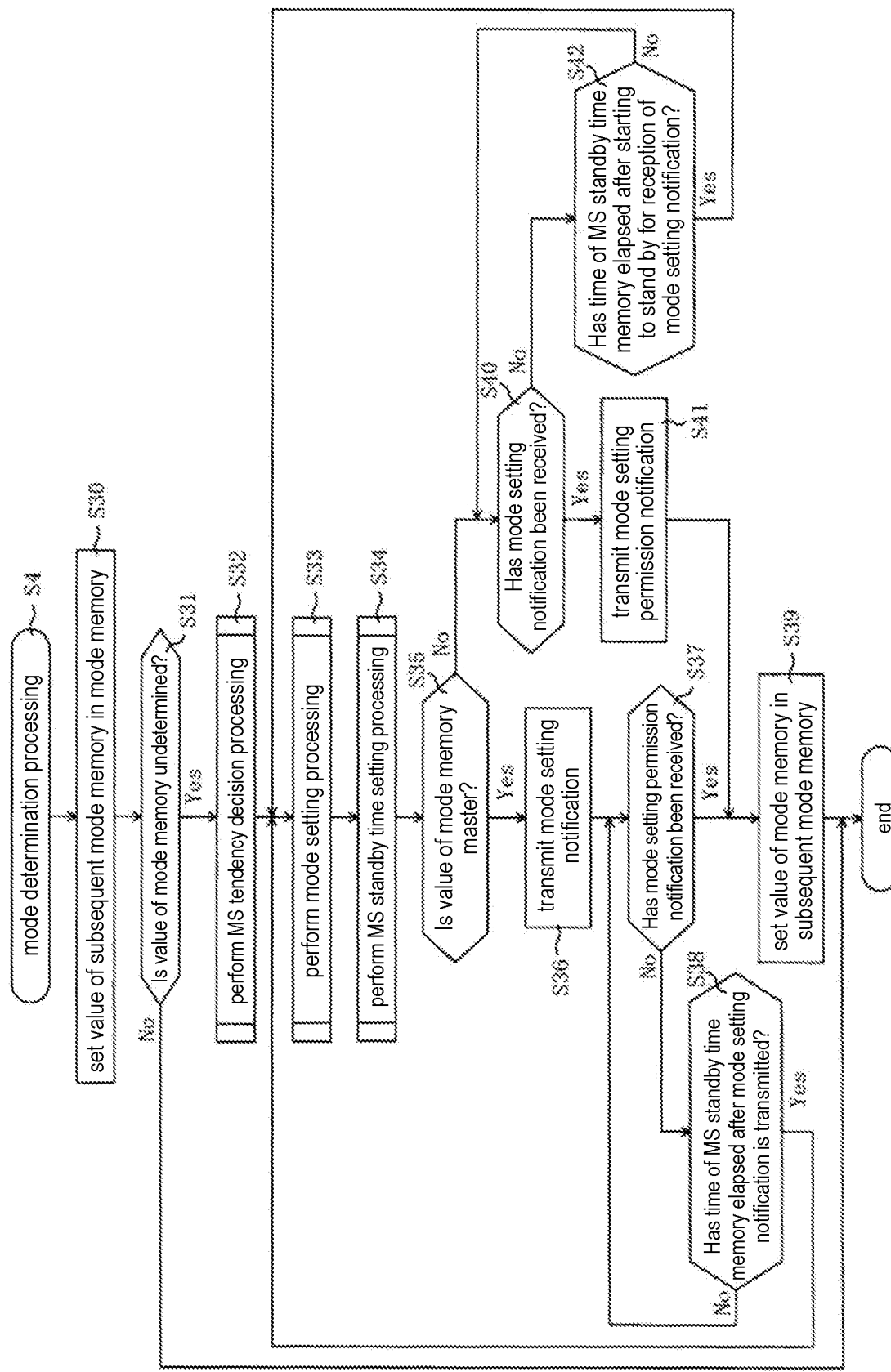
FIG. 8 is a flowchart of mode determination processing.

FIG. 8 is a flowchart of the mode determination processing. The mode determination processing is processing in which a communication mode of the wireless communication device 1 is set. In the mode determination processing, first, a communication mode of the subsequent mode memory 51b is set in the mode memory 52a (S30). Accordingly, the communication mode stored in the subsequent mode memory 51b on the basis of master-slave processing (which will be described below with FIG. 18B) is set in the mode memory 52a as a current communication mode in accordance with the preceding communication state of the wireless communication device 1.

Figure 9A:
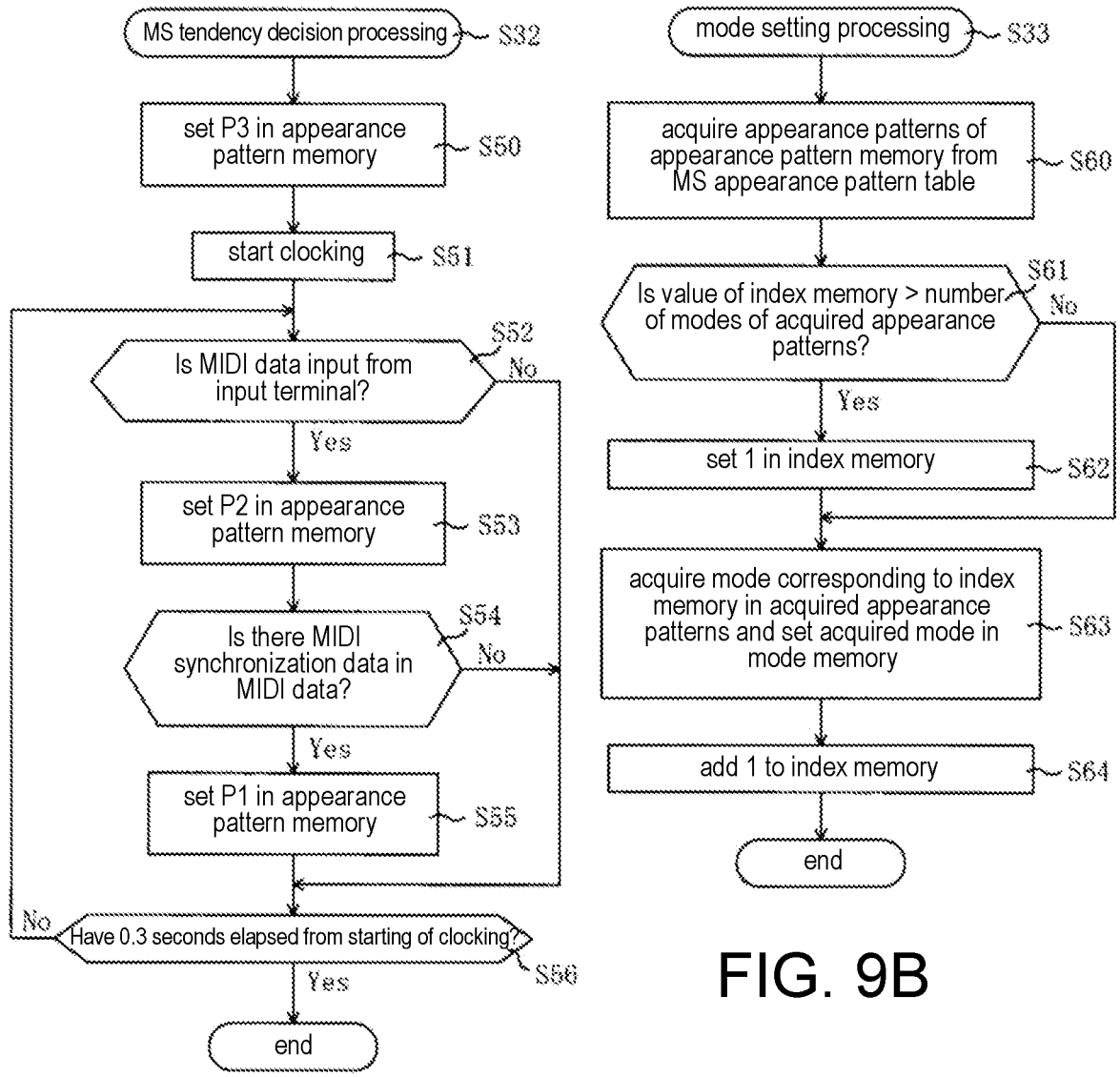
FIG. 9A is a flowchart of master-slave (MS) tendency decision processing.

After the processing of S30, it is confirmed whether the mode memory 52a is an undetermined value (S31). In the present embodiment, when the wireless communication device 1 is in a case of factory shipment, or when the operation button 7 is subjected to a long press in the processing of S9 in FIG. 7A, which will be described below, "an undetermined value" is set in the subsequent mode memory 51b. In such a case, an undetermined value is also set in the mode memory 52a to which the value of the subsequent mode memory 51b in the processing of S30 is set. In such a case, there is a need to determine either communication mode of the master mode or the slave mode and set the determined mode in the mode memory 52a and the subsequent mode memory 51b. Hence, when the mode memory 52a is an undetermined value (S31: Yes), first, master-slave (MS) tendency decision processing is performed (S32). With reference to FIG. 9A, the MS tendency decision processing will be described.

FIG. 9A is a flowchart of the MS tendency decision processing. The MS tendency decision processing is processing in which the appearance patterns P1 to P3 in the MS appearance pattern table 51c (FIG. 5A) are acquired in accordance with MIDI data input from the input terminal 3 and the acquired appearance patterns are set in the appearance pattern memory 52s.

In the MS tendency decision processing, first, the appearance pattern P3 is set in the appearance pattern memory 52s as an initial value (S50). After the processing of S50, clocking starts using the RTC 55 (S51). After the processing of S51, it is confirmed whether there is MIDI data in data input from the input terminal 3 from starting of clocking in the processing of S51 (S52). In the processing of S52, when there is MIDI data in the data input from the input terminal 3 (S52: Yes), the appearance pattern P2 is set in the appearance pattern memory 52s (S53).

After the processing of S53, it is further confirmed whether there is data related to MIDI synchronization in the MIDI data input from the input terminal 3 (S54). In the processing of S54, when there is data related to MIDI synchronization in the MIDI data input from the input terminal 3 (S54: Yes), the appearance pattern P1 is set in the appearance pattern memory 52s (S55). Data related to MIDI synchronization includes "a MIDI timing clock (F8H)" or "a MIDI time code quarter frame (F1H)" as an example.

In the processing of S52, when there is no MIDI data in the data input from the input terminal 3, the processing of S53 to S55 is skipped. In the processing of S54, when there is no data related to MIDI synchronization in the MIDI data input from the input terminal 3, the processing of S55 is skipped.

After the processing of S52, S54, and S55, it is confirmed whether 0.3 seconds have elapsed from starting of clocking in the processing of S51 (S56). In the processing of S56, when 0.3 seconds have not elapsed from starting of clocking in the processing of S51 (S56: No), the processing of S52 and thereafter is repeated. When 0.3 seconds have elapsed from starting of clocking in the processing of S51 (S56: Yes), the MS tendency decision processing ends.

In the MS tendency decision processing, the appearance patterns P1 to P3 to be set in the appearance pattern memory 52s are determined in accordance with data from the input terminal for 0.3 seconds. When MIDI data is input from the input terminal 3 (S52), an instruction from the electronic musical instrument 100 is input, and it is judged that there are many opportunities for transmitting MIDI data from the wireless communication device 1. In such a case, the appearance pattern P2 in which the master mode is preferentially set as a communication mode is set in the appearance pattern memory 52s.

Moreover, when the MIDI data is data related to MIDI synchronization (S54), that is, when the MIDI data is data related to tempo, it is further judged that there are many opportunities for transmitting MIDI data. In such a case, the appearance pattern P1 in which the master mode is set with top priority as a communication mode is set in the appearance pattern memory 52s.

In this manner, the master mode can be set as a communication mode with a high probability by setting the appearance patterns P1 and P2 in which the master mode is preferentially set as a communication mode in accordance with a case in which MIDI data is input from the input terminal and a case in which MIDI data is data related to synchronization. Therefore, MIDI data input from the input terminal 3 can be efficiently transmitted through the wireless module 5.

Returning to FIG. 8, after the MS tendency decision processing of S32, mode setting processing is executed (S33). Here, with reference to FIG. 9B, the mode setting processing will be described.

Figure 9B:
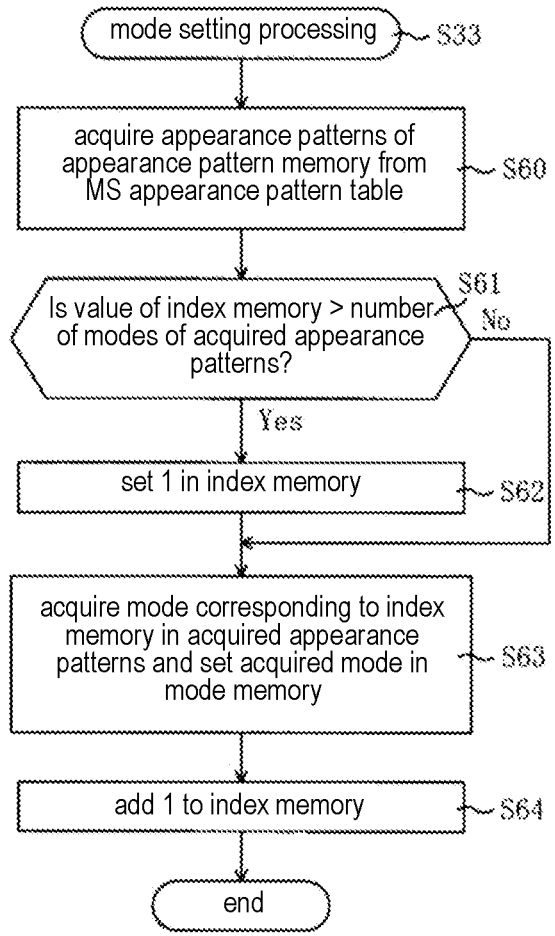
FIG. 9B is a flowchart of mode setting processing.

FIG. 9B is a flowchart of the mode setting processing. The mode setting processing is processing in which the communication mode is determined based on the MS appearance pattern table 51c, the appearance patterns P1 to P3 set in the MS tendency decision processing, and the index memory 52t.

In the mode setting processing, first, the appearance patterns P1 to P3 corresponding to the appearance pattern memory 52s are acquired from the MS appearance pattern table 51c (S60). After the processing of S60, it is confirmed whether the value of the index memory 52t is larger than the number of modes of the communication modes stored in the appearance patterns P1 to P3 acquired in the processing of S60 (S61).

In the processing of S61, when the value of the index memory 52t is larger than the number of modes stored in the appearance patterns P1 to P3 (S61: Yes), 1 is set in the index memory 52t (S62). When the value of the index memory 52t is equal to or smaller than the number of modes stored in the appearance patterns P1 to P3 (S61: No), the processing of S62 is skipped.

After the processing of S61 and S62, a communication mode corresponding to the index memory 52t in the appearance patterns P1 to P3 acquired in the processing of S60 is acquired from the MS appearance pattern table 51c and set in the mode memory 52a (S63). For example, when the appearance pattern acquired in the processing of S60 is the appearance pattern P1 and the value of the index memory 52t is "1", the corresponding communication mode is the master mode (refer to FIG. 5A). Therefore, the master mode is set in the mode memory 52a. After the processing of S63, 1 is added to the index memory 52t (S64), and the mode setting processing ends.

Accordingly, the communication mode set in the foregoing MS tendency decision processing (FIG. 9A) based on the appearance patterns P1 to P3 is acquired from the MS appearance pattern table 51c and set in the mode memory 52a. At this time, the communication mode according to the value of the index memory 52t is acquired from the appearance patterns P1 to P3. However, the value of the index memory 52t changes from 1 in an ascending order. Therefore, the communication mode can be set in the mode memory 52a without disrupting an appearance frequency or a tendency of the master mode or the slave mode stored in the appearance patterns P1 to P3.

Returning to FIG. 8, after the mode setting processing of S33, master-slave (MS) standby time setting processing is executed (S34). Here, with reference to FIG. 9C, the MS standby time setting processing will be described.

Figure 9C:
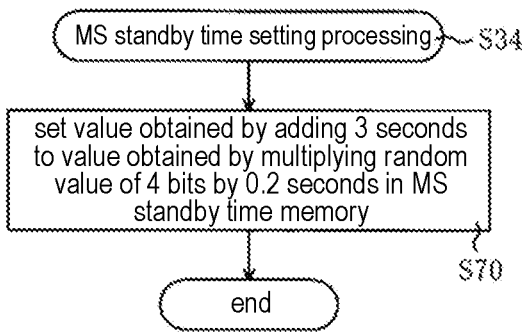
FIG. 9C is a flowchart of master-slave (MS) standby time setting processing.

FIG. 9C is a flowchart of the MS standby time setting processing. In the MS standby time setting processing, a random value of four bits (0 to 15) is acquired, and a value obtained by adding 3 seconds to a value obtained by multiplying the acquired random value by 0.2 seconds is set in the MS standby time memory 52u (S70). Accordingly, a random time within a range of 3 seconds to 6 seconds is stored in the MS standby time memory 52u. After the processing of S70, the MS standby time setting processing ends, and the procedure returns to the mode determination processing in FIG. 8.

After the MS standby time setting processing of S34, it is confirmed whether the value of the mode memory 52a is the master mode (S35). In the processing of S35, when the value of the mode memory 52a is the master mode (S35: Yes), a mode setting notification indicating a fact that the master mode is set as a communication mode of a host device is transmitted to the different wireless communication device 1 (pairing counterpart) (S36). After the processing of S36, it is confirmed whether a mode setting permission notification (a response to the mode setting notification) has been received from the different wireless communication device 1 (S37).

In the processing of S37, when a mode setting permission notification has been received (S37: Yes), the value of the mode memory 52a is set in the subsequent mode memory 51b (S39). On the other hand, in the processing of S37, when no mode setting permission notification has been received (S37: No), it is confirmed whether the time of the MS standby time memory 52u has elapsed after the mode setting notification was transmitted in the processing of S36 (S38).

In the processing of S38, when the time of the MS standby time memory 52u has not elapsed after the mode setting notification was transmitted (S38: No), the processing of S37 is repeated. On the other hand, in the processing of S38, when the time of the MS standby time memory 52u has elapsed after the mode setting notification was transmitted (S38: Yes), the processing of S33 and thereafter is repeated.

In the processing of S35, when the value of the mode memory 52a is the slave mode (S35: No), it is confirmed whether a mode setting notification has been received from the different wireless communication device 1 (S40). This mode setting notification is the same as the mode setting notification transmitted by the different wireless communication device 1 in the processing of S36.

In the processing of S40, when a mode setting notification has been received (S40: Yes), a mode setting permission notification is transmitted to the different wireless communication device 1 (S41). This mode setting permission notification is the same as the mode setting permission notification for standing by for reception from the different wireless communication device 1 in S37 and S38. Further, after the processing of S41, the value of the mode memory 52a is set in the subsequent mode memory 51b in the foregoing processing of S39.

On the other hand, in the processing of S40, when no mode setting notification has been received (S40: No), it is confirmed whether the time of the MS standby time memory 52u has elapsed after starting to stand by for reception of a mode setting notification in the processing of S40 (S42). In the processing of S42, when the time of the MS standby time memory 52u has not elapsed after starting to stand by for reception of an inquiry (S42: No), the processing of S40 and thereafter is repeated. When the time of the MS standby time memory 52u has elapsed after starting to stand by for reception of an inquiry (S42: Yes), the processing of S33 and thereafter is repeated.

That is, when the master mode is set in the mode memory 52a in the processing of S33, a mode setting notification is transmitted to the different wireless communication device 1. When a mode setting permission notification with respect to the mode setting notification is received from the different wireless communication device 1, the master mode is settled as a communication mode, and the master mode is set in the mode memory 52a and the subsequent mode memory 51b.

On the other hand, when the slave mode is set in the mode memory 52a in the processing of S33, in a case in which a mode setting notification from the different wireless communication device 1 is received, the slave mode is settled as a communication mode, and the slave mode is set in the mode memory 52a and the subsequent mode memory 51b. In addition, a mode setting permission notification is transmitted to the different wireless communication device 1.

Accordingly, a different communication mode can be automatically set in each of the paired wireless communication devices 1 without providing an operation piece, a display, or the like for setting a communication mode for the wireless communication device 1. At this time, since the same communication mode is not set in both the paired wireless communication devices 1, a situation in which wireless communication cannot be performed between the paired wireless communication devices 1 can be prevented.

Moreover, when the master mode is set in the mode memory 52a and the time of the MS standby time memory 52u has elapsed before a mode setting permission notification with respect to a mode setting notification is received from the different wireless communication device 1, and when the slave mode is set in the mode memory 52a and the time of the MS standby time memory 52u has elapsed individually before a mode setting notification is received from the different wireless communication device 1, this denotes a case in which each of these notifications has not arrived at the different wireless communication device 1 due to a communication failure or a case in which the same communication mode is set in both the paired wireless communication devices 1 so that a mode setting notification or a mode setting permission notification with respect thereto is not transmitted.

In such a case, a probability that a different communication mode is set in each of the paired wireless communication devices 1 can be improved by executing the processing of S33 again, resetting a communication mode in the mode memory 52*a*, and then executing an inquiry for mode setting in the processing of S36 thereafter again. Therefore, a communication mode can be quickly set in the paired wireless communication devices 1.

In addition, since a random time within a range of 3 seconds to 6 seconds is set as the time of the MS standby time memory 52*u*, a timing at which standby processing in S38 and S42 continues can be staggered between the paired wireless communication devices 1. Also this case, the probability that a different communication mode is set in each of the paired wireless communication devices 1 can be improved.

In the processing of S31, when the value of the mode memory 52*a* is set (S31), or after the processing of S39, the mode determination processing ends.

After the mode determination processing of S4, master LED processing is executed (S5). Here, with reference to FIGS. 10A and 10B, the master LED processing will be described.

Figure 10A:
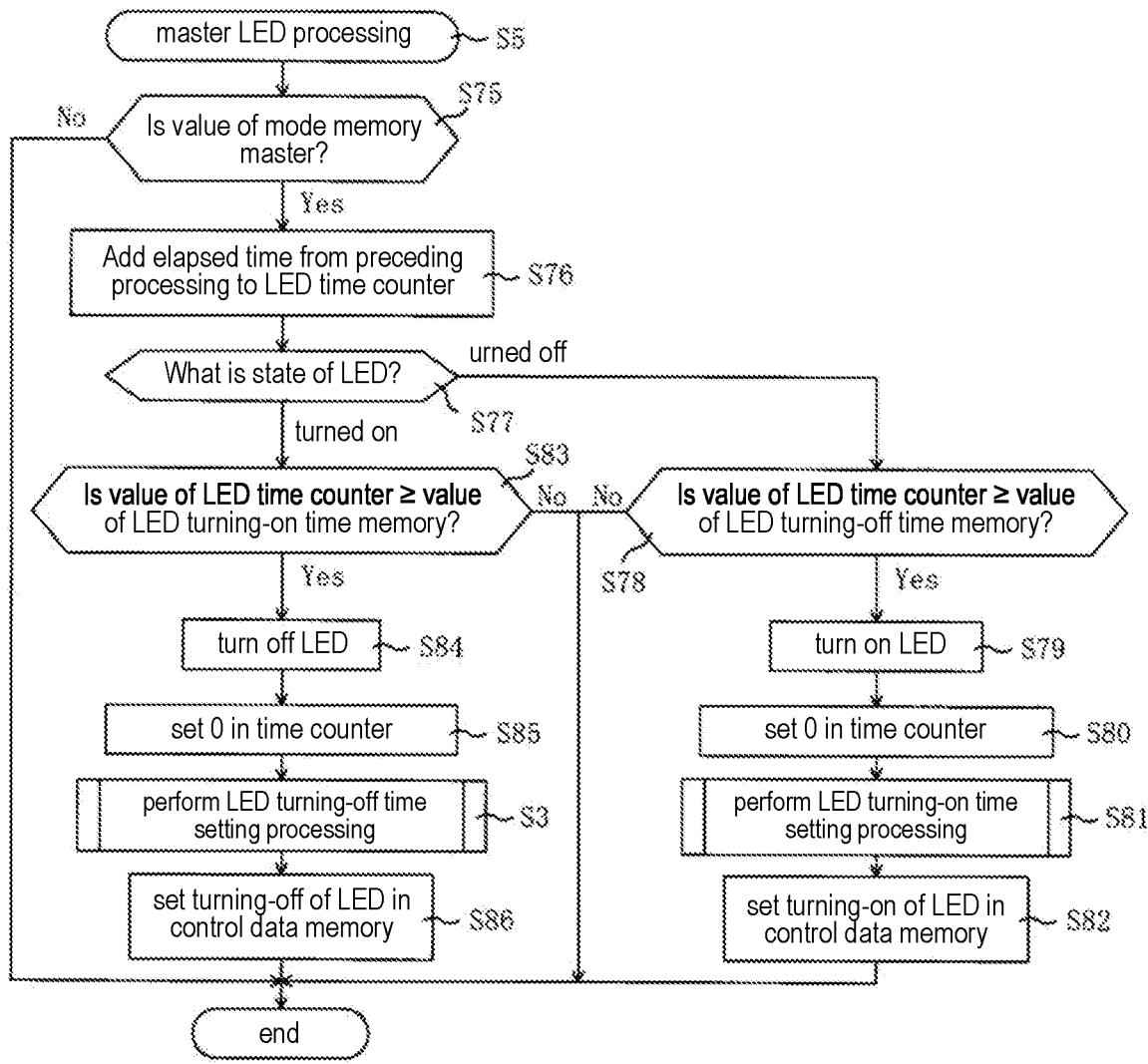
FIG. 10A is a flowchart of master LED processing.

FIG. 10A is a flowchart of the master LED processing. The master LED processing is processing in which turning-on and turning-off of the LED 6 are controlled when the communication mode is the master mode. In the master LED processing, first, it is confirmed whether the value of the mode memory 52*a* is the master mode (S75). In the processing of S75, when the value of the mode memory 52*a* is the master mode (S75: Yes), the elapsed time from the preceding master LED processing acquired from the RTC 55 is added to the time counter 52*v* (S76).

After the processing of S76, the state of the LED 6 is confirmed (S77). In the processing of S77, when the LED 6 is turned off (S77: turning off), it is confirmed whether the value of the time counter 52*v* is equal to or larger than the LED turning-off time memory 52*x* (S78).

In the processing of S78, when the value of the time counter 52*v* is equal to or larger than the LED turning-off time memory 52*x* (S78: Yes), it is a timing to turn on the LED 6. Therefore, the LED 6 is turned on (S79), and 0 is set as the value of the time counter 52*v* (S80). After the processing of S80, LED turning-on time setting processing (S81) is executed. Here, with reference to FIG. 10B, the LED turning-on time setting processing will be described.

Figure 10B:
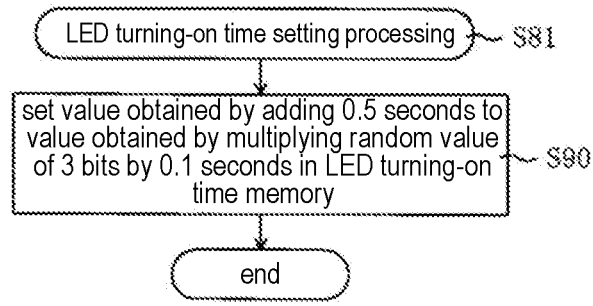
FIG. 10B is a flowchart of LED turning-on time setting processing.

FIG. 10B is a flowchart of the LED turning-on time setting processing. In the LED turning-on time setting processing, a random value of three bits (0 to 7) is acquired, and a value obtained by adding 0.5 seconds to a value obtained by multiplying the random value by 0.1 seconds is set in the LED turning-on time memory 52*w* (S90). Accordingly, a random time within a range of 0.5 seconds to 1.2 seconds is stored in the LED turning-on time memory 52*w*. After the processing of S90, the LED turning-on time setting processing ends.

After the LED turning-on time setting processing of S81, "turning-on of LED" is set in the control data memory 52*n* (S82). Information of "turning-on of LED" set in the control data memory 52*n* is transmitted to the different wireless communication device 1 on the slave mode side in communication A packet transmission registration processing in FIG. 13 (which will be described below) or communication B packet transmission/reception processing in FIGS. 16 and 17.

In the processing of S77, when the LED 6 is turned on (S77: turning-on), it is confirmed whether the value of the time counter 52*v* is equal to or larger than the LED turning-on time memory 52*w* (S83). In the processing of S83, when the value of the time counter 52*v* is equal to or larger than the LED turning-on time memory 52*w*(S83: Yes), it is a timing to turn off the LED 6. Therefore, first, the LED 6 is turned off (S84), and 0 is set as the value of the time counter 52*v* (S85). After the processing of S85, the foregoing LED turning-off time setting processing (S3) in FIG. 7B is executed, and "turning-off of LED" is set in the control data memory 52*n* (S86).

In a case in which the value of the mode memory 52*a* is the slave mode in the processing of S75 (S75: No), when the value of the time counter 52*v* is smaller than the LED turning-off time memory 52*x* in the processing of S78 (S78: No), when the value of the time counter 52*v* is smaller than the LED turning-on time memory 52*w* in the processing of S83, or after the processing of S82 and S86, the master LED processing ends. Processing of turning on the LED 6 in the wireless communication device 1 on the slave mode side will be described below with FIG. 20A.

In the master LED processing, turning-on and turning-off of the LED 6 are controlled on the basis of the LED turning-on time memory 52*w* and the LED turning-off time memory 52*x*, and the state thereof being turned on or turned off is transmitted to the different wireless communication device 1 on the slave mode side via the control data memory 52*n*. Turning-on and turning-off of the LED 6 are performed in accordance with the received state of the LED being turned on or turned off in the different wireless communication device 1 on the slave mode side, and this will be described below in detail.

That is, the state of the LED 6 being turned on or turned off in the wireless communication device 1 on the master mode side and the state of the LED 6 being turned on or turned off in the different wireless communication device 1 on the slave mode side can be synchronized. Accordingly, even when there is a plurality of paired wireless communication devices 1, a cycle of turning on and turning off the LED 6 can differ between the paired wireless communication devices 1. Therefore, the paired wireless communication devices 1 can be easily identified. Accordingly, a pairing counterpart can be easily identified. Since identification of the paired wireless communication devices 1 can be realized with only the LED 6, there is no need for the wireless communication device 1 to be provided with a display for displaying character strings such as names of the pair. Accordingly, manufacturing costs of the wireless communication device 1 can be reduced, and the wireless communication device 1 can be miniaturized.

In addition, a random time is individually set in the LED turning-on time memory 52*w* and the LED turning-off time memory 52*x*. Accordingly, each of the paired wireless communication devices 1 can have a different cycle of turning-on and turning-off. Therefore, the paired wireless communication devices 1 can be more easily identified.

Moreover, a time shorter than the LED turning-off time memory 52*x* is set in the LED turning-on time memory 52*w*. Accordingly, the turning-on time of the LED 6 can be shortened. Therefore, wearing out of the battery B can be curbed, and the battery B can have a long lifespan. In addition, the turning-on time and the turning-off time are set in the LED turning-on time memory 52*w* and the LED turning-off time memory 52*x* in only the wireless communication device 1 on the master mode side. Therefore, a load on the processing in the wireless communication device 1 on the slave mode side can be reduced.

Returning to FIG. 7A, after the master LED processing of S5, communication processing (S6) is performed. Here, with reference to FIGS. 11 to 19, the communication processing will be described.

Figure 11:
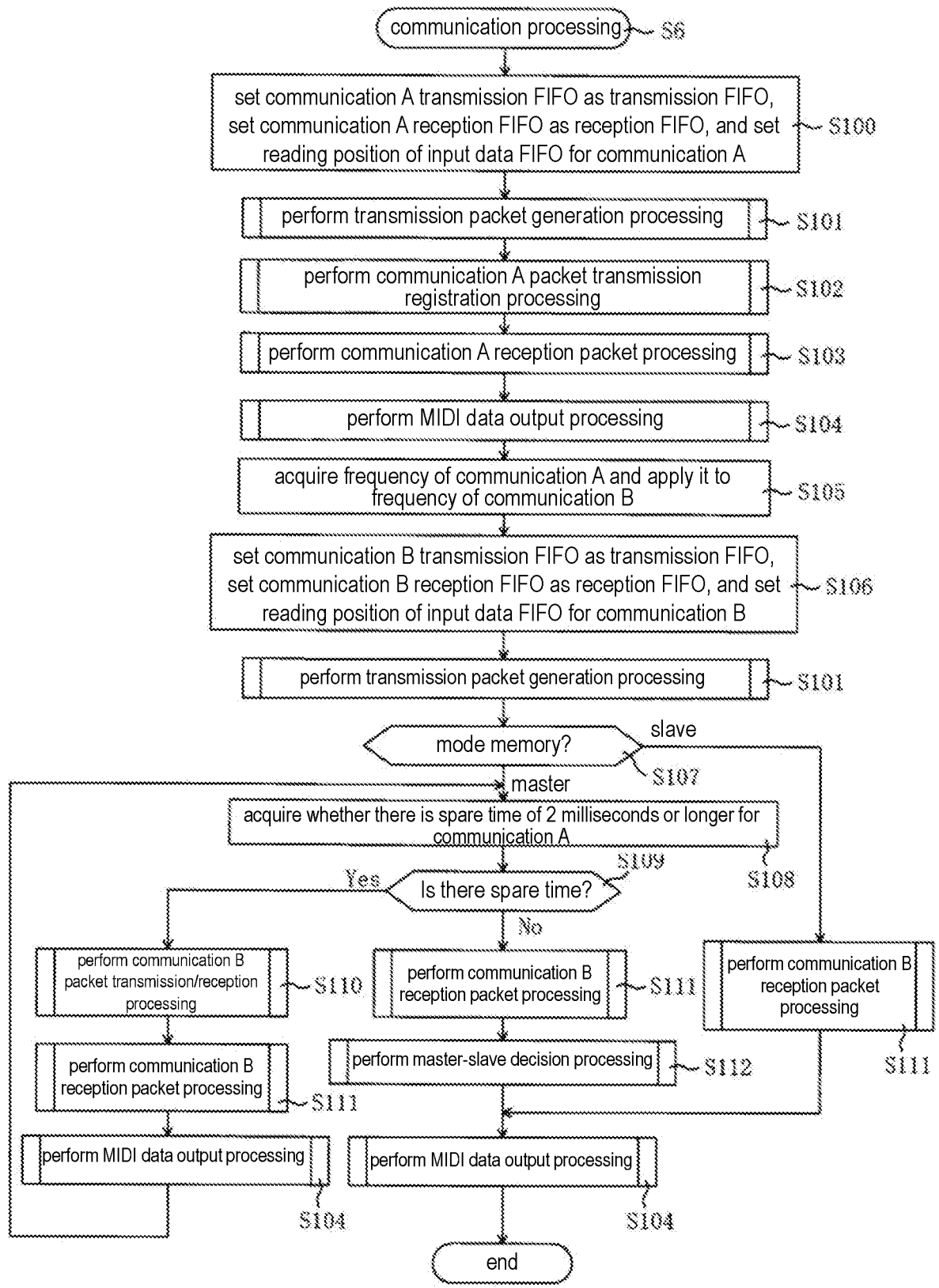
FIG. 11 is a flowchart of communication processing.

FIG. 11 is a flowchart of the communication processing. The communication processing is processing in which MIDI data is transmitted and received by the communication A and the communication B. In the communication processing, first, in order to transmit and receive data by the communication A, the communication A transmission FIFO 52d is set as a transmission FIFO, the communication A reception FIFO 52e is set as a reception FIFO, and the reading position of the input data FIFO 52b is set for the communication A (S100). The reading position of the input data FIFO 52b is provided in each of the communication A and the communication B, but the reading position of the communication A thereof is selected in the processing of S100, and the reading position is referred to in S101 of transmission packet generation processing (which will be described below). After the processing of S100, the transmission packet generation processing (S101) is executed. Here, with reference to FIG. 12A, the transmission packet generation processing will be described.

Figure 12A:
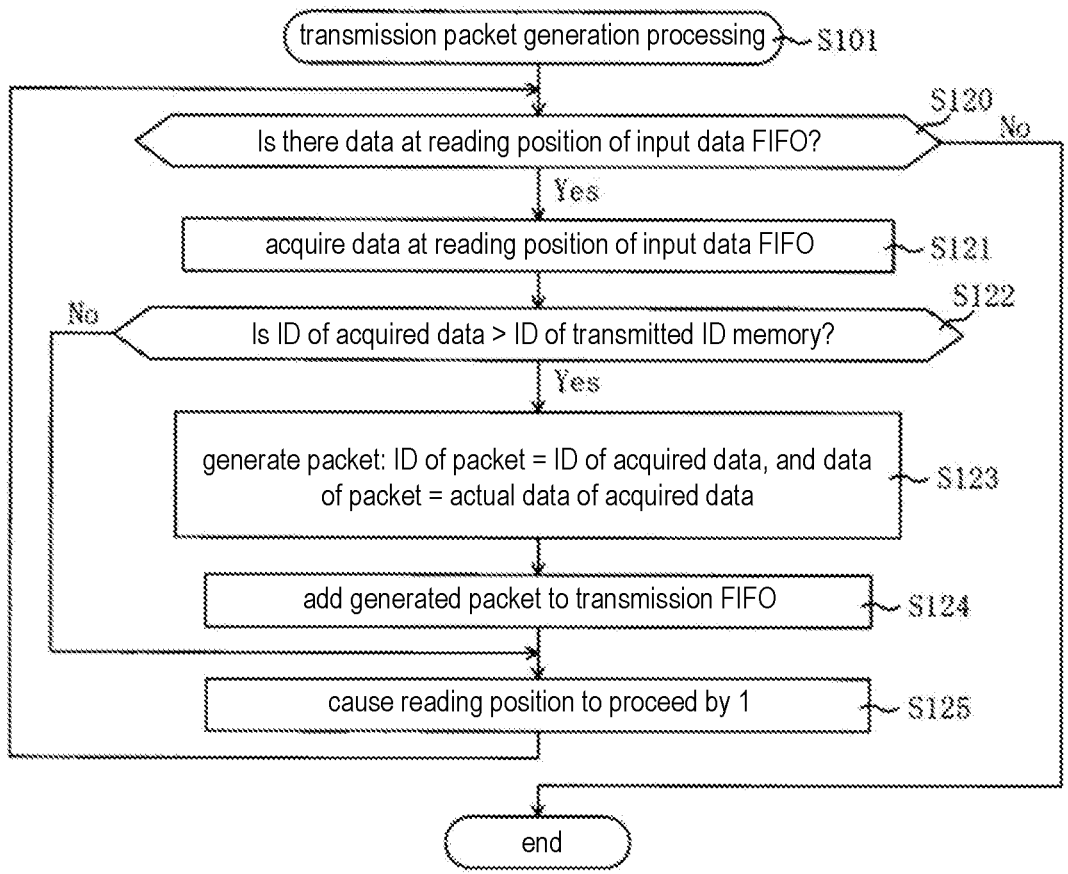
FIG. 12A is a flowchart of transmission packet generation processing.

FIG. 12A is a flowchart of the transmission packet generation processing. The transmission packet generation processing is processing of generating a transmission packet for performing transmission from MIDI data stored in the input data FIFO 52b in MIDI input interruption processing (which will be described below with FIG. 12B) to the different wireless communication device 1.

In the transmission packet generation processing, first, it is confirmed whether there is MIDI data at the reading position of the input data FIFO 52b (S120). The reading position of the input data FIFO 52b is provided in each of the communication A and the communication B, but it is confirmed whether or not MIDI data is present in the input data FIFO 52b at the reading position thereof set in the processing of S100 or in the processing of S106 (which will be described below). In the following transmission packet generation processing, "the reading position" indicates the reading position set in the processing of S100 immediately before the transmission packet generation processing is executed or the processing of S106 (which will be described below). In the processing of S120, when there is MIDI data at the reading position of the input data FIFO 52b (S120: Yes), the MIDI data is acquired (S121).

After the processing of S121, it is confirmed whether the ID of the acquired MIDI data is larger than the ID of the transmitted ID memory 52i (S122). In the processing of S122, when the ID of the acquired MIDI data is larger than the ID of the transmitted ID memory 52i (S122: Yes), it is possible to judge that MIDI data has not yet been transmitted in the input data FIFO 52b. Therefore, a packet is generated (S123). Specifically, the ID of the acquired MIDI data is set as an ID of the packet, and the acquired MIDI data is set as actual data of the packet.

After the processing of S123, the packet generated in the processing of S123 is added to the transmission FIFO (S124). After the processing of S124, the reading position of the input data FIFO 52b is caused to proceed by 1 (S125), and the processing of S120 and thereafter is repeated.

In the processing of S122, when the ID of the acquired MIDI data is equal to or smaller than the ID of the transmitted ID memory 52i (S122: No), it is possible to judge that the acquired MIDI data is MIDI data which has already been transmitted. Therefore, the processing of S123 and S124 is skipped. Accordingly, a situation in which MIDI data which has been transmitted is transmitted again can be curbed.

In the processing of S120, when there is no MIDI data at the reading position of the input data FIFO 52b (S120: No), it is possible to judge that a packet is generated from all the MIDI data within the input data FIFO 52b. Therefore, the transmission packet generation processing ends.

Figure 12B:
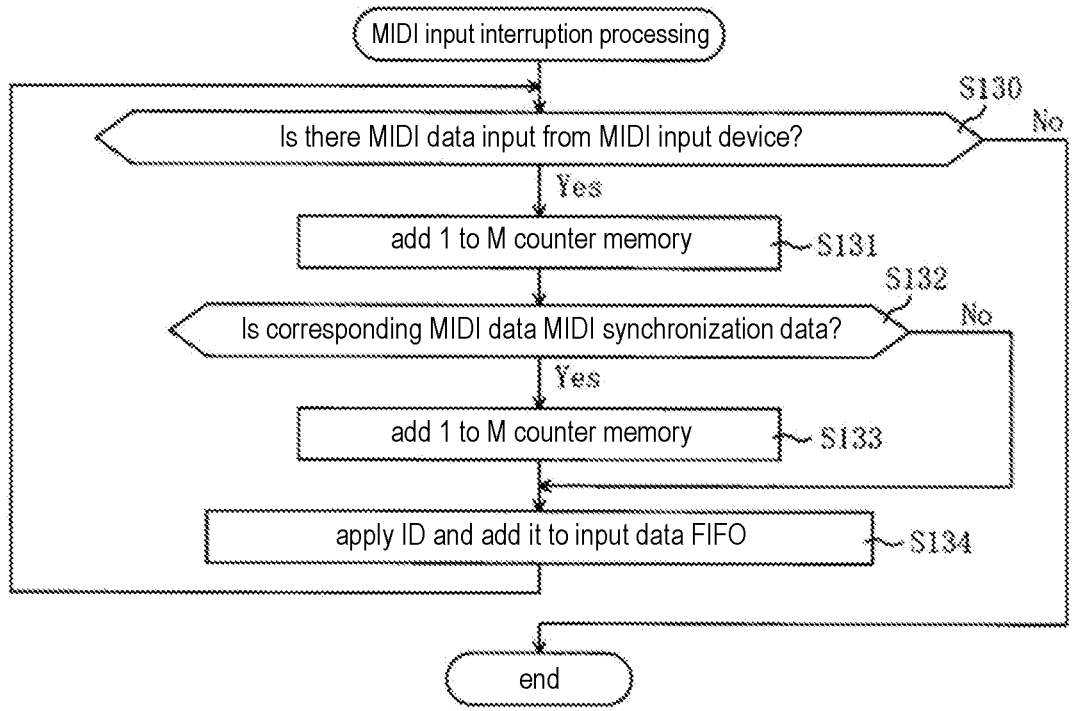
FIG. 12B is a flowchart of MIDI input interruption processing.

Here, with reference to FIG. 12B, the MIDI input interruption processing will be described. The MIDI input interruption processing is interruption processing executed when data is input from the input terminal 3, and it is processing in which MIDI data input from the input terminal 3 is added to the input data FIFO 52b.

In the MIDI input interruption processing, first, it is confirmed whether there is MIDI data input from the input terminal 3 (S130). In the processing of S130, when there is MIDI data input from the input terminal 3 (S130: Yes), 1 is added to the M counter memory 52q (S131).

After the processing of S131, it is confirmed whether MIDI data in S130 is data related to MIDI synchronization (S132). Similar to the foregoing processing of S54 in FIG. 7A, data related to MIDI synchronization includes "a MIDI timing clock (F8H)" or "a MIDI time code quarter frame (F1H)" as an example. In the processing of S132, when the MIDI data is data related to MIDI synchronization (S132: Yes), 1 is added to the M counter memory 52q (S133). When the MIDI data is not data related to MIDI synchronization (S132: No), the processing of S133 is skipped.

When MIDI data is input from the input terminal 3, the MIDI data is transmitted through the wireless module 5. That is, if a larger amount of MIDI data is input from the input terminal 3, the transmission frequency through the wireless module 5 increases. In such a case, a subsequent communication mode can be preferentially changed to the master mode in master-slave decision processing (which will be described below with FIG. 18B) by performing addition to the M counter memory 52q.

In addition, since the data related to MIDI synchronization is data related to tempo, when MIDI data from the input terminal 3 includes the data related to MIDI synchronization, it is expected that the data related to MIDI synchronization is frequently input from the input terminal 3 and transmitted through the wireless module 5. Thus, when MIDI data from the input terminal 3 includes the data related to MIDI synchronization, the subsequent communication mode can be more preferentially changed to the master mode by further performing addition to the M counter memory 52q.

After the processing of S132 and 5133, MIDI data acquired in the processing of S130 is added to the input data FIFO 52b after an ID is applied thereto (S134), and the processing of S130 and thereafter is repeated. The ID applied in the processing of S134 is a number which is uniquely allocated to each piece of MIDI data input to the input terminal 3. More specifically, integers in an ascending order are allocated as IDs in an order of arrival of MIDI data input to the input terminal 3.

In the processing of S130, when there is no MIDI data input from the input terminal 3, or when all the MIDI data input in the processing of S134 is added to the input data FIFO 52b, the MIDI input interruption processing ends.

Returning to FIG. 11, after the transmission packet generation processing of S101, the communication A packet transmission registration processing (S102) is performed. Here, the communication A packet transmission registration processing will be described with reference to FIG. 13.

Figure 13:
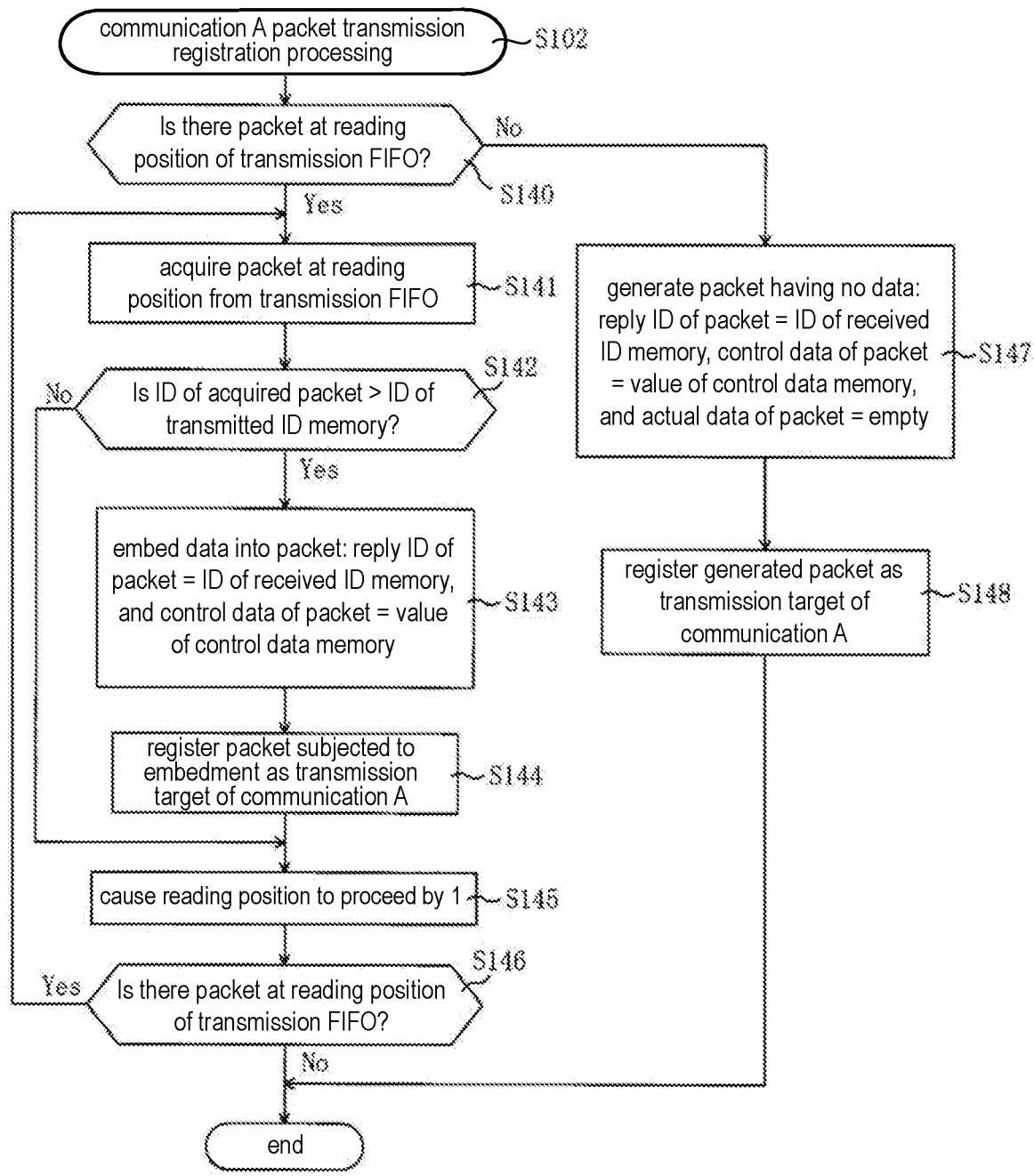
FIG. 13 is a flowchart of communication A packet transmission registration processing.

FIG. 13 is a flowchart of the communication A packet transmission registration processing. In the communication A packet transmission registration processing, first, it is confirmed whether there is a packet at the reading position of the transmission FIFO (S140). In the processing of S140, when there is a packet at the reading position of the transmission FIFO (S140: Yes), the packet is acquired (S141). After the processing of S141, it is confirmed whether the ID of the packet acquired in the processing of S141 is larger than the transmitted ID memory 52i (S142).

In the processing of S142, when the ID of the acquired packet is larger than the transmitted ID memory 52i (S142: Yes), it is possible to judge that the corresponding packet is a packet which has not yet been transmitted. Therefore, data is embedded into the acquired packet (S143). Specifically, the value of the received ID memory 52j is set as the reply ID of the packet, and the value of the control data memory 52n is set as control data of the acquired packet.

Accordingly, the ID of the packet received from the different wireless communication device 1 and the foregoing control data such as information of turning-on and turning-off of the LED 6 stored in the control data memory 52n can be transmitted to the different wireless communication device 1 via the communication A. In the different wireless communication device 1, it is possible to confirm that the transmitted MIDI data has reliably arrived by confirming the reply ID of the received packet. In addition, the information of turning-on, turning-off, or the like of the LED 6 can be executed on the basis of the control data of the received packet.

After the processing of S143, the packet in which embedment has been performed in S143 is registered as a transmission target of the communication A (S144). The packet registered as a transmission target of the communication A is transmitted to the different wireless communication device 1 every 7.5 milliseconds.

In the processing of S142, when the ID of the acquired packet is equal to or smaller than the transmitted ID memory 52i (S142: No), it is possible to judge that a corresponding packet has already been transmitted. Therefore, the processing of S143 and S144 is skipped. After the processing of S142 and S144, the reading position of the transmission FIFO is caused to proceed by 1 (S145), and it is confirmed whether there is a packet at the reading position (S146). In the processing of S146, when there is a packet (S146: Yes), the processing of S141 and thereafter is repeated.

In the processing of S140, when there is no packet at the reading position of the transmission FIFO (S140: No), there is no need to transmit MIDI data based on the input terminal 3, but there is a need to transmit each value of the received ID memory 52j and the control data memory 52n to the different wireless communication device 1 and to make an opportunity for a reply from the different wireless communication device 1. Therefore, a packet having no data is transmitted.

Specifically, the value of the received ID memory 52j is set as the reply ID, the value of the control data memory 52n is set as control data, and a packet in which an empty value is set as actual data is generated (S147). After the processing of S147, similar to the processing of S144, the packet having no data generated in the processing of S148 is registered as a transmission target of the communication A (S148). In the processing of S146, when there is no packet at the reading position of the transmission FIFO (S146: No), or after the processing of S148, the communication A packet transmission registration processing ends.

Figure 14:
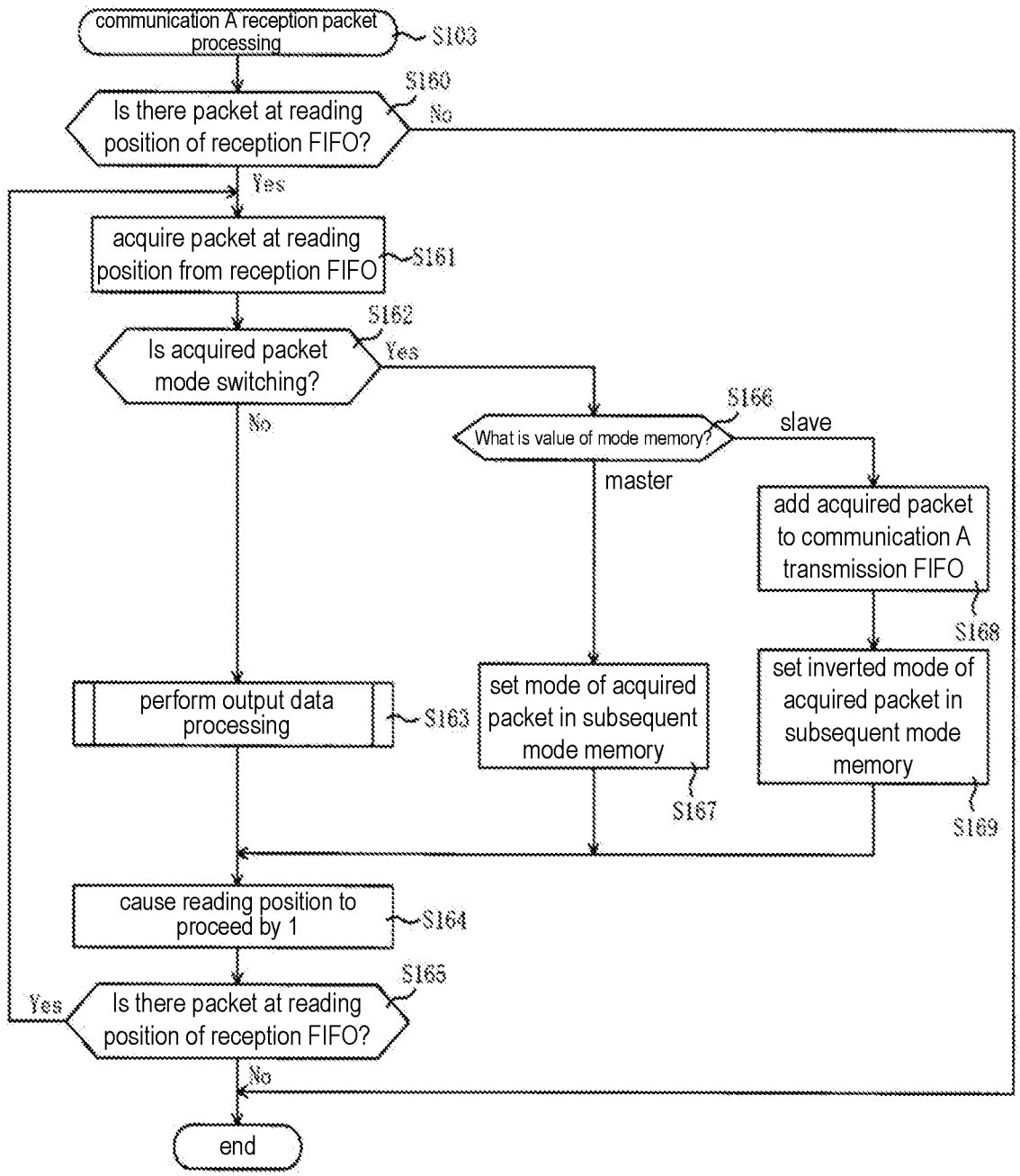
FIG. 14 is a flowchart of communication A reception packet processing.
Figure 15A:
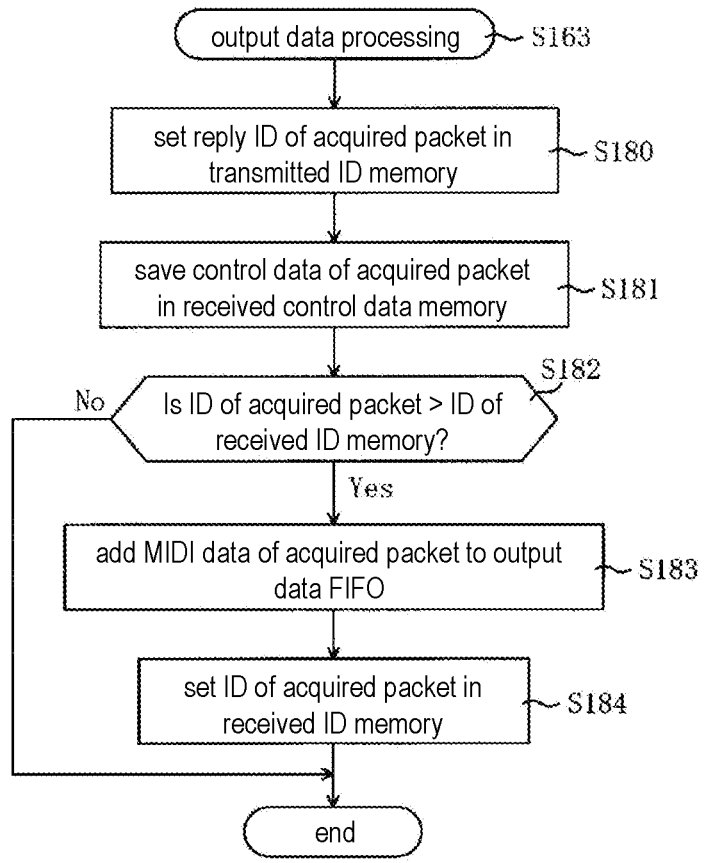
FIG. 15A is a flowchart of output data processing.
Figure 15B:
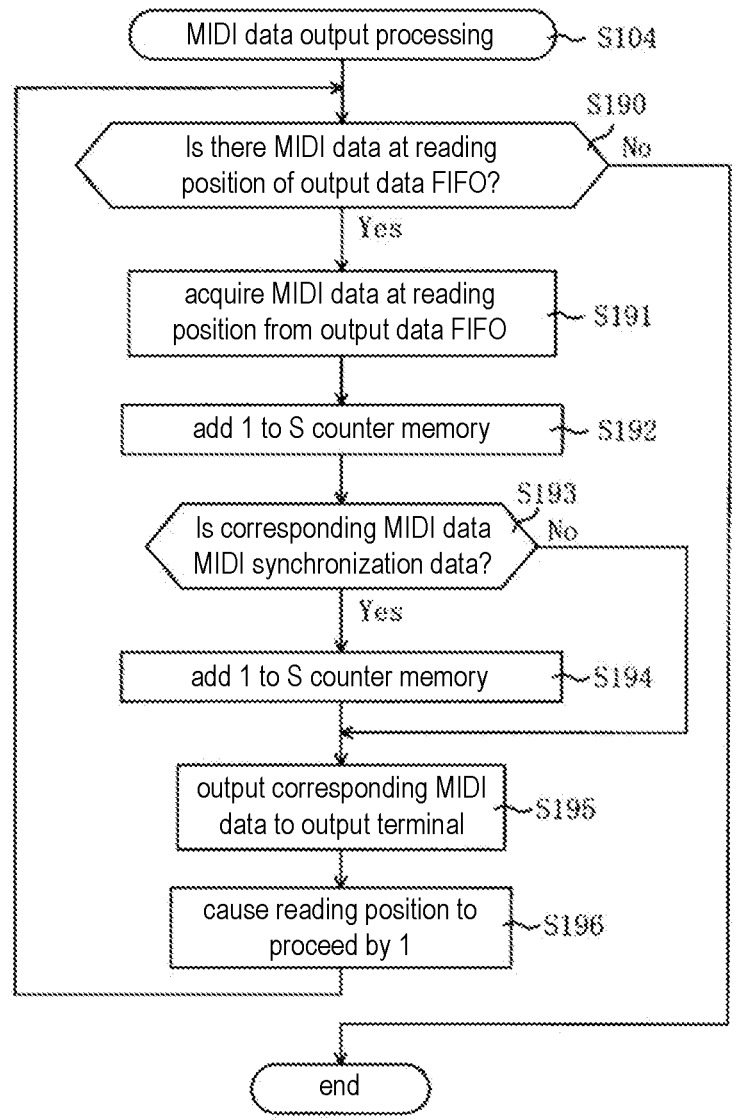
FIG. 15B is a flowchart of MIDI data output processing.

Returning to FIG. 11, after the communication A packet transmission registration processing of S102, communication A reception packet processing (S103) is performed. With reference to FIGS. 14, 15A and 15B, the communication A reception packet processing and the interruption processing performed when a packet is received by the communication A will be described.

When a packet is received by the communication A, the received packet is added to the reception FIFO in the interruption processing. The packet added to the reception FIFO in the communication A reception interruption processing is processed in the communication A reception packet processing in FIG. 14.

FIG. 14 is a flowchart of the communication A reception packet processing. In the communication A reception packet processing, first, it is confirmed whether there is a packet at the reading position of the reception FIFO (S160). In the processing of S160, when there is a packet at the reading position of the reception FIFO (S160: Yes), the packet is acquired (S161). After the processing of S161, it is confirmed whether the kind of the acquired packet is mode switching (S162). In the present embodiment, there are provided two kinds of packets, such as a packet storing the foregoing MIDI data and a packet related to mode switching transmitted and received for switching between the communication modes.

In the processing of S162, when the acquired packet is a packet related to MIDI data (S162: No), output data processing is performed (S163). Here, with reference to FIG. 15A, the output data processing will be described.

FIG. 15A is a flowchart of the output data processing. In the output data processing, first, the reply ID of the acquired packet is set in the transmitted ID memory 52i (S180). Accordingly, the ID of a packet transmitted to the different wireless communication device 1 (a packet processed by the different wireless communication device 1), that is, a packet which has been transmitted is set in the transmitted ID memory 52i.

After the processing of S180, control data of the acquired packet is set in the received control data memory 52p (S181). After the processing of S181, it is confirmed whether the ID of the acquired packet is larger than the ID of the received ID memory 52j (S182).

In the processing of S182, when the ID of the acquired packet is larger than the ID of the received ID memory 52j (S182: Yes), it is possible to judge that it is a packet which has not yet been acquired. Therefore, MIDI data of the acquired packet is added to the output data FIFO 52c (S183), and the ID of the acquired packet is set in the received ID memory 52j (S184).

On the other hand, in the processing of S182, when the ID of the acquired packet is smaller than or equal to the ID of the received ID memory 52j (S182: No), it is a packet which has already been acquired. Therefore, the processing of S183 and S184 is skipped. After the processing of S182 and S184, the output data processing ends.

Returning to FIG. 14, in the processing of S162, when the acquired packet is mode switching (S162: Yes), the value of the mode memory 52a is confirmed (S166). In the processing of S166, when the value of the mode memory 52a is the master mode (S166: master mode), the communication mode stored in the acquired packet is set in the subsequent mode memory 51b (S167).

On the other hand, in the processing of S166, when the value of the mode memory 52a is the slave mode (S166: slave mode), the acquired packet is added to the communication A transmission FIFO 52d (S168), and an inverted mode of the communication mode stored in the acquired packet is set in the subsequent mode memory 51b (S169). Specifically, when the communication mode stored in the acquired packet is the master mode, the slave mode is set in the subsequent mode memory 51b. When the communication mode stored in the acquired packet is the slave mode, the master mode is set in the subsequent mode memory 51b.

Accordingly, the communication mode set in the mode switching packet set in the master-slave decision processing (which will be described below with FIG. 18B) is set in the subsequent mode memory 51b.

After the processing of S163, S167, and S169, the reading position of the reception FIFO is caused to proceed by 1 (S164), it is confirmed whether there is a packet at the reading position (S165). When there is a packet in the processing of S165 (S165: Yes), the processing of S161 and thereafter is repeated. When there is no packet (S165: No), the communication A reception packet processing ends, and the procedure returns to the communication processing in FIG. 11.

After the communication A reception packet processing of S103, MIDI data output processing (S104) is executed. Here, with reference to FIG. 15B, the MIDI data output processing will be described.

FIG. 15B is a flowchart of the MIDI data output processing. The MIDI data output processing is processing in which MIDI data stored in the output data FIFO 52c is output to the output terminal 8. In the MIDI data output processing, first, it is confirmed whether there is MIDI data at the reading position of the output data FIFO 52c (S190).

In the processing of S190, when there is MIDI data at the reading position of the output data FIFO 52c (S190: Yes), the MIDI data at the reading position is acquired (S191). After the processing of S191, 1 is added to the S counter memory 52r (S192), and it is confirmed whether MIDI data acquired in the processing of S191 is data related to MIDI synchronization (S193). Similar to the foregoing processing of S54 in FIG. 9A, data related to MIDI synchronization includes "a MIDI timing clock (F8H)" or "a MIDI time code quarter frame (F1H)" as an example.

In the processing of S193, when the MIDI data is data related to MIDI synchronization (S193: Yes), 1 is added to the S counter memory 52r (S194). When the MIDI data is not data related to MIDI synchronization (S193: No), the processing of S194 is skipped.

When MIDI data is output to the output terminal 8, the MIDI data is received through the wireless module 5. That is, if a larger amount of MIDI data is output to the output terminal 8, the reception frequency through the wireless module 5 increases. In such a case, the communication mode can be preferentially changed to the slave mode in the master-slave decision processing (which will be described below with FIG. 18B) by performing addition to the S counter memory 52r.

In addition, when output MIDI data includes data related to MIDI synchronization, it is expected that the data related to MIDI synchronization is frequently received from the wireless module 5. Thus, when output MIDI data includes the data related to MIDI synchronization, the communication mode can be more preferentially changed to the slave mode by further performing addition to the S counter memory 52r.

After the processing of S193 and S194, MIDI data acquired in the processing of S191 is output to the output terminal 8 (S195), the reading position of the output data FIFO 52c is caused to proceed by 1 (S196), and the processing of S190 and thereafter is repeated.

In the processing of S190, when there is no MIDI data at the reading position of the output data FIFO 52c (S190: No), the MIDI data output processing ends.

Returning to FIG. 11, after the MIDI data output processing of S104, the frequency used for communication by the communication A is acquired and is set as a frequency to be used for communication by the communication B (S105). In the communication A, the frequency used for wireless communication is timely (for example, each time of communication, regularly) changed. Accordingly, even if a different communication device using a frequency similar to the frequency used for the communication A is operated in the vicinity of the wireless communication device 1, wireless communication by the communication A can be performed without having crosstalk with a different communication device.

Even in the communication B performed during an intermission between the communications A, wireless communication by the communication B can be achieved without having crosstalk with a different communication device similar to the communication A by using the same frequency as that in the immediately preceding communication A. In addition, there is no need to determine and separately manage the frequency used for the communication B. Therefore, a processing load on the wireless communication device 1 can be reduced and wireless communication by the communication B can be easily established.

After the processing of S105, in order to transmit and receive MIDI data by the communication B, the communication B transmission FIFO 52f is set as a transmission FIFO, the communication B reception FIFO 52g is set as a reception FIFO, and the reading position of the input data FIFO 52b is set for the communication B (S106). After the processing of S106, the foregoing transmission packet generation processing of the S101 in FIG. 12A is performed. Accordingly, a packet transmitted by the communication B is added to the transmission FIFO, that is, the communication B transmission FIFO 52f.

At this time, the reading position referred to in the input data FIFO 52b is individually provided in the communication A and the communication B. Accordingly, in the transmission packet generation processing individually executed in the communication A and the communication B, multiple packets can be prepared from the same input data FIFO 52b and can be transmitted to the different wireless communication device 1. Moreover, in the transmission packet generation processing, MIDI data of the IDs and thereafter stored in the transmitted ID memory 52i in the processing of S122, that is, the packets based on MIDI data which has been transmitted is not added to the transmission FIFO. Therefore, retransmission of MIDI data which has been transmitted is curbed. Accordingly, execution of useless wireless communication can be curbed.

After the transmission packet generation processing of S101, the value of the mode memory 52a is confirmed (S107). In the processing of S107, when the value of the mode memory 52a is the master mode (S107: master mode), it is acquired whether there is a spare time of 2 milliseconds or longer before a subsequent communication A (S108). As described above, communication by the communication A is performed every 7.5 milliseconds. Therefore, in the processing of S108, it is acquired whether or not there are 2 milliseconds or longer from a current time until the subsequent communication A is executed.

After the processing of S108, it is confirmed whether the acquired spare time is 2 milliseconds or longer (S109). In the processing of S109, when there is a spare time of 2 milliseconds or longer (S109: Yes), it is judged that transmission and reception can be performed by the communication B. In such a case, first, the communication B packet transmission/reception processing is performed (S110). Here, with reference to FIGS. 16 and 17, the communication B packet transmission/reception processing will be described.

Figure 16:
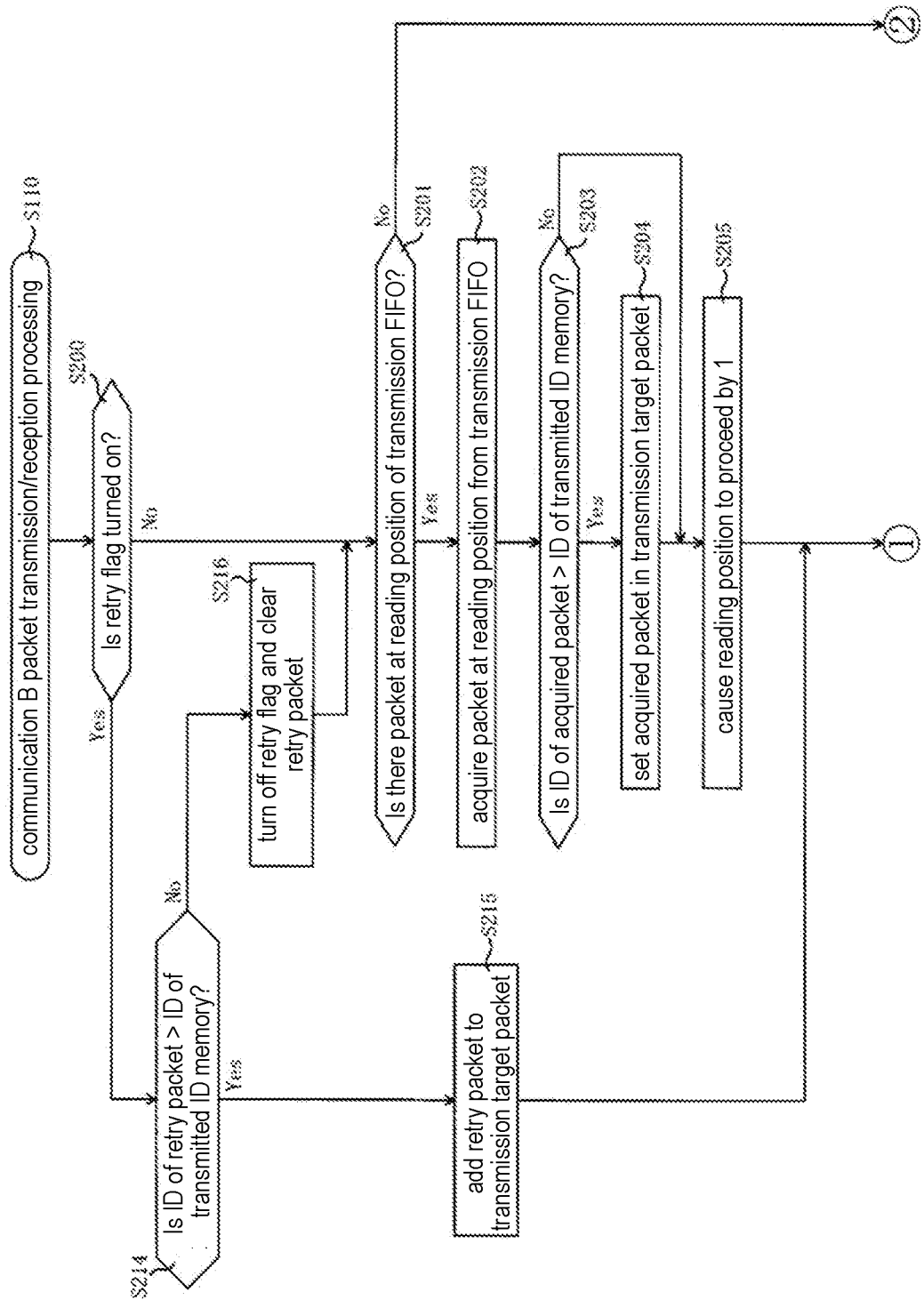
FIG. 16 is a view illustrating a portion of a flowchart of communication B packet transmission/reception processing.
Figure 17:
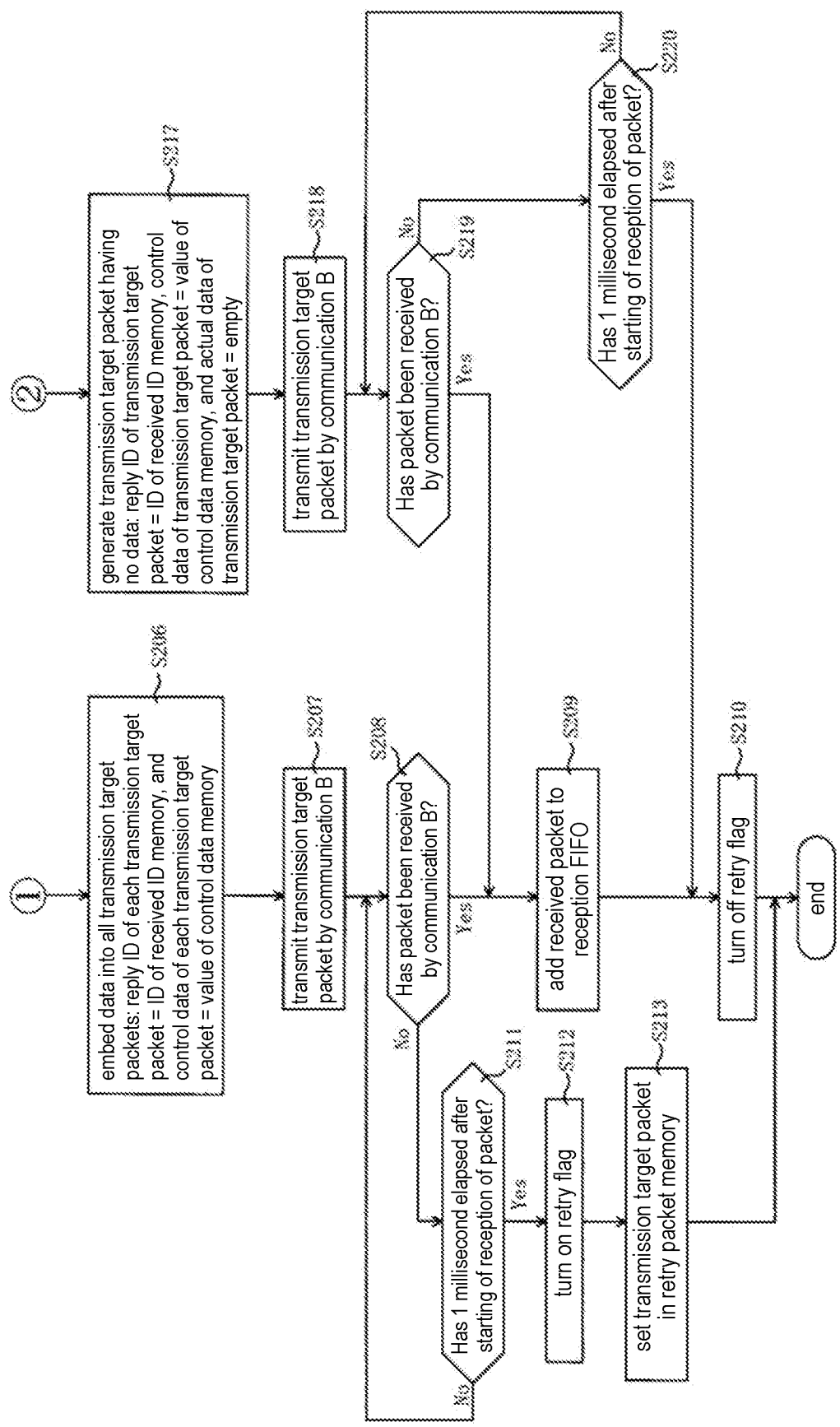
FIG. 17 is a view illustrating another portion of the flowchart of the communication B packet transmission/reception processing.

FIGS. 16 and 17 are flowcharts of the communication B packet transmission/reception processing. In the communication B packet transmission/reception processing, first, it is confirmed whether the retry flag 52k has been turned on (S200, FIG. 16). In the processing of S200, when the retry flag 52k is turned off (S200: No), packet transmission is not being retried in the processing of S214 and 5215 (FIG. 16, which will be described below). Therefore, it is confirmed whether there is a packet in the reading position of the transmission FIFO (S201).

In the processing of S201, when there is a packet at the reading position of the transmission FIFO (S201: Yes), the packet is acquired (S202). After the processing of S202, it is confirmed whether the ID of the packet acquired in the processing of S202 is larger than the ID of the transmitted ID memory (S203). In the processing of S203, when the ID of the acquired packet is larger than the ID of the transmitted ID memory (S203: Yes), the acquired packet is set as a packet (transmission target) by the communication B (S204). In the processing of S203, when the ID of the acquired packet is equal to or smaller than the ID of the transmitted ID memory (S203: No), the processing of S204 is skipped. After the processing of S203 and 5204, the reading position of the transmission FIFO is caused to proceed by 1 (S205).

After the processing of S205, data is embedded into the packet (transmission target) (FIG. 17, S206). Specifically, the value of the received ID memory 52j is set as a reply ID of a packet (transmission target), and the value of the control data memory 52n is set as control data of the packet (transmission target). Accordingly, the ID of the packet received from the different wireless communication device 1 and the foregoing control data such as information of turning-on and turning-off of the LED 6 stored in the control data memory 52n can be transmitted to the different wireless communication device 1 via the communication B.

After the processing of S206, the packet (transmission target) is transmitted to the different wireless communication device 1 using the communication B (S207). After the processing of S207, transmission of the packet in the processing of S207 is received by the communication B, and it is confirmed whether a packet from the different wireless communication device 1 has been received (S208).

In the processing of S208, when the packet has been received by the communication B (S208: Yes), the received packet is added to the reception FIFO (S209). After the processing of S209, the retry flag 52k is set to be turned off (S210).

On the other hand, in the processing of S208, when no packet has been received by the communication B (S208: No), it is confirmed whether 1 millisecond has elapsed after starting of standby for receiving a packet by the communication B in the processing of S208 (S211). Since it is assumed that a time after a packet in the processing of S207 is transmitted until a packet transmitted by the different wireless communication device 1 is received upon reception of the packet is 1 millisecond at the longest. Therefore, it is confirmed whether 1 millisecond has elapsed after starting of standby for receiving a packet by the communication B in the processing of S208 thereafter.

In the processing of S211, when 1 millisecond has elapsed after starting of standby for receiving a packet by the communication B of S208 (S211: Yes), it is judged that transmission processing in the processing of S207 has failed or a packet is transmitted to the different wireless communication device 1 in the processing of S207 but a reply from the different wireless communication device 1 to the host device has failed. In such a case, in order to retransmit the packet (transmission target) transmitted in the processing of S207, the retry flag 52k is set to be turned on (S212), and the packet (transmission target) transmitted in the processing of S207 is set as the retry packet data 52m (S213).

On the other hand, in the processing of S211, when 1 millisecond has not elapsed after starting of standby for receiving a packet by the communication B of S208 (S211: No), the processing of S208 is repeated.

Further, in the processing of S200 in FIG. 16, when the retry flag 52k is turned on (S200: Yes), it is confirmed whether the ID of the packet included in the retry packet data 52m is larger than the ID of the transmitted ID memory 52i (S214). That is, there are also cases in which a packet is stored in the retry packet data 52m but the same packet is transmitted by the communication A thereafter. Therefore, it is confirmed whether the packet of the retry packet data 52m has not yet been transmitted.

In the processing of S214, when the ID of the packet included in the retry packet data 52m is larger than the ID of the transmitted ID memory 52i (S214: Yes), the packet included in the retry packet data 52m is set as the packet (transmission target) (S215), and the processing of S206 in FIG. 17 and thereafter is executed. Accordingly, in the processing of S211 to 5213 in FIG. 17, a packet which is judged to fail to be transmitted can be retransmitted to the different wireless communication device 1. When the retransmission also fails, retransmission in the processing of S211 to 5213 in FIG. 17 is performed again. Therefore, the packet of the transmission FIFO can be reliably transmitted to the different wireless communication device 1.

On the other hand, in the processing of S214, when the ID of the packet included in the retry packet data 52m is equal to or smaller than the ID of the transmitted ID memory 52i (S214: No), this denotes that the same packet as the retry packet data 52m has already been transmitted by the communication A. Therefore, in order to prevent the packet of the retry packet data 52m from being retransmitted, the retry flag 52k is set to be turned off and the retry packet data 52m is cleared (S216), and then the processing of S201 and thereafter is executed.

In addition, in the processing of S201, when there is no packet at the reading position of the transmission FIFO (S201: No), there is no need to transmit MIDI data based on the input terminal 3, but there is a need to transmit the value of the received ID memory 52j and the value of the control data memory 52n to the different wireless communication device 1 and also make an opportunity for a reply from the different wireless communication device 1. Therefore, a packet having no data is transmitted. Specifically, the value of the received ID memory 52j is set as the reply ID, the value of the control data memory 52n is set as control data, and a packet having no data in which an empty value is set as actual data is generated (FIG. 17, S217). After the processing of S217, the packet having no data generated in the processing of S217 is transmitted to the different wireless communication device 1 using the communication B (S218).

After the processing of S218, it is confirmed whether a packet from the different wireless communication device 1 has been received by the communication B (S219). In the processing of S219, when a packet has been received by the communication B (S219: Yes), the processing of S209 and thereafter is executed.

On the other hand, in the processing of S219, when no packet has been received by the communication B (S219: No), it is confirmed whether 1 millisecond has elapsed after starting of standby for receiving a packet by the communication B of S219 (S220). In the processing of S220, when 1 millisecond has elapsed after starting of standby for receiving a packet by the communication B of S219 (S220: Yes), the processing of S210 and thereafter is executed.

That is, when a packet having no data fails to be transmitted, the packet is not retransmitted. Accordingly, a packet having no data is not repeatedly retransmitted. Therefore, when a packet is added to the transmission FIFO, the packet can be quickly transmitted to the different wireless communication device 1 on the slave mode side.

After the processing of S210 and 5213, the communication B packet transmission/reception processing ends.

Returning to FIG. 11, after the communication B packet transmission/reception processing of S110, communication B reception packet processing (S111) is executed. Here, with reference to FIG. 18A, the communication B reception packet processing will be described.

Figure 18A:
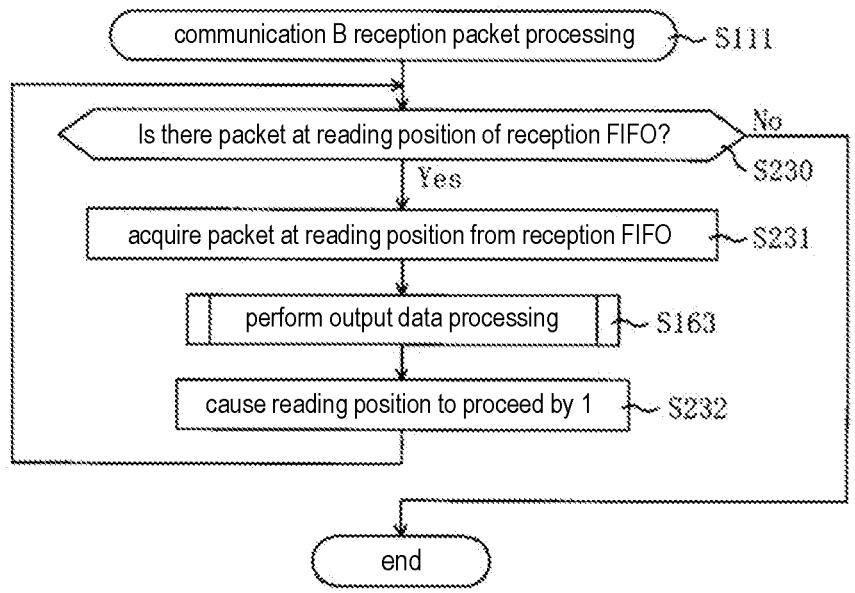
FIG. 18A is a flowchart of communication B reception packet processing.

FIG. 18A is a flowchart of the communication B reception packet processing. In the communication B reception packet processing, first, it is confirmed whether there is a packet at the reading position of the reception FIFO (S230). In the processing of S230, when there is a packet at the reading position of the reception FIFO (S230: Yes), the packet is acquired (S231). After the processing of S231, the output data processing of S163 (FIG. 15A) is executed. After the output data processing of S163, the reading position of the reception FIFO is caused to proceed by 1 (S232), and the processing of S230 and thereafter is repeated.

In the processing of S230, when there is no packet at the reading position of the reception FIFO (S230: No), the communication B reception packet processing ends.

Returning to FIG. 11, after the communication B reception packet processing of S111, the MIDI data output processing of S104 (FIG. 15B) is performed. Accordingly, MIDI data received by the communication B is output from the output terminal 8. After the MIDI data output processing of S104, the processing of S108 and thereafter is repeated.

In the processing of S109, when a spare time is shorter than 2 milliseconds (S109: No), it is judged that transmission and reception by the communication B cannot be performed. Therefore, without transmitting and receiving a packet in the communication B packet transmission/reception processing of S110, the communication B reception packet processing of S111 which is processing with respect to the reception FIFO is performed, and the master-slave decision processing (S112) is performed thereafter. Here, with reference to FIG. 18B, the master-slave decision processing will be described.

Figure 18B:
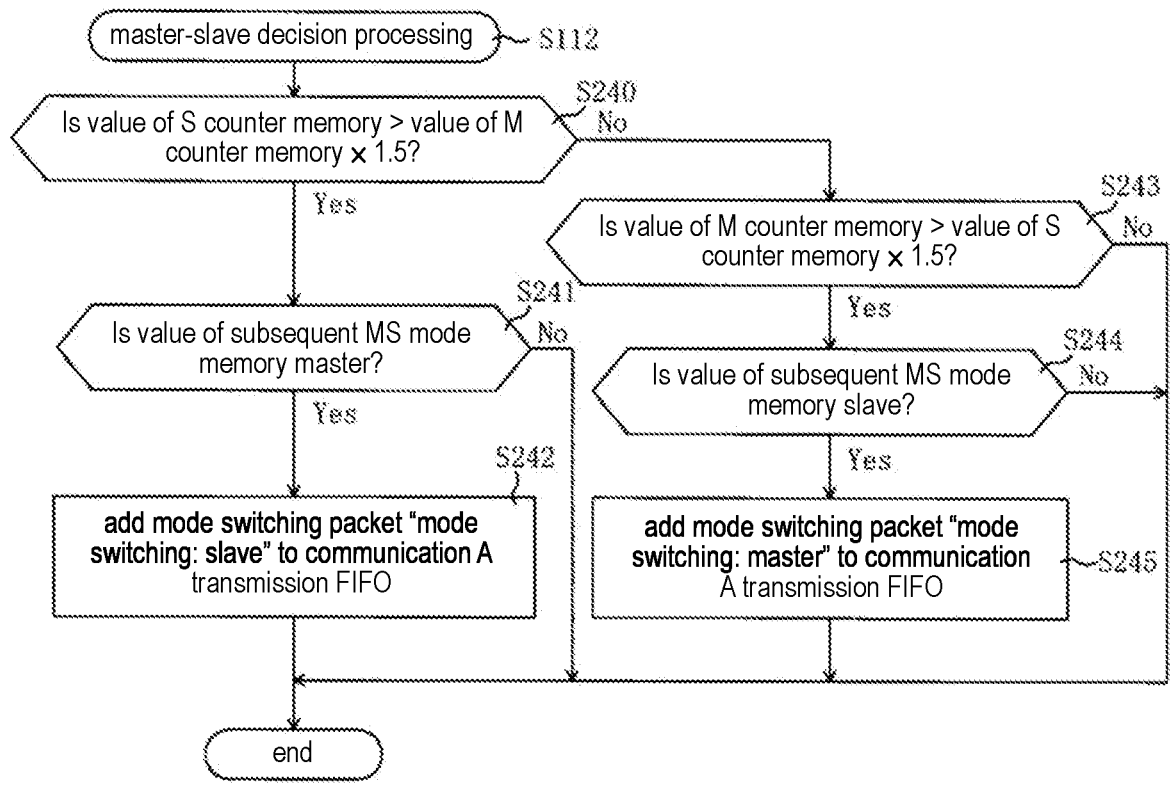
FIG. 18B is a flowchart of master-slave decision processing.

FIG. 18B is a flowchart of the master-slave decision processing. The master-slave decision processing is processing in which the communication mode is determined on the basis of the values of the M counter memory 52$q$ and of the S counter memory 52$r$ set in the MIDI input interruption processing in FIG. 12B and the MIDI data output processing in FIG. 15B and the foregoing mode switching packet is generated on the basis of the communication mode.

In the master-slave decision processing, first, it is confirmed whether the value of the S counter memory 52$r$ is larger than a value obtained by multiplying the value of the M counter memory 52$q$ by 1.5 (S240). In the processing of S240, when the value of the S counter memory 52$r$ is larger than a value obtained by multiplying the value of the M counter memory 52$q$ by 1.5 (S240: Yes), the value of the S counter memory 52$r$ is sufficiently larger than the value of the M counter memory 52$q$, that is, an output of MIDI data to the output terminal 8 is sufficiently larger than an input of MIDI data from the input terminal 3. Therefore, the communication mode is ought to be the slave mode in this case.

In such a case, it is confirmed whether the value of the subsequent mode memory 51$b$ is the master mode (S241). When the value of the subsequent mode memory 51$b$ is the master mode (S241: Yes), a mode switching packet indicating that the communication mode is changed to the slave mode is added to the communication A transmission FIFO 52$d$ (S242). On the other hand, when the value of the subsequent mode memory 51$b$ is the slave mode in the processing of S241 (S241: No), the processing of S242 is skipped.

In the processing of S240, when the value of the S counter memory 52$r$ is equal to or smaller than a value obtained by multiplying the value of the M counter memory 52$q$ by 1.5 (S240: No), it is confirmed whether the value of the M counter memory 52$q$ is larger than a value obtained by multiplying the value of the S counter memory 52$r$ by 1.5 (S243). In the processing of S243, when the value of the M counter memory 52$q$ is larger than a value obtained by multiplying the value of the S counter memory 52$r$ by 1.5 (S243: Yes), the value of the M counter memory 52$q$ is sufficiently larger than the value of the S counter memory 52$r$, that is, an input of MIDI data from the input terminal 3 is sufficiently larger than an output of MIDI data to the output terminal 8. Therefore, the communication mode is ought to be the master mode in this case.

In such a case, it is confirmed whether the value of the subsequent mode memory 51$b$ is the slave mode (S244). When the value of the subsequent mode memory 51$b$ is the slave mode (S244: Yes), a mode switching packet indicating that the communication mode is changed to the master mode is added to the communication A transmission FIFO 52$d$ (S245). On the other hand, when the value of the subsequent mode memory 51$b$ is the master mode in the processing of S244 (S244: No), the processing of S245 is skipped.

In addition, in the processing of S243, when the value of the M counter memory 52$q$ is equal to or smaller than a value obtained by multiplying the value of the S counter memory 52$r$ by 1.5 (S243: No), a difference between the value of the M counter memory 52$q$ and the value of the S counter memory 52$r$ is small, and there is no need to change the communication mode. Therefore, the processing of S244 and 5245 is skipped. Further, after the processing of S241 to S245, the master-slave decision processing ends.

In the master-slave decision processing, the communication mode is changed from the communication mode determined in the mode determination processing in FIGS. 5A to 5D on the basis of the value of the M counter memory 52$q$ and the value of the S counter memory 52$r$, that is, an input of MIDI data from the input terminal 3 and an output of MIDI data to the output terminal 8. Accordingly, when the power supply of the wireless communication device 1 is turned on next time or when returning from a sleep, the communication mode is reset in accordance with the current communication circumstances of the wireless communication device 1. Therefore, the efficiency of wireless communication of the wireless communication device 1 can be improved.

Returning to FIG. 11, after the master-slave decision processing of S112, the MIDI data output processing in S104 (FIG. 15B) is executed.

In the processing of S107, when the value of the mode memory 52a is the slave mode (S107: slave mode), the communication B reception packet processing of S111 and the MIDI data output processing of S114 are performed. In the case in which the value of the mode memory 52a is the slave mode, when the packet is received by the communication B, processing of acquiring the received packet or the like is performed in communication B reception interruption processing (interruption processing). Here, with reference to FIG. 19, the communication B reception interruption processing will be described.

Figure 19:
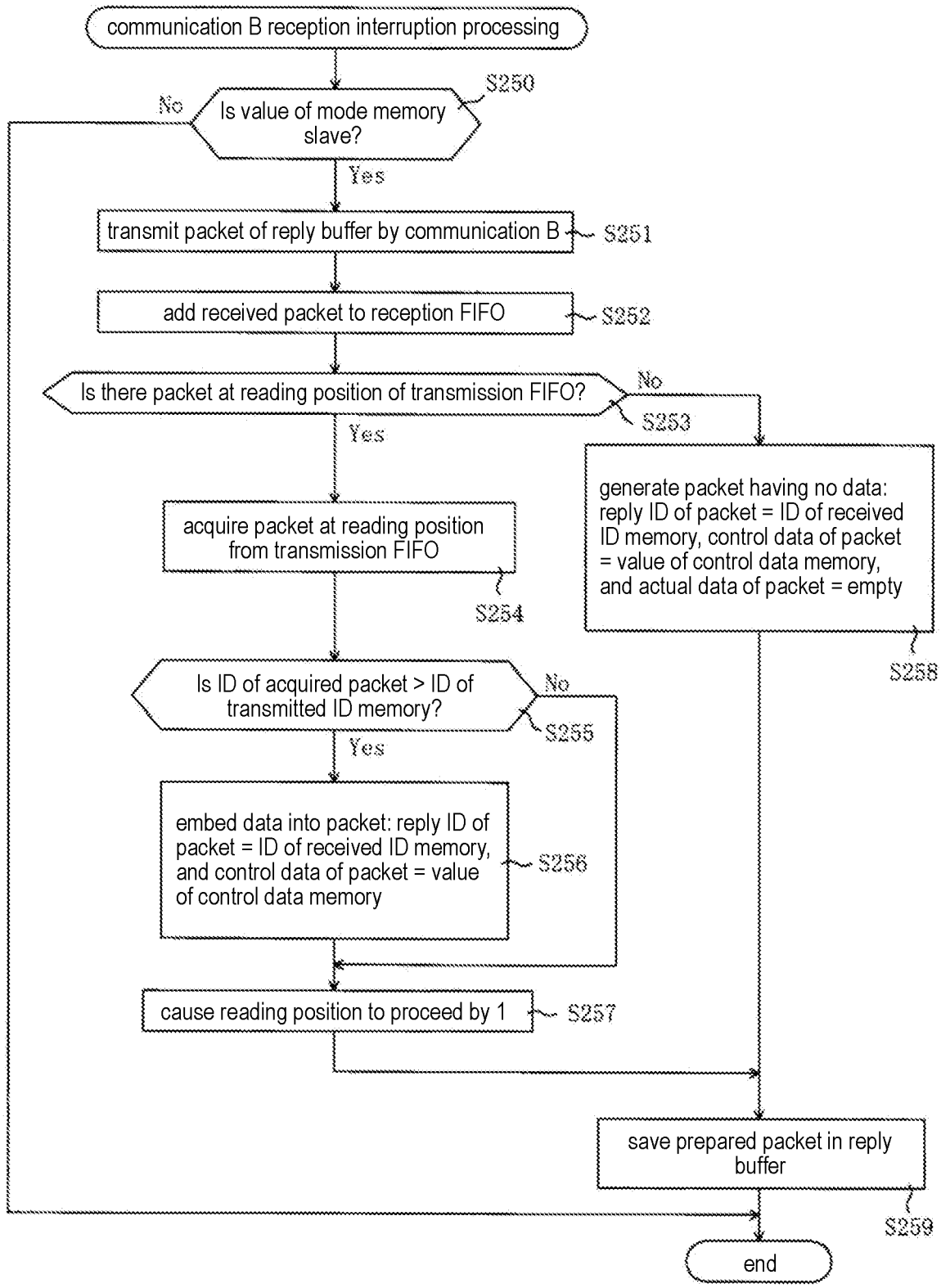
FIG. 19 is a flowchart of communication B reception interruption processing.

FIG. 19 is a flowchart of the communication B reception interruption processing. The communication B reception interruption processing is interruption processing executed when reception by the communication B is performed. In the communication B reception interruption processing, first, it is confirmed whether the value of the mode memory 52a is the slave mode (S250).

In the processing of S250, when the value of the mode memory 52a is the slave mode (S250: Yes), a packet stored in the reply buffer 52h is transmitted by the communication B (S241). The packet stored in the reply buffer 52h is a packet stored in the reply buffer 52h in the processing of S253 to 5261 (which will be described below) in the preceding communication B reception interruption processing.

After the processing of S251, the packet received by the communication B is added to the reception FIFO (S252). After the processing of S252, the packet transmitted in the processing of S251 in the subsequent communication B reception interruption processing is set in the reply buffer 52h. Specifically, after the processing of S252, it is confirmed whether there is a packet at the reading position of the transmission FIFO (S253). In the processing of S253, when there is a packet at the reading position of the transmission FIFO (S253: Yes), the packet is acquired (S254). After the processing of S254, it is confirmed whether the ID of the packet acquired in the processing of S254 is larger than the transmitted ID memory 52i (S255).

In the processing of S255, when the ID of the acquired packet is larger than the transmitted ID memory 52i (S255: Yes), it is judged that the corresponding packet is a packet which has not yet been transmitted. Therefore, data is embedded into the acquired packet (S256). Specifically, the value of the received ID memory 52j is set as the reply ID of the packet, and the value of the control data memory 52n is set as control data of the acquired packet.

In the processing of S255, when the ID of the acquired packet is equal to or smaller than the transmitted ID memory 52i (S255: Yes), it is judged that a corresponding packet has been transmitted. Therefore, the processing of S256 is skipped. After the processing of S255 and 5256, the reading position of the transmission FIFO is caused to proceed by 1 (S257).

In the processing of S253, when there is no packet at the reading position of the transmission FIFO (S253: No), a packet having no data is generated (S258). Specifically, the value of the received ID memory 52j is set as the reply ID, the value of the control data memory 52n is set as control data, and a packet in which an empty value is set as actual data is generated. Further, after the processing of S257 and 5258, the generated packet is saved in the reply buffer 52h (S259) in preparation for the transmission processing of S252 in the subsequent communication B reception interruption processing.

In the processing of S250, when the value of the mode memory 52a is the master mode (S250), the packet received by the communication B is processed in the foregoing communication B packet transmission/reception processing of S110 (FIG. 17). Therefore, the processing of S251 to S259 is skipped. Further, after the processing of S250 and 5259, the communication B reception interruption processing ends.

Returning to FIG. 11, after the MIDI data output processing of S104 executed after the master-slave decision processing of S112 or the communication B reception packet processing of S111 executed in the processing of S107, the communication processing ends.

Returning to FIG. 7A, after the communication processing of S6, slave LED processing (S7) is executed. Here, with reference to FIG. 20A, the slave LED processing will be described.

Figure 20A:
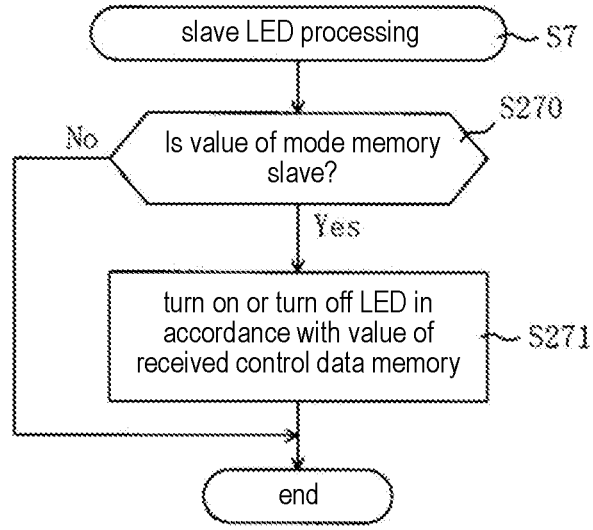
FIG. 20A is a flowchart of slave LED processing.

FIG. 20A is a flowchart of the slave LED processing. In the slave LED processing, first, it is confirmed whether the value of the mode memory 52a is the slave mode (S270). In the processing of S270, when the value of the mode memory 52a is the slave mode (S270: Yes), in accordance with information of turning-on and turning-off of the LED 6 in the received control data memory 52p, the LED 6 is turned on or turned off (S271). In the processing of S270, when the value of the mode memory 52a is the master mode (S270: No) or after the processing of S271, the slave LED processing ends.

Accordingly, a state of turning-on or turning-off of the LED 6 set in the wireless communication device 1 on the master mode side in the master LED processing of S5 is reflected in the wireless communication device 1 on the slave mode side. Accordingly, turning-on or turning-off of the LED 6 of the paired wireless communication devices 1 can be synchronized. Therefore, the paired wireless communication devices 1 can be easily identified.

In addition, an instruction of turning-on or turning-off of the LED 6 from the wireless communication device 1 on the master mode side to the wireless communication device 1 on the slave mode side is included in the received control data memory 52p, that is, control data of a packet for transmitting MIDI data, and it is transmitted. Accordingly, there is no need to transmit a packet by wireless communication in accordance with only an instruction of turning-on or turning-off of the LED 6. Therefore, increase in amount of communication in wireless communication can be curbed.

Figure 20B:
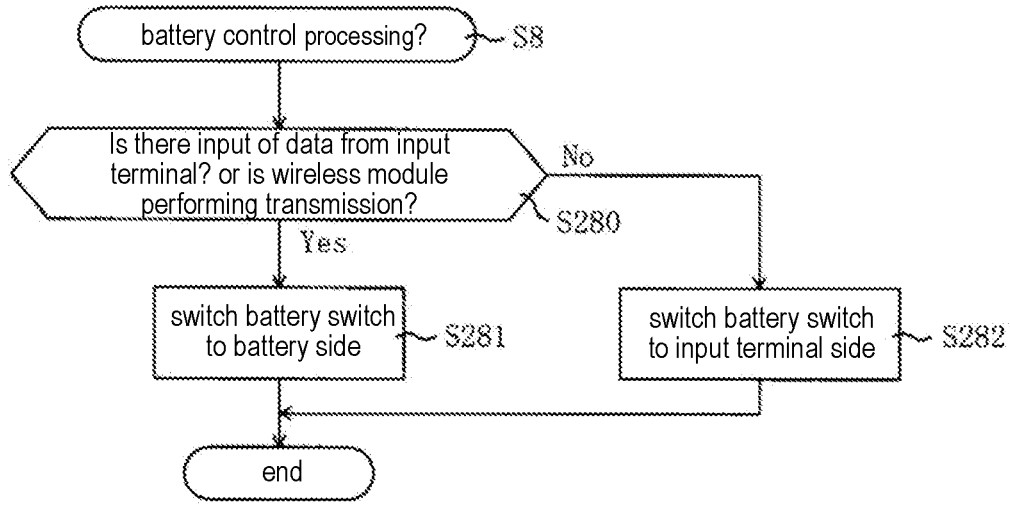
FIG. 20B is a flowchart of battery control processing.

Returning to FIG. 7A, after the slave LED processing of S7, battery control processing (S8) is executed. With reference to FIG. 20B, the battery control processing will be described.

FIG. 20B is a flowchart of the battery control processing. The battery control processing is processing in which the battery switch 10 is controlled in accordance with an input of data from the input terminal 3 and the communication state of the wireless module 5.

In the battery control processing, first, it is confirmed whether data has been input from the input terminal 3 or data is being transmitted through the wireless module 5 (S280). In the processing of S280, when data has been input from the input terminal 3 or data is being transmitted through the wireless module 5 (S280: Yes), the battery switch 10 is switched to the battery B side (that is, the Vb' line 31a in FIG. 6) (S281). When no data has been input from the input terminal 3 and no data is being transmitted through the wireless module 5 (S280: Yes), the battery switch 10 is switched to the input terminal 3 side (that is, the Vm_in line 3a in FIG. 6) (S282). After the processing of S281 and 5282, the battery control processing ends.

Since no data is input from the input terminal 3 and there is no need to perform processing or the like in which the CPU 50 prepares a packet from input data, the control part 4 consumes a small amount of electric power. In addition, when no data is transmitted through the wireless module 5, there is no need to output electromagnetic waves through the wireless module 5. Therefore, even in this case, the control part 4 consumes a small amount of electric power.

Hence, supply of electric power from the battery B is halted by switching the battery switch 10 to the input terminal 3 side when data is input from the input terminal 3 or data is being transmitted through the wireless module 5. Accordingly, wearing out of the battery B can be curbed while the control part 4 can be operated. Therefore, a long lifespan of the battery B can be realized.

On the other hand, when data is input from the input terminal 3, processing or the like in which the CPU 50 prepares a packet from input data is performed. Therefore, the control part 4 consumes a large amount of electric power. In addition, when data is transmitted through the wireless module 5, there is a need to output electromagnetic waves through the wireless module 5. Therefore, even in this case, the control part 4 consumes a large amount of electric power. In these cases, stable electric power from the battery B is supplied to the control part 4 by switching the battery switch 10 to the battery B side. Therefore, the control part 4 can be stably operated, and processing of data from the input terminal 3 or transmission through the wireless module 5 can be quickly performed without causing latency.

Returning to FIG. 7A, after the battery control processing of S8, it is confirmed whether the operation button 7 has been subjected to a long press (S9). Specifically, it is confirmed whether the operation button 7 has been continuously pressed for 5 seconds. In the processing of S9, when the operation button 7 has been subjected to a long press (S9: Yes), it is judged that resetting the communication mode has been instructed by a user. Therefore, undetermined values are set in the mode memory 52a and the subsequent mode memory 51b (S10), and the mode determination processing of S4 (FIG. 8) is executed. Accordingly, the mode memory 52a and the subsequent mode memory 51b are reset.

After the mode determination processing executed after the processing of S10, or when the operation button 7 has not been subjected to a long press in the processing of S9 (S9: No), the processing of S5 and thereafter is repeated.

Next, with reference to FIGS. 21 to 26B, a wireless communication device 200 of a second embodiment will be described. In the wireless communication device 1 of the foregoing first embodiment, the LED 6 is turned on or turned off at random time intervals. In contrast, in the wireless communication device 200 of the second embodiment, a sequence which is a combination of a series of patterns of turning-on or turning-off of the LED 6 is set, and turning-on or turning-off of the LED 6 is controlled on the basis of the sequence. The same reference signs are applied to the same portions as those of the foregoing first embodiment, and description thereof will be omitted.

Figure 21:
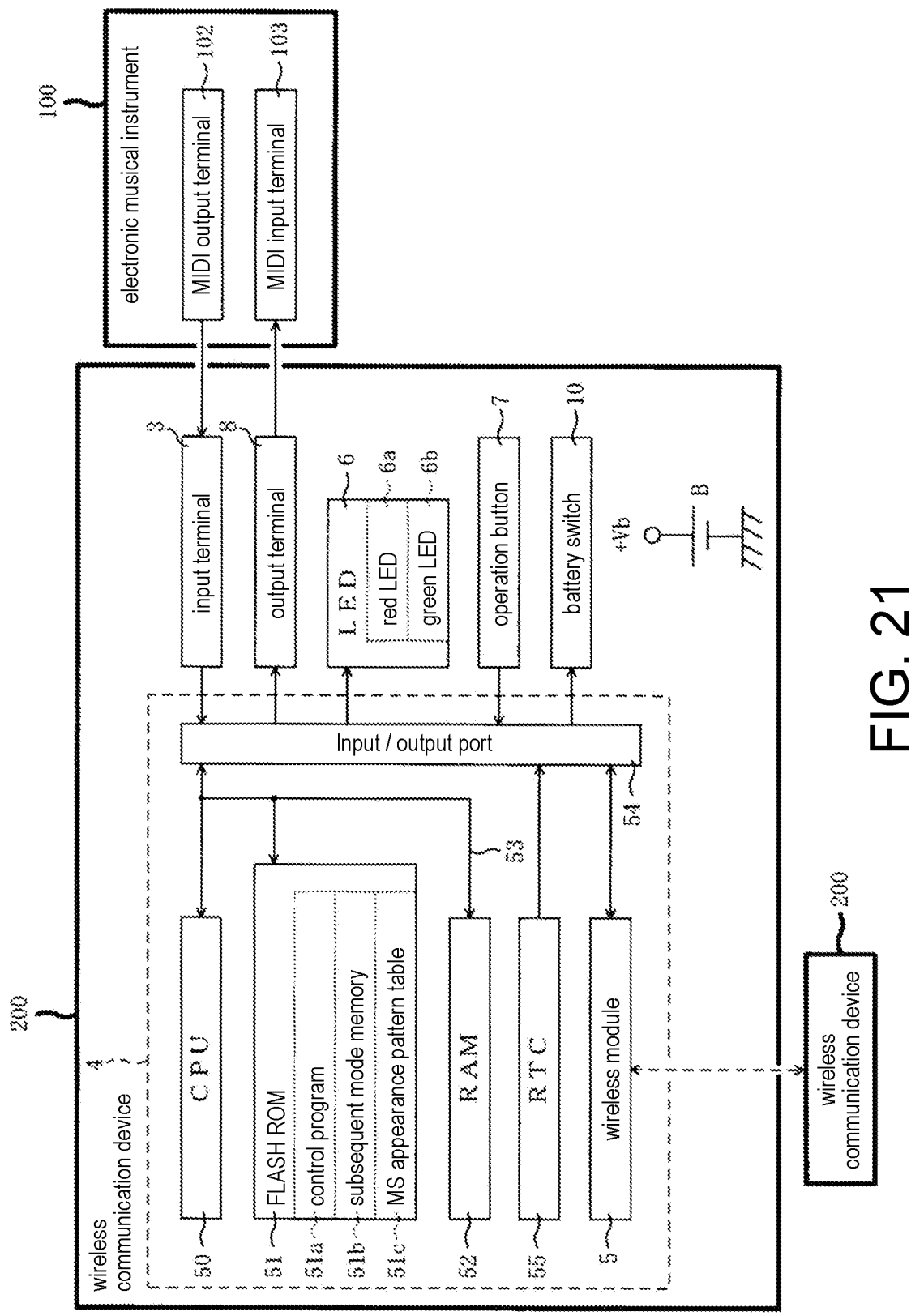
FIG. 21 is a block diagram illustrating an electrical configuration of a wireless communication device according to a second embodiment.

FIG. 21 is a block diagram illustrating an electrical configuration of the wireless communication device 200 according to the second embodiment. The LED 6 in the wireless communication device 200 is configured to have a red LED 6a which is turned on in red and a green LED 6b which is turned on in green.

Next, a configuration of the RAM 52 according to the second embodiment will be described with reference to FIG. 22A. FIG. 22A is a view schematically illustrating the RAM 52 according to the second embodiment. In the RAM 52, the LED turning-on time memory 52w of the first embodiment is omitted, and an LED table 52y, an LED sequence memory 52z, and an LED step memory 52aa are provided instead thereof. The LED table 52y is a data table storing a plurality of sequences which are combinations of a series of patterns of turning-on or turning-off of the LED 6. With reference to FIG. 22B, the LED table 52y will be described.

FIG. 22B is a view schematically illustrating the LED table 52y. As illustrated in FIG. 22B, the LED table 52y stores a plurality of sequences (which will be indicated as "SEQ" in the diagram), and the sequences are provided with "a step (which will be indicated as "STEP" in the diagram)" indicating a specific operation of the LED. The step is configured to have a combination of a target LED 6 (a pattern of turning-on colors of the red LED 6a or the green LED 6b), an operation with respect to the target LED 6 (a blinking pattern of turning-on or turning-off), and a continuation time of the operation. Each sequence is provided with a plurality of such steps. Accordingly, a form of turning-on or turning-off of the LED 6 in each sequence is set.

Returning to FIG. 22A, the LED sequence memory 52z stores a sequence in the LED table 52y being processed, and the LED step memory 52aa stores a step in the LED table 52y being processed.

Figure 23:
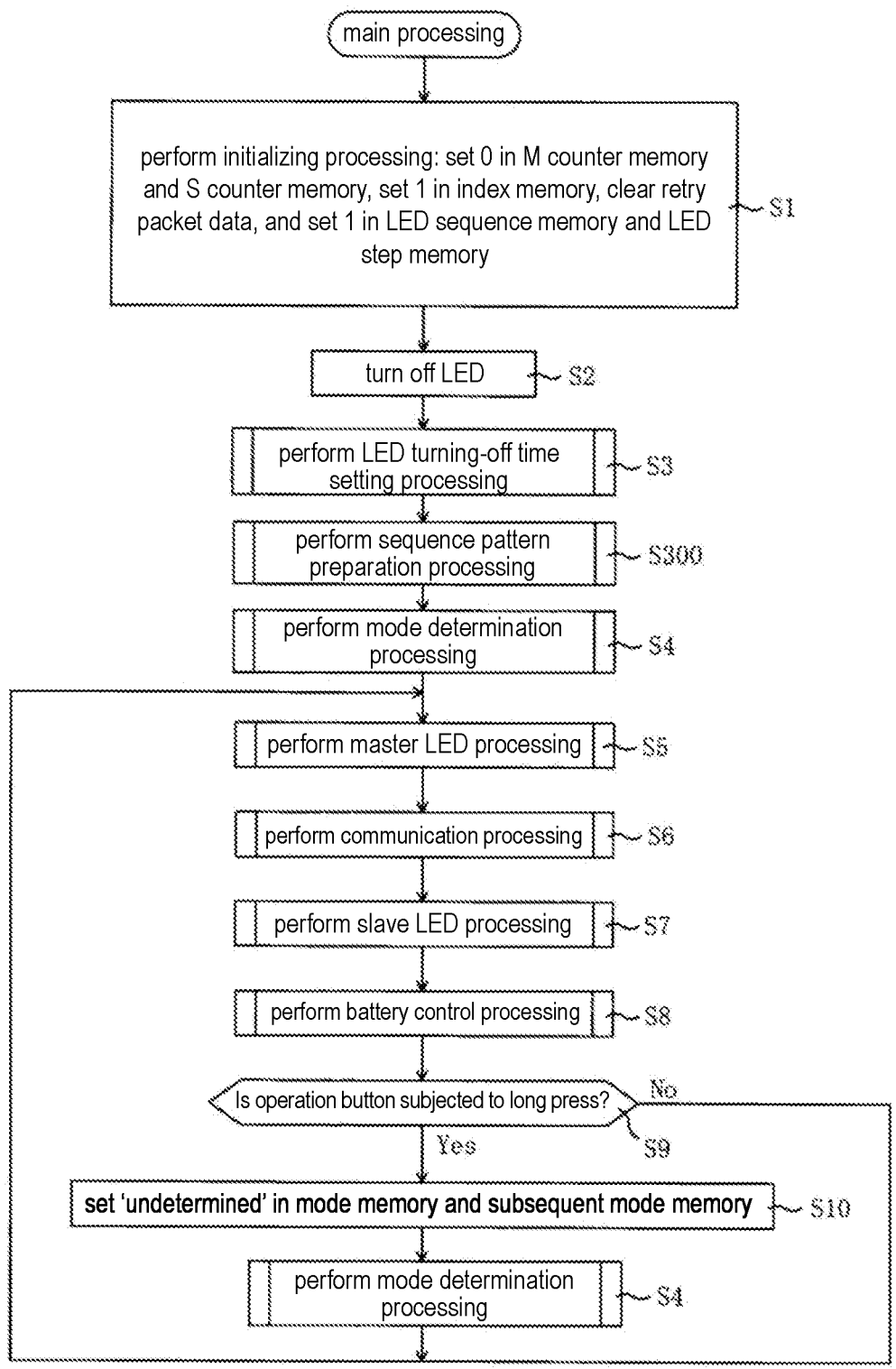
FIG. 23 is a flowchart of the main processing according to the second embodiment.

Next, with reference to FIGS. 23 to 26B, processing executed by the CPU 50 of the wireless communication device 200 will be described. FIG. 23 is a flowchart of the main processing according to the second embodiment. In the initializing processing of S1 in the main processing according to the second embodiment, 1 is set in the LED sequence memory 52z and the LED step memory 52aa in addition to the M counter memory 52q, the S counter memory 52r, the index memory 52t, the retry packet data 52m, and initializing.

In addition, sequence pattern preparation processing (S300) is performed between the LED turning-off time setting processing of S3 and the mode determination processing of S4. Here, with reference to FIG. 24A, the sequence pattern preparation processing will be described.

Figures 24A, 24B, 24C:
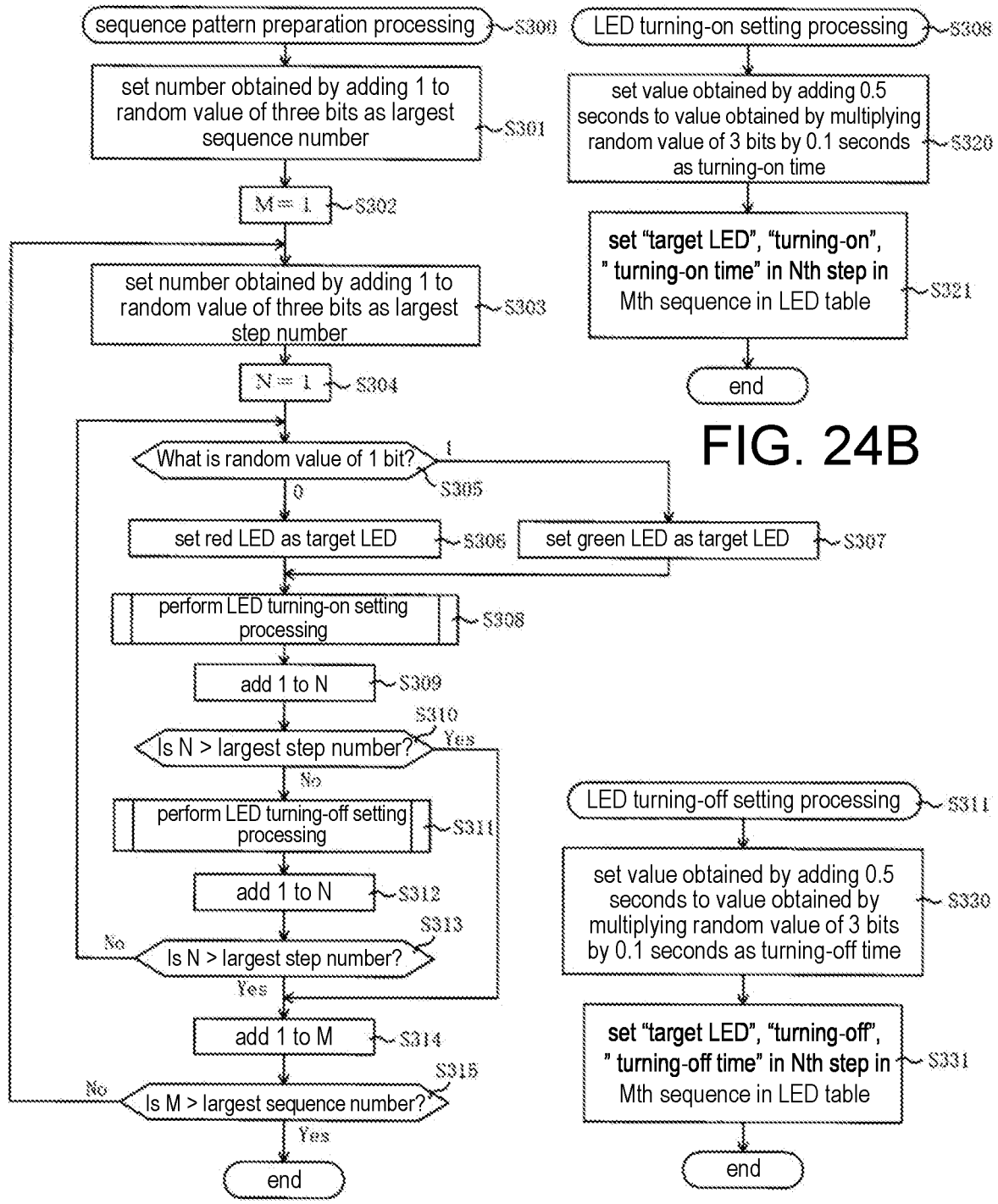
FIG. 24A is a flowchart of sequence pattern preparation processing.
FIG. 24B is a flowchart of LED turning-on setting processing.
FIG. 24C is a flowchart of LED turning-off setting processing.

FIG. 24A is a flowchart of the sequence pattern preparation processing. In the sequence pattern preparation processing, first, a random value of three bits (0 to 7) is acquired, and a value obtained by adding 1 to the acquired random value is set as a largest sequence number (S301). After the processing of S301, 1 is set as a counter variable M indicating a sequence (S302).

After the processing of S302, a random value of three bits (0 to 7) is acquired, and a value obtained by adding 1 to the acquired random value is set as a largest step number (S303). After the processing of S304, 1 is set as a counter variable N indicating a step (S304).

After the processing of S304, a random value of 1 bit (0, 1) is acquired, and the acquired random value is confirmed (S305). In the processing of S305, when the acquired random value is 0 (S305: "0"), the red LED 6a is set as the target LED (S306). When the acquired random value is 1 (S305: "1"), the green LED 6b is set as the target LED (S307).

After the processing of S306 and 5307, LED turning-on setting processing (S308) is executed. Here, with reference to FIG. 24B, the LED turning-on setting processing will be described.

FIG. 24B is a flowchart of the LED turning-on setting processing. In the LED turning-on setting processing, first, a random value of three bits (0 to 7) is acquired, and a value obtained by adding 0.5 seconds to a value obtained by multiplying the acquired random value by 0.1 seconds is set as the turning-on time (S320). After the processing of S320, the target LED set in the processing of S307 and 5308 in the sequence pattern preparation processing in FIG. 24A and the turning-on time set in the processing of S320 are individually set for "LED" and "time" of an Nth step in an Mth sequence in the LED table 52$y$. Moreover, "turning-on" is set for "operation" of the same step in the same sequence (S321). Accordingly, a step of turning on the red LED 6$a$ or the green LED 6$b$ is prepared. After the processing of S321, the LED turning-on setting processing ends.

Returning to FIG. 24A, after the LED turning-on setting processing of S308, 1 is added to N (S309), it is confirmed whether the value of N is equal to or smaller than the largest step number set in the processing of S303 (S310). In the processing of S310, when N is equal to or smaller than the largest step number (S310: Yes), LED turning-off setting processing (S311) is executed. Here, with reference to FIG. 24C, the LED turning-off setting processing will be described.

FIG. 24C is a flowchart of the LED turning-off setting processing. In the LED turning-off setting processing, first, a random value of three bits (0 to 7) is acquired, and a value obtained by adding 0.5 seconds to a value obtained by multiplying the acquired random value by 0.1 seconds is set as a turning-off time (S330). After the processing of S330, the target LED set in the processing of S307 and 5308 in the sequence pattern preparation processing in FIG. 24A and the turning-off time set in the processing of S330 are individually set for "LED" and "time" of the Nth step in the Mth sequence in the LED table 52$y$. Moreover, "turning-off" is set for "operation" of the same step in the same sequence (S331). Accordingly, a step of turning off the red LED 6$a$ or the green LED 6$b$ is prepared. After the processing of S331, the LED turning-off setting processing ends.

Returning to FIG. 24A, after the LED turning-off setting processing of S311, 1 is added to N (S312), and it is confirmed whether the value of N is larger than the largest step number set in the processing of S305 (S313). In the processing of S313, when N is equal to or smaller than the largest step number (S313: No), the processing of S305 and thereafter is repeated.

In S310 and S313, when N is larger than the largest step number (S310: No, S313: Yes), 1 is added to M (S314), and it is confirmed whether the value of M is larger than the largest sequence number set in the processing of S301 (S315). When the value of M is equal to or smaller than the largest sequence number (S315: No), the processing of S303 and thereafter is repeated. When the value of M is larger than the largest sequence number (S315: Yes), the sequence pattern preparation processing ends, and the procedure returns to the main processing in FIG. 23.

Figure 25:
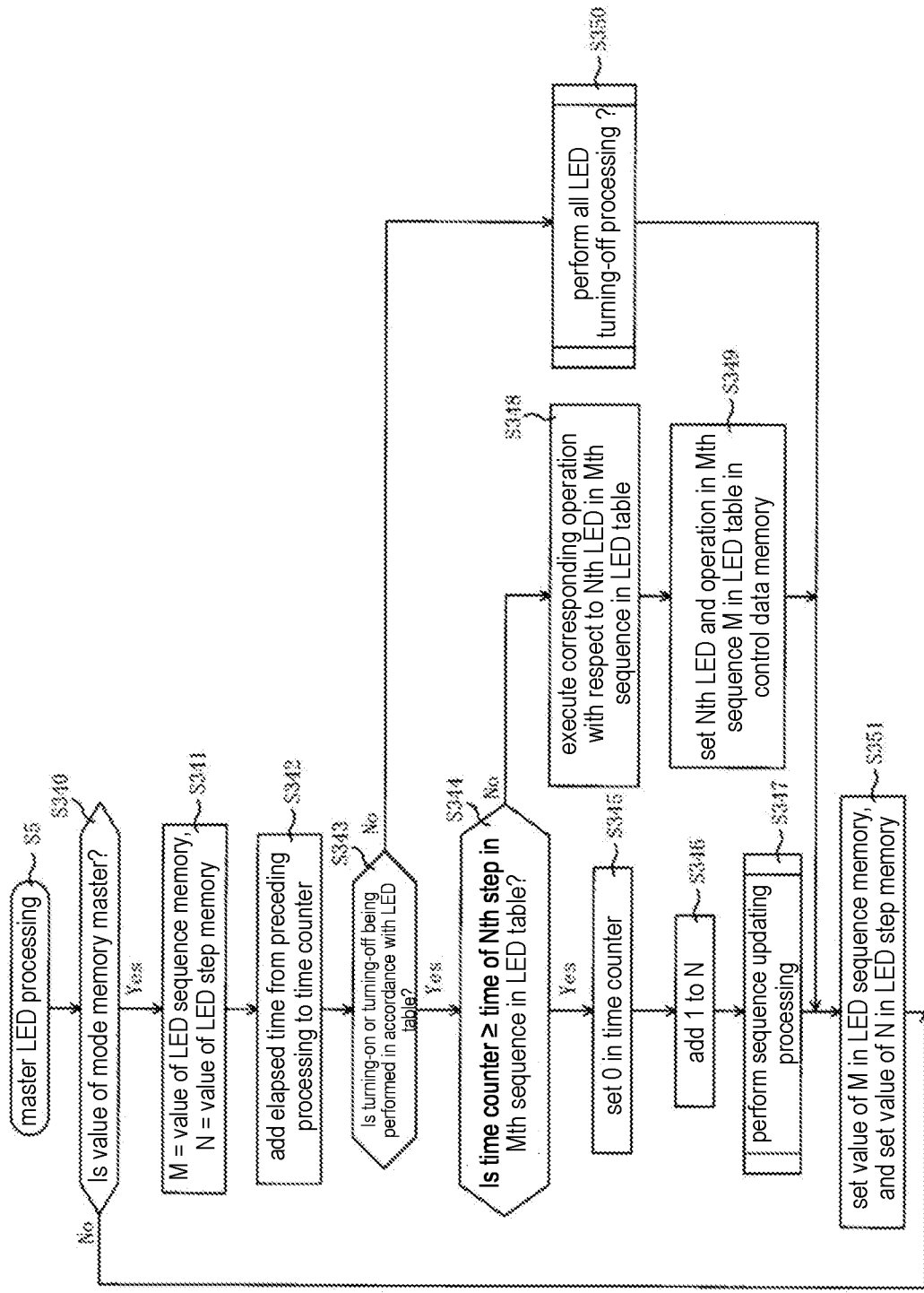
FIG. 25 is a flowchart of the master LED processing according to the second embodiment.

Next, with reference to FIGS. 25, 26A and 26B, the master LED processing according to the second embodiment will be described. FIG. 25 is a flowchart of the master LED processing according to the second embodiment. In the master LED processing, first, it is confirmed whether the value of the mode memory 52$a$ is the master mode (S340).

In the processing of S340, when the value of the mode memory 52$a$ is the master mode (S340: Yes), the value of the LED sequence memory 52$z$ is set as the counter variable M indicating a sequence in the LED table 52$y$, and the value of the LED step memory 52$aa$ is set as the counter variable N indicating a step in the LED table 52$y$ (S341).

After the processing of S341, the elapsed time acquired from the RTC 55 in the preceding master LED processing is added to the time counter 52$v$ (S342), and it is confirmed whether the LED 6 has been turned on or turned off in accordance with the sequence stored in the LED table 52$y$ (S343).

In the processing of S343, when the LED 6 has been turned on or turned off using the sequence stored in the LED table 52$y$, (S343: Yes), it is confirmed whether the time of the time counter 52$v$ is equal to or longer than the time of the Nth step in the Mth sequence in the LED table 52$y$ (S344).

In the processing of S344, when the time of the time counter 52$v$ is equal to or longer than the time of the Nth step in the Mth sequence in the LED table 52$y$ (S344: Yes), it is a timing to change to the next step. Therefore, 0 is set in the time counter 52$v$ (S345), and 1 is added to the counter variable N (S346). After the processing of S346, sequence updating processing (S347) is executed. Here, with reference to FIG. 26A, the sequence updating processing will be described.

Figure 26B:
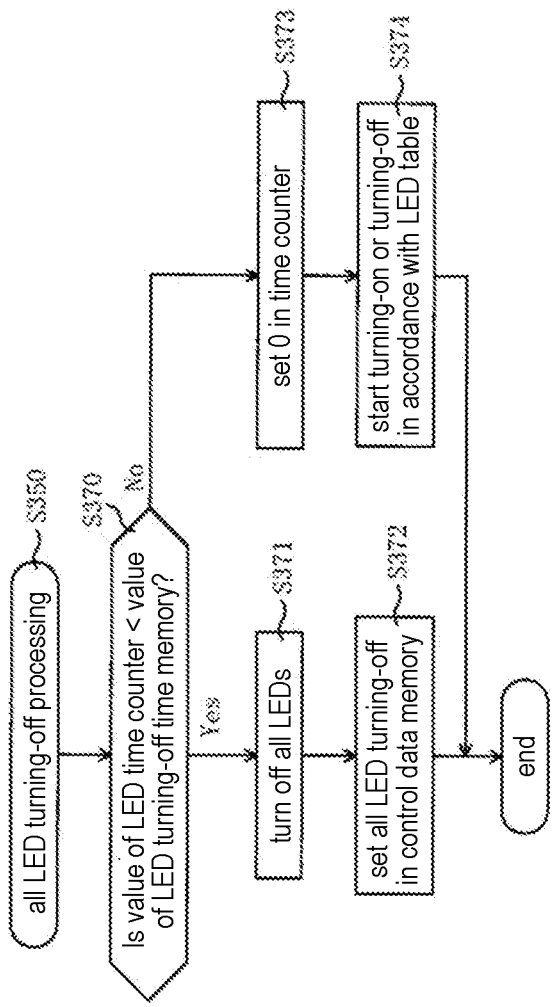
FIG. 26B is a flowchart of all LED turning-off processing.
Figure 26A:
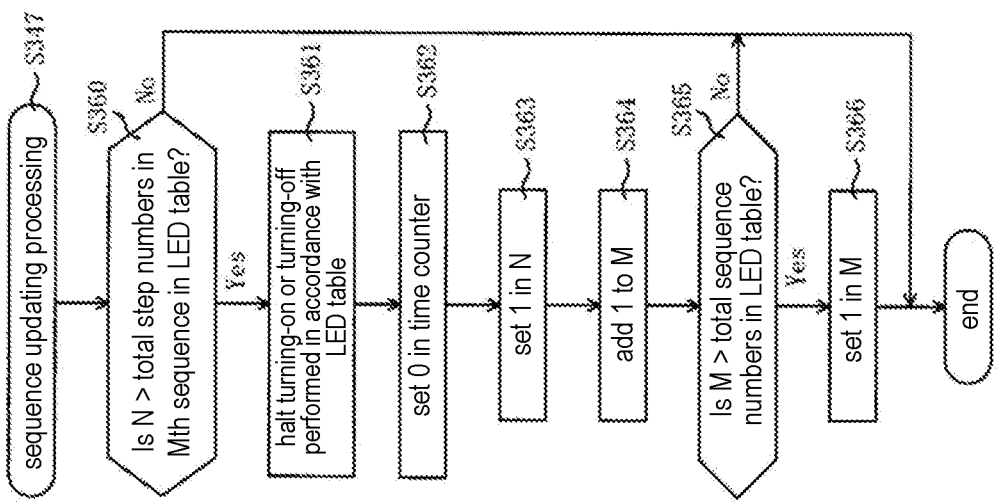
FIG. 26A is a flowchart of sequence updating processing.

FIG. 26A is a flowchart of the sequence updating processing. In the sequence updating processing, first, it is confirmed whether the counter variable N is larger than the largest step number of the Mth sequence in the LED table 52$y$ (S360). In the processing of S360, when the counter variable N is larger than the largest step number of the Mth sequence in the LED table 52$y$ (S360: Yes), this denotes an intermission between a sequence and another sequence. Therefore, for the moment, in order to turn off the LED 6 based on the value of the LED turning-off time memory 52$x$, first, turning-on or turning-off of the LED 6 according to the LED table 52$y$ is halted (S361), 0 is set in the time counter 52$v$ (S362).

After the processing of S362, in preparation for subsequent turning-on or turning-off of the LED 6 according to the LED table 52$y$, 1 is set as the counter variable N (S363), and 1 is added to the counter variable M (S364). After the processing of S364, it is confirmed whether the counter variable M is larger than the sequence number in the LED table 52$y$ (S365). In the processing of S365, when the counter variable M is larger than the sequence number in the LED table 52$y$ (S365: Yes), 1 is set as the counter variable M (S366).

when the counter variable N is equal to or smaller than the largest step number of the Mth sequence in the LED table 52$y$ in the processing of S360 (S360: No), when the counter variable M is equal to or smaller than the sequence number in the LED table 52$y$ (S365: No) in the processing of S365, or after the processing of S366, the sequence updating processing ends.

Returning to FIG. 25, in the processing of S344, when the time of the time counter 52$v$ is smaller than the time of the Nth step in the Mth sequence in the LED table 52$y$ (S344: No), it is a timing to turn on or turn off the LED 6 in accordance with the corresponding step. Therefore, first, turning-on or turning-off corresponding to "operation" of the same step is performed with respect to the red LED 6$a$ or the green LED 6$b$ corresponding to "LED" of the Nth step in the Mth sequence (S348). After the processing of S348, "LED" and "operation" of the Nth step in the Mth sequence are set in the control data memory 52$n$ (S349).

In the processing of S343, when the LED 6 is not turned on or turned off using the sequence stored in the LED table 52$y$, (S343: No), this denotes a case in which the LED 6 is turned off on the basis of the value of the LED turning-off time memory 52x. Therefore, all LED turning-off processing (S350) is executed. Here, with reference to FIG. 26B, the all LED turning-off processing will be described.

FIG. 26B is a flowchart of the all LED turning-off processing. In the all LED turning-off processing, first, it is confirmed whether the time of the time counter 52v is smaller than the time of the LED turning-off time memory 52x (S370).

In the processing of S370, when the time of the time counter 52v is smaller than the time of the LED turning-off time memory 52x (S370: Yes), it is a timing to perform turning-off based on the value of the LED turning-off time memory 52x. Therefore, the red LED 6a and the green LED 6b are turned off (S371), and turning-off of the red LED 6a and the green LED 6b is set in the control data memory 52n (S372).

On the other hand, in the processing of S370, when the time of the time counter 52v is equal to or longer than the time of the LED turning-off time memory 52x (S370: No), it is a timing to switch to turning-on or turning-off of the LED 6 according to the LED table 52y from turning-off based on the value of the LED turning-off time memory 52x. Therefore, 0 is set in the time counter 52v (S373), and turning-on or turning-off of the LED 6 according to the LED table 52y is started (S374). After the processing of S372 and 5374, the all LED turning-off processing ends.

Returning to FIG. 25, after the sequence updating processing of S347, the processing of S349, or the all LED turning-off processing of S350, the value of the counter variable M is set in the LED sequence memory 52z, and the value of the counter variable N is set in the LED step memory 52aa (S351).

In the processing of S340, when the value of the mode memory 52a is the slave mode (S340: No), or after the processing of S351, the master LED processing ends, and the procedure returns to the main processing in FIG. 23.

As described above, in the wireless communication device 200 of the second embodiment, the LED table 52y stores the sequences in which the red LED 6a or the green LED 6b to be turned on is randomly selected and the turning-on time or the turning-off time thereof is also randomly set. In paired wireless communication devices 200, the LED 6 is turned on or turned off on the basis of the sequence. Accordingly, the turning-on color, the turning-on time, or the turning-off time of the LED 6 can be changed in detail. Therefore, the paired wireless communication devices 200 can be easily identified.

In addition, the LED 6 is turned off based on the LED turning-off time memory 52x between turning-on or turning-off of the LED 6 based on the sequence of 1 in the LED table 52y and turning-on or turning-off of the LED 6 based on the next sequence in the LED table 52y. As described above, a random time is also set in the LED turning-off time memory 52x. Therefore, the paired wireless communication devices 200 can be more easily identified in accordance with a cycle of turning-on or turning-off of the LED 6 based on the sequence and turning-off of the LED 6 based on the LED turning-off time memory 52x.

Hereinabove, description has been given on the basis of the foregoing embodiments, and it is easy to presume that various modifications and changes can be made.

In the battery control processing of (FIG. 20B) the foregoing embodiments, when data is input from the input terminal 3 or data is being transmitted through the wireless module 5, the battery switch 10 is switched to the battery B side. However, conditions for switching the battery switch 10 are not limited thereto. The battery switch 10 may be switched to the battery B side only when data is input from the input terminal 3, or the battery switch 10 may be switched to the battery B side only when data is being transmitted through the wireless module 5.

Figure 27A:
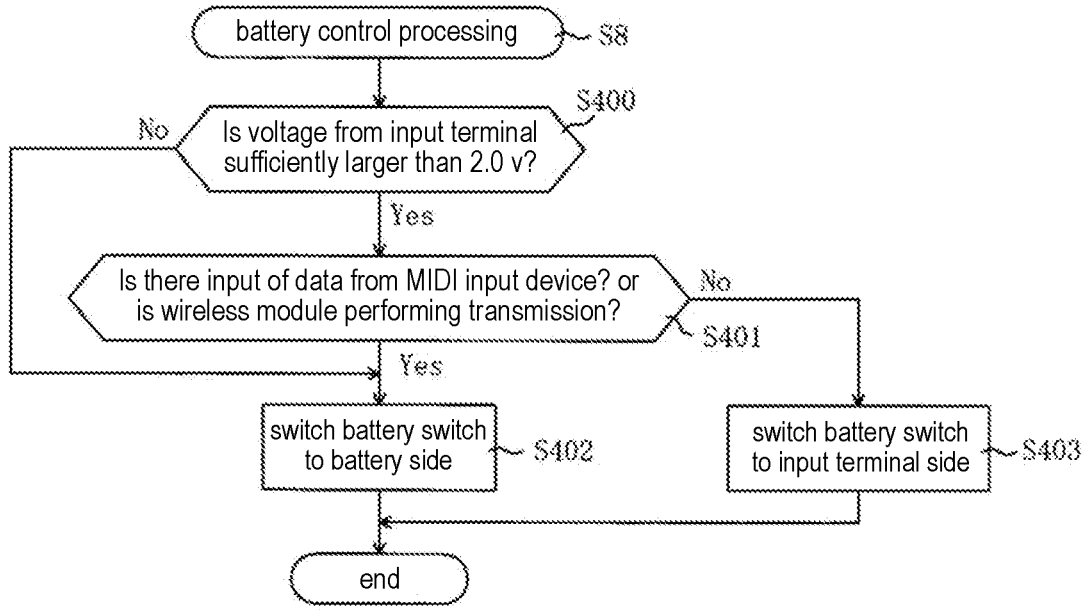
FIG. 27A is a flowchart of the battery control processing according to a modification example.

In addition, the battery switch 10 may be switched on the basis of a voltage input from the input terminal 3. In this case, as in FIG. 27A, when a voltage from the input terminal 3 is sufficiently larger than 2.0 V, for example, that is a lowest operation voltage of the CPU 50 (S400: Yes), it is judged that the CPU 50 can be stably driven. Therefore, similar to FIG. 20B, when data is input from the input terminal 3 or data is being transmitted through the wireless module 5 (S401: Yes), the battery switch 10 is switched to the battery B side (S402), and no data is input from the input terminal 3. When no data is transmitted through the wireless module 5 (S401: No), the battery switch 10 is switched to the input terminal 3 side (S403).

On the other hand, when the voltage from the input terminal 3 is not sufficiently larger than 2.0 V (S400: No), the battery switch 10 is switched to the battery B side at all times (S402). Accordingly, when a small voltage is input from the input terminal 3 so that the CPU 50 cannot be stably operated only with the input terminal 3, power is supplied from the battery B. Therefore, even in such a case, the CPU 50, that is, the wireless communication device 1 or 200 can be stably operated.

In addition, the battery switch 10 may be switched on the basis of a voltage from the battery B. In this case, when the voltage from the battery B drops, for example, when the voltage drops to 2.5 V close to 2.0 V that is the lowest operation voltage of the CPU 50, first, a warning such as blinking of the LED 6 in a certain cycle is displayed. Accordingly, a user can be made recognize that the battery B is wearing out. Moreover, when the voltage from the battery B drops to 2.2 V, the battery switch 10 is switched to the input terminal 3 side. Accordingly, a situation in which the CPU 50 becomes inoperative is avoided, and the control part 4 can continue to be operated. Therefore, MIDI data can be acquired from the input terminal 3, and the MIDI data can be subjected to wireless communication to the counterpart wireless communication device 1 or 200 via the wireless module 5. At this time, electric power supplied from the battery B to the output terminal 8 becomes unstable. Therefore, electric power supplied to the output terminal 8 by the supply part 11 may be blocked, and operation of transmitting MIDI data acquired from the counterpart wireless communication device 1 or 200 to the output terminal 8 via the wireless module 5 may be halted. In addition, display of a warning by the foregoing LED 6 may be omitted.

Figure 27B:
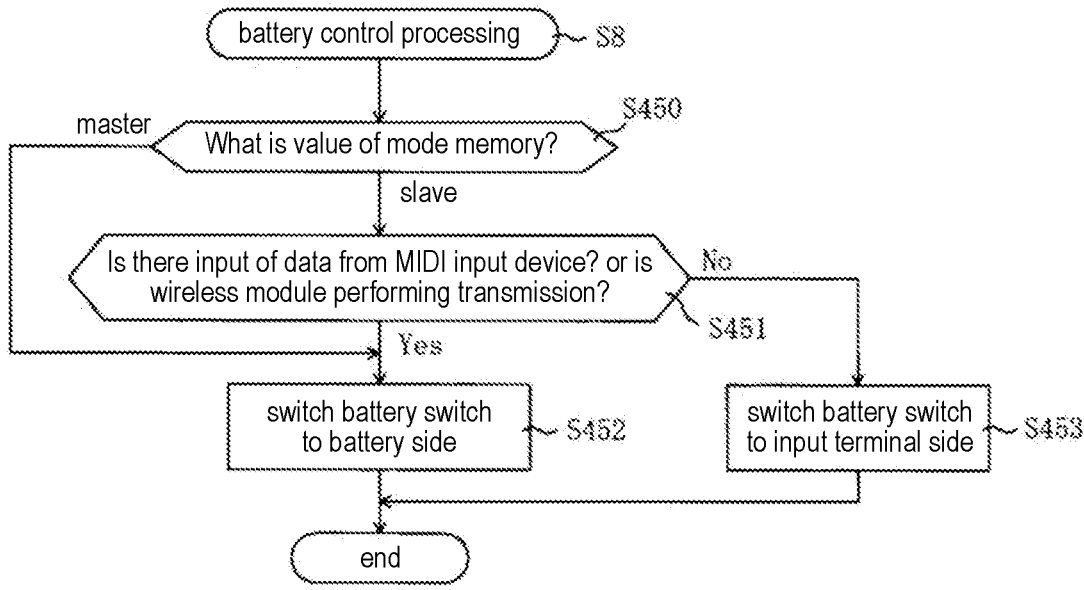
FIG. 27B is a flowchart of the battery control processing according to another modification example.

Moreover, the battery switch 10 may also switch between on and off according to whether the communication mode is the master mode or the slave mode. For example, as in FIG. 27B, when the value of the mode memory 52a is the master mode (S450: "master mode"), the battery switch 10 is switched to the battery B side (S452). Accordingly, processing of MIDI data input from the input terminal 3 or transmission through the wireless module 5 can be performed without causing latency with respect to the wireless communication device 1 or 200 on the master mode side having a high frequency of transmission by supplying power from the battery B at all times.

On the other hand, in a case in which the value of the mode memory 52a is the slave mode (S450: "slave mode"), similar to FIG. 20B, when data is input from the input terminal 3 or data is being transmitted through the wireless module 5 (S451: Yes), the battery switch 10 is switched to the battery B side (S452), and no data is input from the input terminal 3. When no data is transmitted through the wireless module 5 (S451: No), the battery switch 10 is switched to the input terminal 3 side (S453). The wireless communication devices 1 or 200 on the slave mode side basically stands by for transmission from the master mode side. Therefore, wearing out of the battery B can be better curbed by supplying power from the battery B on the basis of an input from the input terminal 3 or transmission through the wireless module 5.

As an example, the foregoing embodiments have described that the master mode and the slave mode are set in each of two wireless communication devices 1 or 200, but the embodiments are not limited thereto. One wireless communication device 1 of the master mode and two or more wireless communication devices 1 or 200 of the slave mode may be configured to perform wireless communication.

In the foregoing embodiments, a turning-on instruction or a turning-off instruction of the LED 6 is set in the control data memory 52n, and the turning-on instruction or a turning-off instruction is set in control data within a packet and transmitted to the counterpart wireless communication device 1 or 200 together with MIDI data. However, a form of transmitting a turning-on instruction or a turning-off instruction of the LED 6 to the counterpart wireless communication device 1 or 200 is not limited thereto. For example, similar to the mode switching packet, a turning-on instruction or a turning-off instruction of the LED 6 may be transmitted to the counterpart wireless communication device 1 or 200 based on a packet configured to have only a turning-on instruction or a turning-off instruction of the LED 6.

In the foregoing embodiments, in the processing of S108 in FIG. 11, it is acquired whether there is a spare time of 2 milliseconds or longer before the subsequent communication A. However, the embodiments are not limited thereto. For example, a spare time before the communication A may be acquired, and it may be judged whether the spare time is 2 milliseconds or longer.

In the foregoing embodiments, the MIDI data output processing of S104 (FIG. 15A) is executed in the communication processing of S6 (FIG. 11). However, the timing to execute the MIDI data output processing is not limited thereto. For example, the MIDI data output processing may be executed in timer processing which is executed regularly (for example, every 100 milliseconds).

In the foregoing embodiments, in the processing of S180 of the output data processing of S163 (FIG. 15A), the ID of the acquired packet is also set in the received ID memory 52j for the communication B. However, the embodiments are not necessarily limited thereto. In the processing of S208 of the communication B packet transmission/reception processing of S110 (FIGS. 16 and 17) with respect to the communication B, when a packet is received by the communication B (S208: Yes), the ID of the packet (transmission target) prepared in the processing of S206 may be set in the received ID memory 52j. In this case, in the communication B, the processing of S180 in the output data processing of S163 may be omitted.

When a packet is received by the communication B in the processing of S208, it is possible to judge that a packet (transmission target) transmitted in the immediately preceding processing of S207 has arrived at the different wireless communication device 1. In this case, the received ID memory 52j can be quickly updated by setting the ID of the packet of the transmission target to the received ID memory 52j without waiting for the output data processing thereafter.

In the foregoing embodiments, the communication mode is determined on the basis of the appearance patterns P1 to P3 stored in the MS appearance pattern table 51c. However, a form of determining the communication mode is not limited thereto. For example, the master mode and the slave mode may be made appear randomly and may be determined as a communication mode.

In the foregoing embodiments, one packet is configured to store one piece of MIDI data, but the embodiments are not necessarily limited thereto. One packet may store a plurality of pieces of MIDI data. At this time, the number of pieces of MIDI data to be stored in the packet may be added to the packet, or the number of pieces of MIDI data to be stored in the packet may be judged based on the data volume of MIDI data to be stored in the packet.

In the foregoing embodiments, the wireless communication device 1 or 200 is connected to the MIDI output terminal 102 and the MIDI input terminal 103 of the electronic musical instrument 100 via the input terminal 3 and the output terminal 8, but the embodiments are not limited thereto and may have a configuration in which the wireless communication device 1 or 200 is connected to a different communication terminal such as a USB in the electronic musical instrument 100 and MIDI data is input and output between the wireless communication device 1 or 200 and the electronic musical instrument 100 via a communication terminal. In addition, the wireless communication device 1 or 200 is not limited to being connected to the electronic musical instrument 100 and may be built into the electronic musical instrument 100, for example.

In the foregoing embodiments, communication is performed with a different wireless communication device 1 by wireless communication through the wireless module 5. However, a form of communicating with the different wireless communication device 1 is not limited to wireless communication. The wireless communication devices 1 may be connected to each other using a cable such as a LAN cable or a USB cable, and communication may be performed with the different wireless communication device 1 by wired communication using a LAN, a USB, or the like.

In the foregoing embodiments, the casings 2a and 2b are formed to be translucent, but the embodiments are not limited thereto. The casings 2a and 2b may be formed to be transparent. Alternately, the casing 2a and the casing 2b may be formed to be opaque, and only a portion in the vicinity of the LED 6 of the casing 2a may be formed to be translucent or transparent.

The numerical values used in the foregoing embodiments are examples, and it is naturally possible to employ other numerical values.

It will be apparent to those skilled in the art that various modifications and variations can be made to the disclosed embodiments without departing from the scope or spirit of the disclosure. In view of the foregoing, the disclosure is intended to cover modifications and variations provided that they fall within the scope of the following claims and their equivalents.

What is claimed is:

1. A wireless communication device connected to an electronic instrument and transmitting and receiving MIDI data input and output from the electronic instrument with respect to a different wireless communication device by wireless communication, the wireless communication device comprising:
  a data storage unit that stores MIDI data input from the electronic instrument;

a wireless communication unit that performs wireless communication;

a first communication unit that transmits MIDI data stored in the data storage unit by the wireless communication unit to the different wireless communication device at predetermined time intervals; and a second communication unit that transmits MIDI data stored in the data storage unit by the wireless communication unit to the different wireless communication device during an intermission between transmissions and receptions of the first communication unit, the first communication unit or the second communication unit receiving the MIDI data from the different wireless communication device.

2. The wireless communication device according to claim 1, further comprising:

a spare time judgement unit that judges whether there is a predetermined spare time or longer before subsequent transmission of the MIDI data is performed in the first communication unit, wherein when the spare time judgement unit judges that there is the predetermined spare time, the second communication unit judges that the first communication unit is taking an intermission and transmits the MIDI data.

3. The wireless communication device according to claim 1, further comprising:

a frequency acquisition unit that acquires a frequency used for wireless communication of the first communication unit, wherein the second communication unit performs wireless communication using the frequency acquired by the frequency acquisition unit.

4. The wireless communication device according to claim 1, wherein a unique identification number is applied to the MIDI data, wherein the data storage unit stores the MIDI data and the identification number in association with each other, wherein the wireless communication device further comprises a transmitted identification number storage unit that stores the identification number of the MIDI data which has been transmitted by the first communication unit or the second communication unit, and wherein the first communication unit and the second communication unit perform transmission excluding the MIDI data, of the MIDI data stored in the data storage unit, of the identification number stored in the transmitted identification number storage unit.

5. The wireless communication device according to claim 4, wherein the first communication unit and the second communication unit of the wireless communication device transmit the MIDI data and the identification number associated with the MIDI data to the different wireless communication device, and wherein the wireless communication device further comprises a reply unit that replies the identification number of the MIDI data received from the different wireless communication device by the first communication unit or the second communication unit of the wireless communication device to the different wireless communication device.

6. The wireless communication device according to claim 5, wherein when the identification number is replied from the different wireless communication device, the transmitted identification number storage unit of the wireless communication device stores the identification number replied from the different wireless communication device as the identification number of the MIDI data which has been transmitted.

7. The wireless communication device according to claim 1, wherein a unique identification number is applied to the MIDI data, wherein the data storage unit stores the MIDI data and the identification number in association with each other, and wherein the wireless communication device further comprises:

a received identification number storage unit that stores the identification number of the MIDI data received by the first communication unit or the second communication unit, and an excluding unit that excludes, when the identification number of the MIDI data received by the first communication unit or the second communication unit is stored in the received identification number storage unit, the MIDI data from MIDI data output to the electronic instrument.

8. A wireless communication method for transmitting MIDI data input from an electronic instrument to a different wireless communication device by wireless communication, the wireless communication method comprising:

a first communication step of transmitting MIDI data input from the electronic instrument to the different wireless communication device at predetermined time intervals; and a second communication step of transmitting MIDI data input from the electronic instrument to the different wireless communication device during an intermission between transmissions through the first communication step, the first communication step or the second communication step receiving the MIDI data from the different wireless communication device.

9. The wireless communication method according to claim 8, further comprising:

a spare time judgement step of judging whether there is a predetermined spare time or longer before subsequent transmission of the MIDI data is performed in the first communication step, wherein when it is judged through the spare time judgement step that there is the predetermined spare time, it is judged that the first communication step is taking an intermission and the MIDI data is transmitted in the second communication step.

10. The wireless communication method according to claim 8, further comprising:

a frequency acquisition step of acquiring a frequency used for wireless communication in the first communication step, wherein wireless communication is performed in the second communication step using the frequency acquired in the frequency acquisition step.

11. The wireless communication method according to claim 8, wherein a unique identification number is applied to the MIDI data, wherein the wireless communication method further comprises:

a MIDI data storage step of storing the MIDI data and the identification number in association with each other, and a transmitted identification number storage step of storing the identification number of the MIDI data which has been transmitted through the first communication step or the second communication step, and wherein transmission is performed excluding the MIDI data, of the MIDI data stored in the MIDI data storage step, of the identification number stored in the transmitted identification number storage step in the first communication step and the second communication step.

12. The wireless communication method according to claim 11, wherein the MIDI data and the identification number associated with the MIDI data are transmitted in the first communication step and the second communication step to the different wireless communication device, and wherein the wireless communication method further comprises a reply step of replying the identification number of the MIDI data received from the different wireless communication device through the first communication step or the second communication step to the different wireless communication device.

13. The wireless communication method according to claim 12, wherein when the identification number is replied from the different wireless communication device, the identification number replied from the different wireless communication device is stored in the transmitted identification number storage step as the identification number of the MIDI data which has been transmitted.

14. The wireless communication method according to claim 8, wherein a unique identification number is applied to the MIDI data, wherein the wireless communication method further comprises:

a MIDI data storage step of storing the MIDI data and the identification number in association with each other, a received identification number storage step of storing the identification number of the MIDI data received through the first communication step or the second communication step, and an excluding step of excluding, when the identification number of the MIDI data received through the first communication step or the second communication step is stored in the received identification number storage step, the MIDI data from the MIDI data output to the electronic instrument.

15. A non-transitory computer-readable storage medium, recording a program for causing a computer; which is included in a wireless communication device connected to an electronic instrument, transmitting and receiving MIDI data input and output from the electronic instrument with respect to a different wireless communication device by wireless communication, and including a data storage unit that stores MIDI data input from the electronic instrument and a wireless communication unit that performs wireless communication; to execute:

a first communication step of transmitting MIDI data stored in the data storage unit by the wireless communication unit to the different wireless communication device at predetermined time intervals, and a second communication step of transmitting MIDI data stored in the data storage unit by the wireless communication unit to the different wireless communication device during an intermission between transmissions and receptions through the first communication step, the first communication step or the second communication step receiving the MIDI data from the different wireless communication device.

16. The non-transitory computer-readable storage medium according to claim 15, further comprising:

a spare time judgement step of judging whether there is a predeteiinined spare time or longer before subsequent transmission of the MIDI data is performed in the first communication step, wherein when it is judged through the spare time judgement step that there is the predetermined spare time, it is judged that the first communication step is taking an intermission and the MIDI data is transmitted in the second communication step.

17. The non-transitory computer-readable storage medium according to claim 15, further comprising:

a frequency acquisition step of acquiring a frequency used for wireless communication in the first communication step, wherein wireless communication is performed in the second communication step using the frequency acquired in the frequency acquisition step.

18. The non-transitory computer-readable storage medium according to claim 15, wherein a unique identification number is applied to the MIDI data, wherein the data storage unit stores the MIDI data and the identification number in association with each other, wherein the non-transitory computer-readable storage medium further comprises a transmitted identification number storage step of storing the identification number of the MIDI data which has been transmitted through the first communication step or the second communication step, and wherein transmission is performed in the first communication step and the second communication step excluding the MIDI data, of the MIDI data stored in the data storage unit, of the identification number stored in the transmitted identification number storage step.

19. The non-transitory computer-readable storage medium according to claim 18, wherein the MIDI data and the identification number associated with the MIDI data are transmitted in the first communication step and the second communication step to the different wireless communication device, and wherein the non-transitory computer-readable storage medium further comprises a reply step of replying the identification number of the MIDI data received from the different wireless communication device through the first communication step or the second communication step to the different wireless communication device.

20. The non-transitory computer-readable storage medium according to claim 19, wherein when the identification number is replied from the different wireless communication device, the identification number replied from the different wireless communication device is stored in the transmitted identification number storage step as the identification number of the MIDI data which has been transmitted.

21. The non-transitory computer-readable storage medium according to claim 15, wherein a unique identification number is applied to the MIDI data, wherein the data storage unit stores the MIDI data and the identification number in association with each other, and wherein the non-transitory computer-readable storage medium further comprises:

a received identification number storage step of storing the identification number of the MIDI data received through the first communication step or the second communication step; and an excluding step of excluding, when the identification number of the MIDI data received through the first communication step or the second communication step is stored in the received identification number storage step, the MIDI data from the MIDI data output to the electronic instrument.

\* \* \* \* \*